US012643806B2

(12) United States Patent
Santoro et al.

(10) Patent No.: US 12,643,806 B2
(45) Date of Patent: *Jun. 2, 2026

(54) METHODS AND SYSTEMS FOR TREATING FLUID USING A BIOCHEMICAL PROCESS UNDER VACUUM PRESSURE

(71) Applicant: U.S. PEROXIDE, LLC, Atlanta, GA (US)

(72) Inventors: Domenico Santoro, London (CA); Tie Mao, London (CA); John R. Walton, Colfax, CA (US); George Nakhla, Woodbridge (CA); Elsayed Elbeshbishy, Mississauga (CA); Eunkyung Jang, London (CA)

(73) Assignee: U.S. PEROXIDE, LLC, Atlanta, GA (US)

( * ) Notice: Subject to any disclaimer, the term of this patent is extended or adjusted under 35 U.S.C. 154(b) by 125 days.

This patent is subject to a terminal disclaimer.

(21) Appl. No.: 18/402,287

(22) Filed: Jan. 2, 2024

(65) Prior Publication Data

US 2024/0132387 A1 Apr. 25, 2024

Related U.S. Application Data

(63) Continuation of application No. 17/742,905, filed on May 12, 2022, which is a continuation of application No. PCT/US2020/060477, filed on Nov. 13, 2020.

(Continued)

(51) Int. Cl.
*C02F 9/00* (2023.01)
*C02F 1/00* (2023.01)
(Continued)

(52) U.S. Cl.
CPC ............... *C02F 9/00* (2013.01); *C02F 1/008* (2013.01); *C02F 1/06* (2013.01); *C02F 1/66* (2013.01);
(Continued)

(58) Field of Classification Search
CPC .... C02F 1/06; C02F 1/008; C02F 1/66; C02F 1/36; C02F 1/70; C02F 1/72; C02F 1/20;
(Continued)

(56) References Cited

U.S. PATENT DOCUMENTS 5,540,839 A * 7/1996 Pirt .......................... C12P 5/023
210/612
6,942,798 B2 9/2005 Miller, III
(Continued)

FOREIGN PATENT DOCUMENTS

KR 101305458 B1 9/2013
WO 2021/097257 A1 5/2021
WO 2021/260042 A1 12/2021

OTHER PUBLICATIONS

Feb. 9, 2021 International Search Report issued in International Patent Application No. PCT/US2020/060477.
(Continued)

*Primary Examiner* — Akash K Varma
(74) *Attorney, Agent, or Firm* — Oliff PLC

(57) ABSTRACT

Methods and systems are described for treating a fluid that includes a particulate fraction and a soluble fraction, such as wastewater fluid including biosolids. The treatment includes biochemically transforming solids in the particulate fraction of the fluid in a biochemical process while simultaneously subjecting the fluid to a vacuum pressure, and evaporating off at least a portion of the soluble fraction of the fluid and thereby thickening a remaining portion of the fluid. A residence time of the particulate fraction can be controlled to be at least 25% greater than a residence time of the soluble fraction, for example. A solids content of the particulate fraction can be controlled to be in a range of from 2% to 99%, for example.

44 Claims, 69 Drawing Sheets

Related U.S. Application Data

(60) Provisional application No. 62/934,854, filed on Nov. 13, 2019.

(51) Int. Cl.

| | |
|---|---|
| *C02F 1/06* | (2023.01) |
| *C02F 1/66* | (2023.01) |
| *C02F 3/02* | (2023.01) |
| *C02F 3/28* | (2023.01) |
| *C02F 11/06* | (2006.01) |

(52) U.S. Cl.
CPC .................. *C02F 3/02* (2013.01); *C02F 3/28* (2013.01); *C02F 11/06* (2013.01); *C02F 2209/02* (2013.01); *C02F 2209/05* (2013.01); *C02F 2209/06* (2013.01); *C02F 2209/40* (2013.01); *C02F 2301/046* (2013.01)

(58) Field of Classification Search
CPC ...... C02F 1/04; C02F 1/52; C02F 1/00; C02F 1/048; C02F 1/02; C02F 9/00; C02F 3/02; C02F 3/28; C02F 3/342; C02F 3/1263; C02F 3/00; C02F 3/12; C02F 11/06; C02F 11/00; C02F 11/04; C02F 11/12; C02F 2209/02; C02F 2209/05; C02F 2209/06; C02F 2209/40; C02F 2209/03; C02F 2209/10; C02F 2209/44; C02F 2301/046; C02F 2301/063; C02F 2301/106; C02F 2103/343; B01D 1/2846; B01D 1/2856; B01D 1/00; B01D 3/10; Y02W 10/10; Y02W 10/30; Y02W 10/37

USPC .................................................. 210/620, 612
See application file for complete search history.

(56) References Cited

U.S. PATENT DOCUMENTS

| | | | | | |
|---|---|---|---|---|---|
| 7,182,872 | B2 | 2/2007 | Barak et al. | | |
| 9,670,508 | B2 | 6/2017 | Ketola et al. | | |
| 10,030,254 | B2 | 7/2018 | Haas | | |
| 2004/0134853 | A1* | 7/2004 | Miller, III | ................. | C02F 3/28 |
| | | | | | 210/603 |
| 2014/0157846 | A1 | 6/2014 | Jeppson et al. | | |
| 2019/0062172 | A1 | 2/2019 | Mavinic et al. | | |
| 2019/0106347 | A1* | 4/2019 | Wanstrom | ................. | C02F 9/00 |
| 2019/0263700 | A1* | 8/2019 | Xu | ............................ | C11B 1/02 |

OTHER PUBLICATIONS

Josh Mah. "Overview of Haarslev's Approach to THP". 2017 Biosolids Workshop—Ohio Water Environment Association. <URL: http://www.ohiowea.org/docs/Haarslev_THP_Overview.pdf>.

Aug. 1, 2023 International Search Report issued in International Patent Application No. PCT/US23/22870.

Aug. 1, 2023 Written Opinion issued in International Patent Application No. PCT/US23/22870.

Nov. 9, 2023 Supplementary European Search Report issued in European Patent Application No. 20887530.2.

Aug. 27, 2025 Office Action issued in U.S. Appl. No. 17/742,905.

Jan. 21, 2026 Notice of Allowance issued in U.S. Appl. No. 18/402,338.

\* cited by examiner

DISTILLATE

SOURCE
OF VACUUM

HEATER

CONCENTRATE

1

METHODS AND SYSTEMS FOR TREATING FLUID USING A BIOCHEMICAL PROCESS UNDER VACUUM PRESSURE

CROSS-REFERENCE TO RELATED APPLICATIONS

This application is a continuation of U.S. application Ser. No. 17/742,905, filed on May 12, 2022, which is a continuation of PCT Application No. PCT/US2020/060477, filed on Nov. 13, 2020, which claims priority to U.S. Provisional Application No. 62/934,854, filed on Nov. 13, 2019, the entireties of which are incorporated by reference herein.

TECHNICAL FIELD

This disclosure relates generally to treating fluid by using a biochemical process under a vacuum, and more particularly to treating wastewater streams having biosolids with microbes under a vacuum to produce improved waste product streams.

BACKGROUND

Vacuum evaporators are established technologies which work on the principle of accelerating the time and optimizing the energy required to evaporate water from a contaminated mixture. The system shown in FIG. 1 is illustrates the basic component of a vacuum evaporator (i.e., an evaporation chamber equipped with a heat source, a vacuum pump used as a source of vacuum and a condenser to collect the distillate). Vacuum evaporators also have an inlet (from which the contaminated mixture is introduced in the evaporation chamber) and an outlet from which the concentrate is extracted after the treatment.

To improve energy efficiency, vacuum evaporators can integrate ancillary units for heat transfer and recovery, such as the one schematically represented in FIG. 2.

In the example illustrated in FIG. 2, the evaporation and condensation steps are carried out in the same treatment chamber, therefore under the same operating conditions (pressure, pH, etc.). Therefore, evaporation and condensation are mostly governed by temperature variation. Hence, the requirement of a primary heating/cooling circuit integrated in the treatment chamber. A secondary cooling circuit could also be present in a vacuum evaporator, to recover heat from the condensate. This step is particularly important to optimize process economics since it allows the recovery of the latent heat of evaporation, which for water is substantial (2257 kJ/kg), as shown in Table 1.

TABLE 1

| Latent heat of vaporization (or evaporation) for various molecules | | |
| --- | --- | --- |
| | Latent heat of Vaporization (kJ/kg) | Boiling point (° C.) |
| Oxygen | 214 | −183 |
| Mercury | 286 | 357 |
| Ethyl Alcohol | 857 | 79 |
| Water | 2,257 | 100 |

Vacuum evaporators can be configured in various ways, depending on the process objectives and trade-off between CAPEX and OPEX. For instance, more OPEX-efficient configuration can be obtained in heat recovery mechanisms are included in the process, as illustrated in FIG. 3. An alternative embodiment of commercially available vacuum evaporator is represented by multi-stage (or multi-effect) systems, such as the one schematically illustrated in FIG. 4.

In a vacuum evaporator, the feeding, evaporation and evacuation rates of the contaminated mixture, the condensate and the concentrated mixture, respectively, have the mere function of fluid transport and dewatering. Due to the fact that a vacuum evaporator is only promotes the single function of dewatering of a contaminated mixture, the latter is one of the several processes used, in series, to achieve complete sludge treatment.

Vacuum evaporators are not used in combination with biochemical processes to treat water streams for purification or to remove contaminants. For example, in conventional municipal wastewater and commercial wastewater treatment plants, sludge or other biosolids streams are treated with bacteria to biochemically react with the solids to make the stream safer. The stream is then typically dewatered in subsequent steps by centrifugation, and the dewatered portion can be used for fertilizer and other products.

SUMMARY

The methods and systems described herein can provide substantially improved processes for treating fluids such as biofluids that can enable advantages such as much longer retention times, lower volume treatment chambers, higher quality process streams, reduced waste, recoverable products, among others.

In one aspect, this disclosure provides a method for treating a fluid that includes a particulate fraction and a soluble fraction. The method includes biochemically transforming solids in the particulate fraction of the fluid with microbes while simultaneously subjecting the fluid to a vacuum pressure, and evaporating off at least a portion of the soluble fraction of the fluid and thereby thickening a remaining portion of the fluid. A residence time of the particulate fraction can be controlled to be at least 25% greater than that of a residence time of the soluble fraction.

In another aspect, this disclosure provides a method for treating a wastewater fluid that includes biosolids. The method includes feeding the wastewater fluid to a treatment chamber, biochemically transforming the biosolids in in the treatment chamber with microbes while applying a vacuum pressure to the treatment chamber, and evaporating off at least a portion of the wastewater and thereby thickening a remaining portion of the wastewater that remains in the treatment chamber. A total solids content of the remaining portion of the wastewater can be controlled to be in a range of from 4% to 99%.

DETAILED DESCRIPTION OF EMBODIMENTS

Overview

Figure 1:
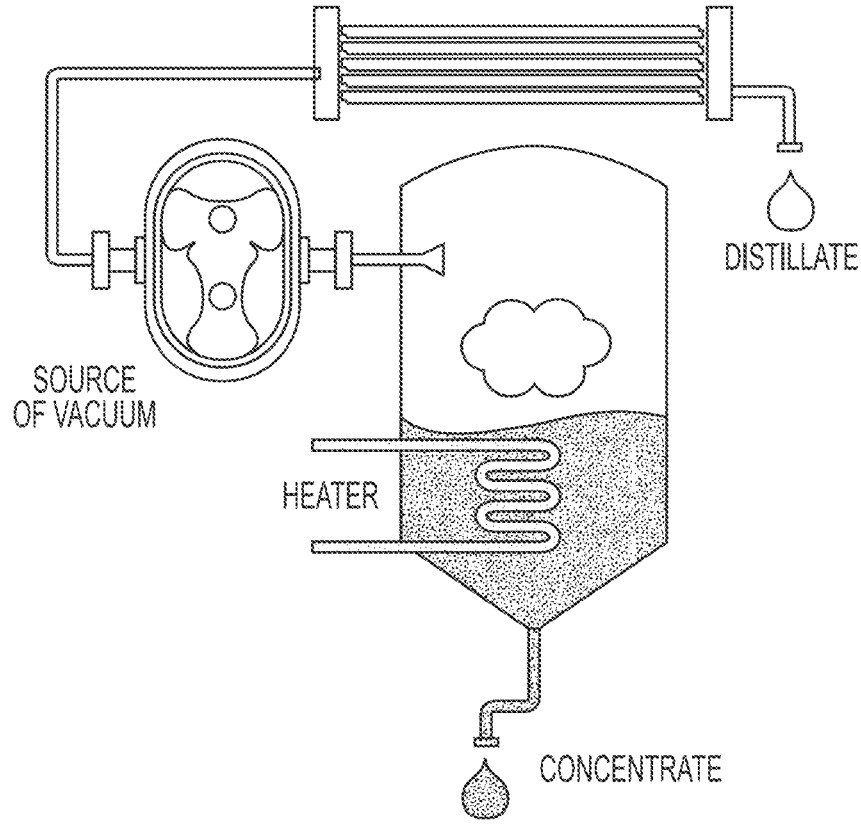
FIG. 1 is a schematic diagram of a vacuum evaporator.
Figure 2:
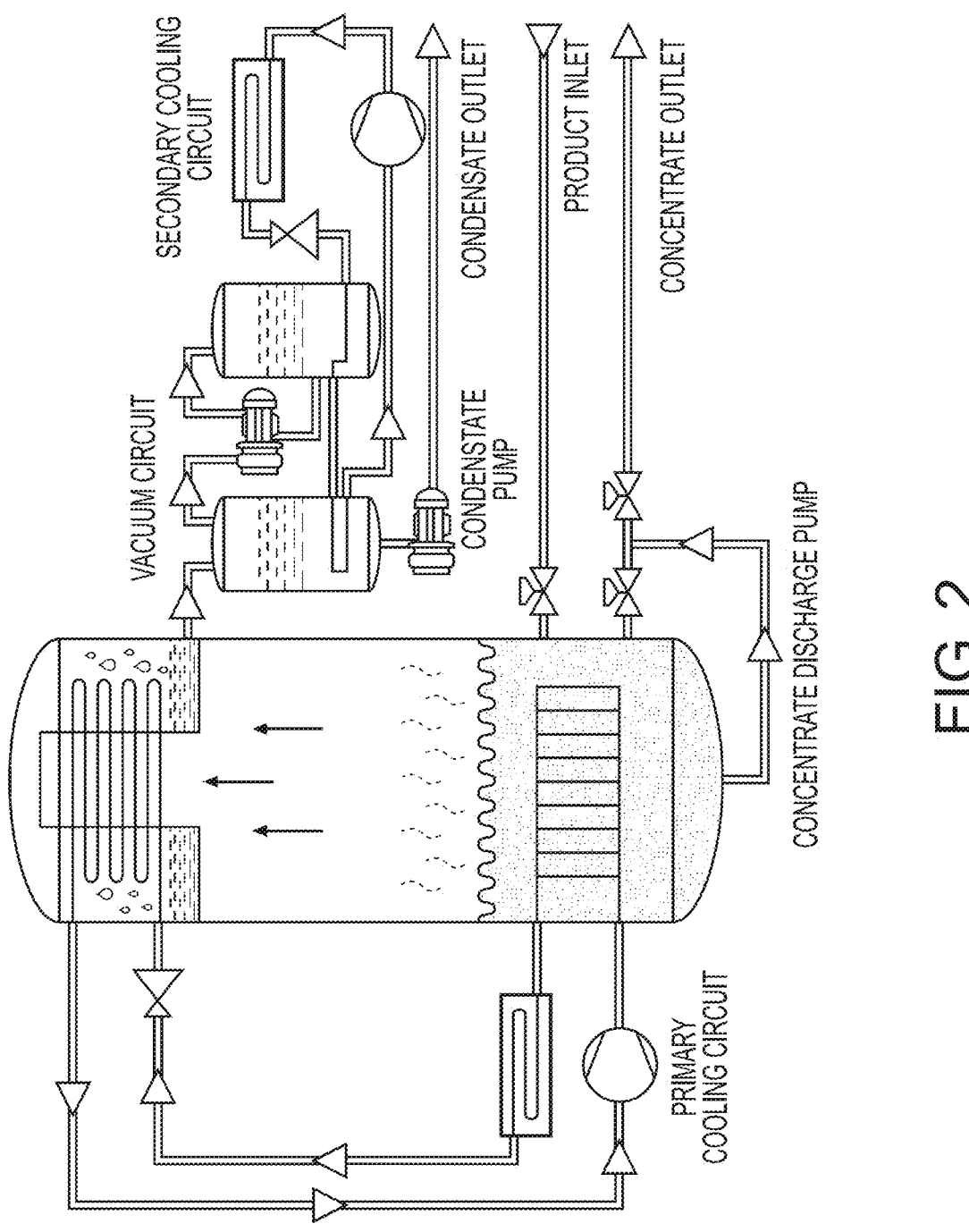
FIG. 2 is a schematic diagram of a typical flow diagram of a vacuum evaporator.
Figure 3:
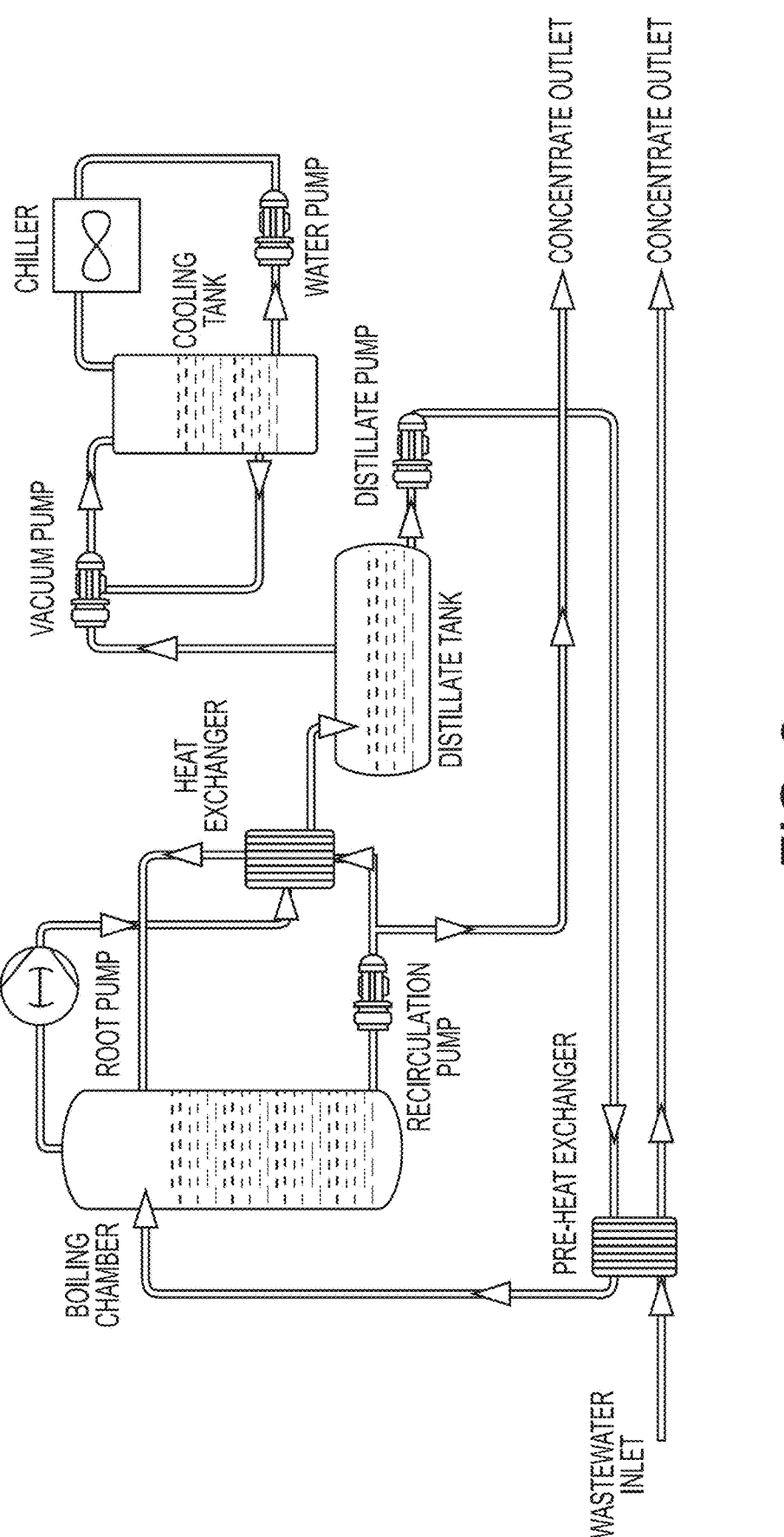
FIG. 3 is a schematic diagram of a single stage vacuum digestion technology with heat recovery systems.
Figure 4:
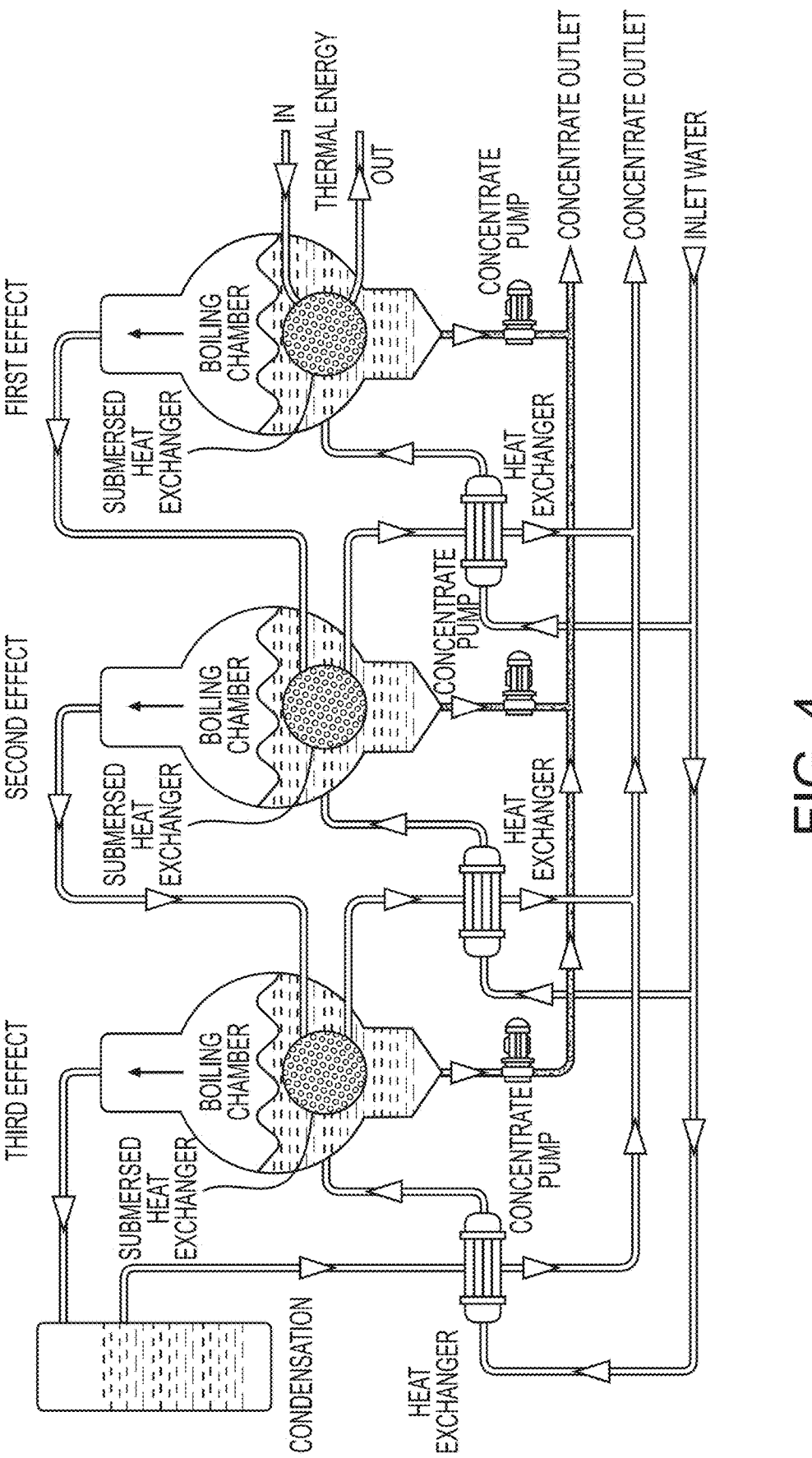
FIG. 4 is a schematic diagram of a multi-stage configuration for a vacuum evaporation technology.

The vacuum bioprocess methods and systems described herein can treat fluids such as contaminated mixtures having a soluble fraction and a particulate fraction, and are applied to the mixture to extract or to concentrate contaminants or valuable components from the fluids. The soluble fraction of the fluid can include one or more soluble fractions with different propensities to volatilization. In one aspect, the feed can include any type of biosolids, e.g., wastewater treatment biosolids (primary and biological treatment biosolids), organic fraction of municipal solid wastes, food wastes, organic industrial wastes, and agricultural wastes e.g. animal manure, bioethanol industry wastes, etc., and includes soluble and particulate organics. The feed may also include ionic fluids that have been used to extract contaminants or valuable components.

The methods and systems described herein can employ microbes to biochemically treat a contaminated mixture, which includes a soluble fraction and a particulate fraction, under a vacuum to produce an evaporated portion and a fermentate/digestate portion. The biochemical treatment can include one or more biochemical processes that biodegrade the biosolids including hydrolysis, acidogenesis (e.g., fermentation), and methanogenesis. Additionally, methanogenesis can be controlled to favor the formation of biohydrogen and/or bioethanol rather than biomethane.

These processes break down solids and convert them to soluble components and can produce biogas such as hydrogen, hydrogen sulfide, methane, and nitrogen. The biochemical treatment can occur from microbes that are present in the contaminated mixture and/or the system can be inoculated with microbes to perform the biochemical treatment. As explained below, because the vacuum bioprocess enables significantly increased retention times, these processes are much more effective at biodegrading biosolids as compared to conventional digesters. This enables a process that produces relatively more products (biogas, fertilizer, etc.) and a much smaller volume of sludge as compared to conventional processes.

In one aspect, the treatment disclosed herein includes a method that can be carried out with the following steps:

Extraction and transport of the contaminated mixtures from the mixture-producing units to a treatment chamber;

Thickening of the contaminated mixtures in the treatment chamber;

Biochemical and physico-chemical degradation of the contaminated mixtures in the treatment chamber, assisted by negative pressure (i.e., vacuum);

Dewatering of the contaminated mixtures in the treatment chamber by removing water and soluble fractions as evaporate;

Discharge, reuse and disposal of the contaminated mixtures from the treatment chamber; and Discharge, reuse, and disposal of condensate from distillate and produced biogas.

These processes can be applied to one or more contaminated mixtures, either sequentially (in time and/or in space) or simultaneously. They are typically carried out in a treatment system comprising of the following components: one or more pumps, one or more valves, one or more inlets, one or more heat treatment chambers, one or more heat sources, and one or more outlets, for example. One or more heat exchangers can be used to preheat the feed stream, heat the concentrated sludge at the outlet, or recover heat from the evaporate. One or more dewatering devices, such as a centrifuge, can also be used to further dewater the concentrated sludge that is produced at the outlet.

Fluids such as contaminated mixtures can be introduced, by using the one or more pumps, into the one or more treatment chambers by one or more inlets and one or more valves. The one or more soluble fractions can be removed from the one or more treatment chambers using the one or more outlets and the one or more pumps. The one or more outlets have the function of collecting the one or more evaporated fractions of the one or more contaminated mixtures using the one or more pumps generating negative pressure. The residence time of the soluble fractions in the treatment system can be controlled by using the one or more valves operating under negative pressure (vacuum). The remaining one or more outlets can be optionally used, with the one or more pumps, to control the residence time of the one of more particulate fractions of one or more contaminated mixtures, and to send the treated contaminated mixture to further treatments.

As described below, the residence time of the particulate fraction can theoretically be controlled to be infinite, and practically can be at least at least 0.5 days (e.g., 0.5 to 25,000 days), at least 5 days, at least 10 days, at least 15 days, at least 25 days, at least 50 days, at least 75 days, at least 100 days, from 80 to 400 days, from 100 to 200 days, or from 110 to 160 days. The residence time of the soluble fraction can be controlled to be less than 10 days, less than 4 days, or less than 2 days, for example. The residence time of the particulate fraction can also be controlled to be at 25% greater than that of a retention time of liquid in the soluble fraction, or at least 50% greater, at least double (100% greater) and preferably at least four times, eight times, or 15 times the retention time of the liquid in the soluble fraction. As used herein, the residence time of the particulate fraction can be calculated by dividing the working volume of fluid in the treatment chamber (i.e., the volume occupied by the fluid) by the volumetric rate of removal of fermentate/digestate. The residence time of the soluble fraction can be calculated by dividing the working volume of fluid in the treatment chamber (i.e., the volume occupied by the fluid) by the volumetric rate of removal of condensed evaporate and uncondensable gases. And, consistent with this disclosure, "fluid" refers to the fluid having the particulate and soluble fractions, such as a contaminated mixture.

The method and systems can enable remediation of a contaminated mixture (made of soluble and particulate fractions) where three (or more) process rates can be simultaneously (in space) or sequentially (in time) controlled and optimized: (a) rate of biochemical activities among and within the liquid, the solid and the gaseous fractions, (b) rate of mass transfer among and within the liquid, the solid and the gaseous fractions, (c) rate of retention of the particulate and non-volatile fractions of the contaminated mixture in the treatment system. Additionally, other rates such as the rate of crystallization and/or the rate of physico-chemical processes (solids hydrolysis, solubilization, evaporation, volatilization, etc.) can also be enhanced.

The vacuum used herein can be operated so the treatment chamber is from 1 to 999 mbar, from 10 to 750 mbar, from 50 to 500 mbar, from 100 to 400 mbar, or from 200 to 300 mbar. This vacuum pressure can be achieved by using a vacuum pump. The vacuum can be applied intermittently, including periodically, so that the treatment chamber has periods where the fluid is being biochemically treated under vacuum pressure and periods where the fluid is being biochemically treated at greater than vacuum pressure. The treatment can occur so that the fluid is treated at pressures greater than vacuum pressure for a duration that is equal to or longer (e.g., 1 to 100 times longer, 2 to 50 times longer, or 4 to 25 times longer) than the periods at which the fluid is treated at a vacuum pressure.

The vacuum pump can be controlled by an automatic controller that maintains the treatment chamber at the desired pressure, shuts off the vacuum at desired times (e.g., based on the amount of condensate collected), etc. The temperature can be in the range from 10 to 90° C., from 20 to 80° C., from 30 to 70° C., or from 40 to 50° C. The vacuum pressure can be controlled so that the treated fluid boils in these desired temperature ranges. The treatment chamber can be heated by any suitable means, such as using heated streams from other parts of the plant or using an electrical heat element. The pH of the fermentate/digestate can be maintained in the range of from 4 to 9, 5 to 8 or 5.5 to 6.5, for example. As explained in more detail below, flash pH or temperature adjustments can be made during the process to concentrate desired chemicals in either the evaporate or the fermentate/digestate.

The optimal conditions for the biochemical and physico-chemical processes to simultaneously occur must be carefully considered. As a matter of fact, the integration of such process can only occur when the rate and the timescale of the biochemical processes are made comparable, by manipulating the physico-chemical variable of the physico-chemical processes, with the rate and timescale of the physico-chemical processes. For example, while a typical retention time of the soluble fraction in a vacuum evaporator is in the order of 1-10 hour, to enable biochemical reactions (e.g., particulate hydrolysis, biomass synthesis, etc.), the retention time of the particulate fractions and microbial cells must be considerably longer than that (e.g., >10 hours). This can be accomplished by using the evaporation process as a means to decouple particulate fraction retention time from soluble fraction retention time, and further to decouple particulate fraction retention time, liquid non-volatile retention time, and liquid volatile retention time. To achieve optimal performance, one or more variables such as temperature, pH, pressure, mass-transfer, microbial communities, nutrients, and particulate fraction retention time can be simultaneously taken into account and controlled.

Figure 5:
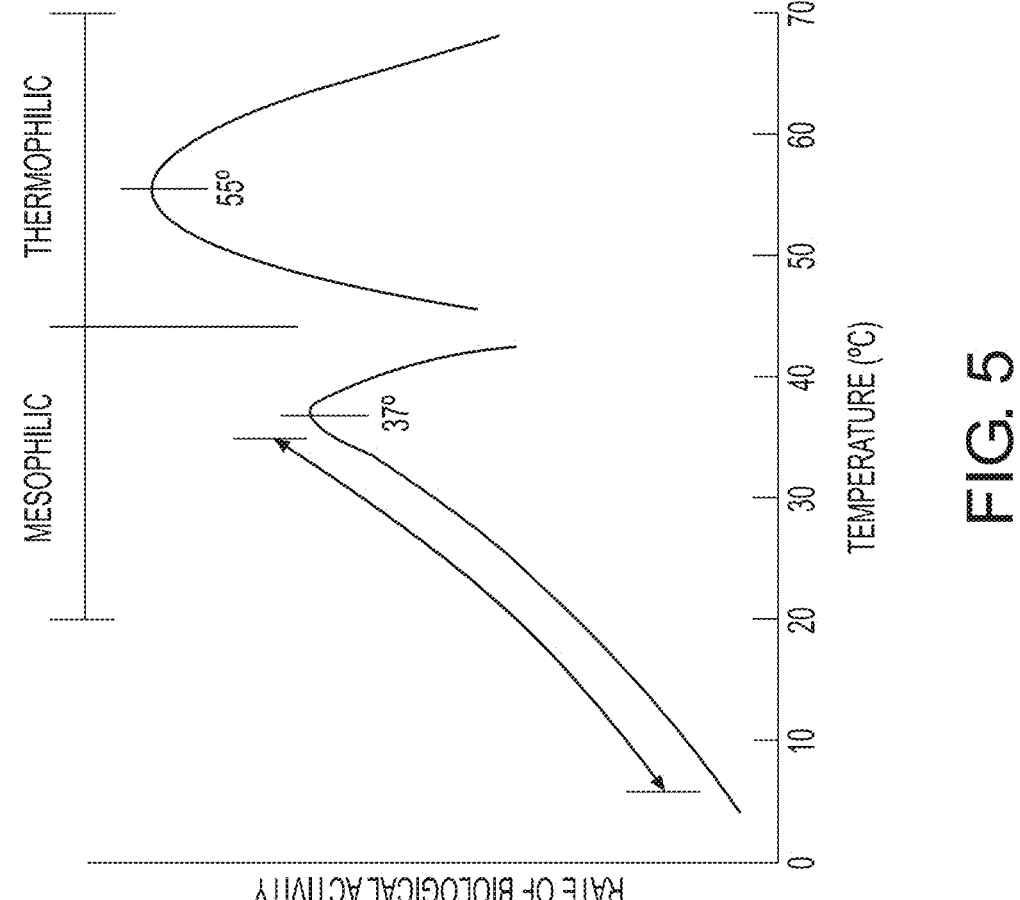
FIG. 5 is a graph illustrating the dependency of the rate of biological activity on temperature.

FIG. 5 shows how temperature can strongly influence the rate of biochemical activities; more specifically, temperature>70 C are reported to have strong inhibitory effects on thermophilic rates, which considerably drop above such temperature threshold. This consideration prevents the coexistence of bubbling regime and maximum thermophilic activity at pressure equal or greater than one atmosphere. However, passive mixing by boiling is a very efficient means to enhance mass transfer. To overcome this limitation, a vacuum (negative pressure) or partial vacuum is applied to reduce the boiling point of the contaminated mixture (mostly dominated by water in real application) to values that are optimal for mesophilic (30-45 C), thermophilic (45-70 C) or hyper-thermophilic (70-100 C) microbial communities.

By doing so, the turbulent conditions associated with the bubbling point and the subsequent enhancement of convective mass transfer maximized the rate of biochemical reactions. Moreover, the evaporation, enhanced by vacuum, drastically reduces the time required to free up part of the volume occupied by the contaminated mixture, which in turns leads to the following important benefits: (1) it allows the introduction of new feed into the system without evacuating the contaminated mixture from the treatment chamber and (2) allows for the full decoupling of retention time of the soluble fractions (i.e., water plus volatile compounds) from the particulate fractions (solids of the contaminated mixture).

Figure 6:
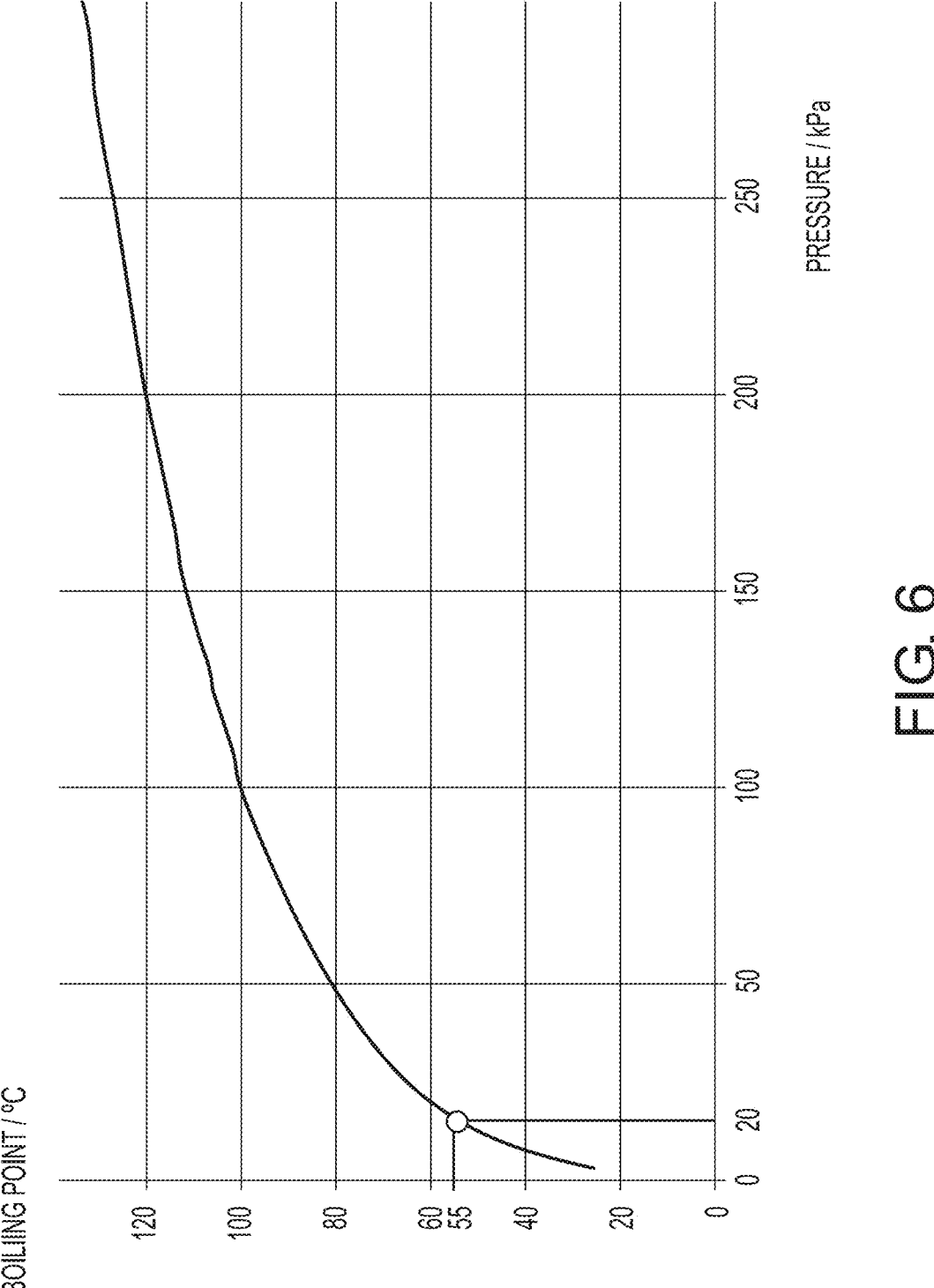
FIG. 6 is a graph illustrating the pressure-temperature dependency of the boiling point of water.

Consider a system that must be designed to simultaneously optimize biochemical activities by methanogenic microbial communities (requiring a minimum of 3 days to perform the biochemical transformation of organic particulate into biomethane) and mass-transfer at thermophilic conditions. Based on FIG. 5, we must size a system where boiling can occur at approximately 55 C. As such, FIG. 6 shows that we must select a negative (vacuum) pressure of approximately 20 kPa (or 200 mbar) in order to obtain bubbling at 55 C. Moreover, we should retain into the treatment chamber a sufficient amount of particulate fraction such that the average retention time of the particulate fraction is equal or greater than 3 days. This would allow us to calculate the rate at which the concentrated fraction must be evacuated from the system and the size of the treatment chamber too. Finally, an optimal organic loading must also be met in order to ensure that the microbial community thrives under ideal environmental conditions. This will inform us about the rate of evaporation we must establish in the system as well as provide a second constrain for the size of the treatment chamber to be selected. In this regard, due to the ability to substantially increase the retention time with the vacuum bioprocess described herein, the size of the treatment chamber can be significantly smaller than in conventional digesters, e.g., perhaps having a volume that is smaller by a factor of 4 or more.

The methods and systems described herein can enable the selective removal of the one or more soluble fractions from the treatment chamber by vacuum evaporation, which enables the efficient decoupling of the retention time of the one or more soluble fractions from the retention time of the one or more particulate fractions. This way, using vacuum as the main mechanism for removing mass and free up volume in the treatment chamber, it is possible to keep the one or more particulate fractions in the treatment chamber for a theoretically infinite period of time, due to their relatively insoluble and non-volatile physico-chemical characteristics. Therefore, the one or more particulate fractions will not be collected in the condensate, keeping the condensate exceptionally pure and nutrient-free.

The methods and systems described herein can also enable the ability to load new aliquots of the contaminated mixture in the treatment chamber without having to unload corresponding aliquots of the previously-loaded of the one or more contaminated mixtures. This is enabled by the use of vacuum-evaporation-assisted bioprocesses where the removal of mass and volumes can be obtained by evaporation, a process that is able to selectively remove the one or more soluble fractions from the one or more contaminated mixtures while retaining the one or more particulate fractions in the system (typically, not removable by evaporation due to its physico-chemical characteristics and lack of volatility). The ability to control the ratio of removal of the volume of soluble fractions extracted by vacuum evaporation and the volume of concentrate mixture in the chamber by pumping allows the ability to control the retention time of the solids since a portion of the volume of the fermentate/digestate can be intermittently or periodically removed, and has significant advantages with respect to the ability to control the composition of the fermentate/digestate as discussed in greater detail below.

There are several differences between the well-established technology of vacuum evaporation (briefly reported in the previous section) and the novel treatment method and system disclosed in this document—(1) the methods and systems of this disclosure integrate biochemical and physico-chemical reactions in the same vessel, whereas traditional vacuum evaporators merely remove water; (2) the methods and systems of this disclosure enables an operator to carefully select and control the rates of feeding to the vessel, rates of evaporation, and rates of evacuation, which allows biochemical and physico-chemical reactions to occur together with the characteristics processes of a vacuum evaporator; (3) The optimal process conditions of a vacuum evaporation process are clearly distinct from the ones required in the invention disclosed in this document. As a matter of fact, optimal vacuum evaporation conditions are exclusively dictated by the physico-chemical characteristics of the contaminate mixture from which the water has to be removed; in this case, the use of vacuum and temperature are selected to merely accelerate such dewatering process; in the disclosed invention, the optimal vacuum and temperature conditions are selected based on the optimization of biochemical pathways and reactions, which indeed depend on the microbial ecology and environmental conditions established in the treatment chamber; and (4) the systems and methods of this disclosure integrate, in a multifunctional system, the functions of transport, pre-thickening, fermentation, bioconversion, post-thickening, dewatering, recovery and residues disposal. These functions are performed in several separate processes in series in a conventional vacuum evaporator.

System Configurations

Figure 7:
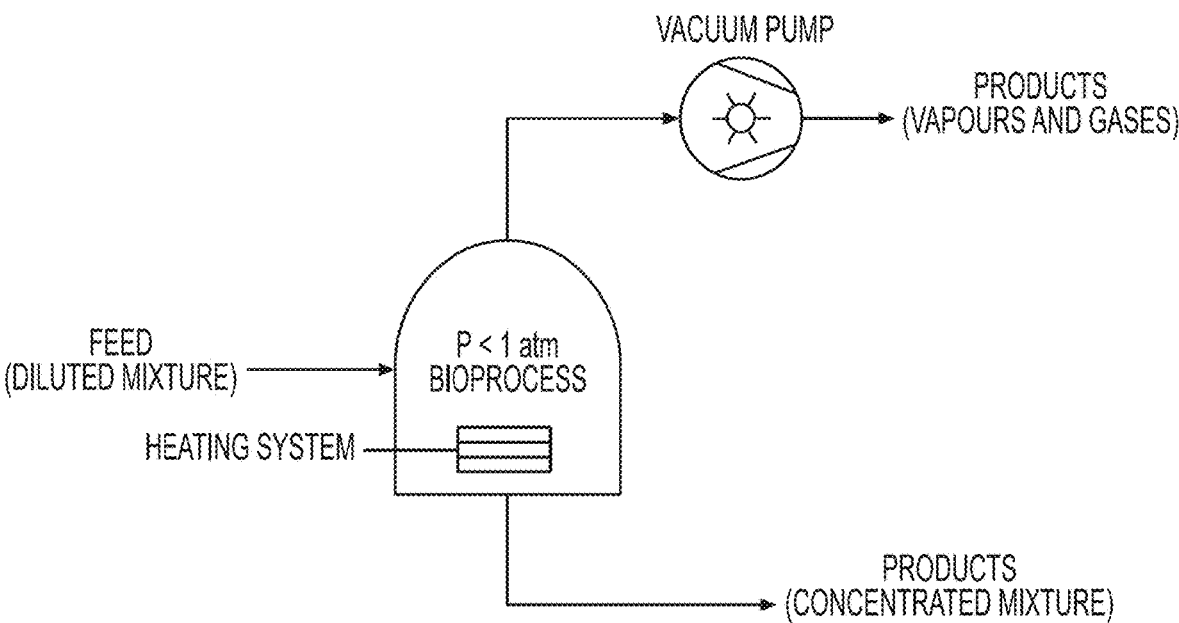
FIG. 7 is a schematic diagram illustrating one embodiment of a process configuration of the invention.

FIG. 7 illustrates one example of a process configuration that can be used in connection with the invention. By extracting mass from the treatment chamber, mostly in the form of evaporated soluble or volatile compounds, using vacuum evaporation, an effective means for extending the residence time of the particulate fraction for an indefinite and theoretically infinite period of time is disclosed. As such, an effective means for decoupling the hydraulic residence time of the soluble fraction (HRT of the soluble component of the contaminated mixture) from the hydraulic residence time of the particulate fraction (HRT of the particulate component of the contaminated mixture, or SRT) using evaporation under vacuum can be also disclosed. From a biochemical process perspective, the possibility of treating the particulate fraction for arbitrary and theoretically infinite amount of time enables this technology to achieve the highest yield of biodegradation theoretically possible (which, indeed, coincides to an infinite treatment time of the particulate fraction of the contaminated mixture).

Figure 8A:
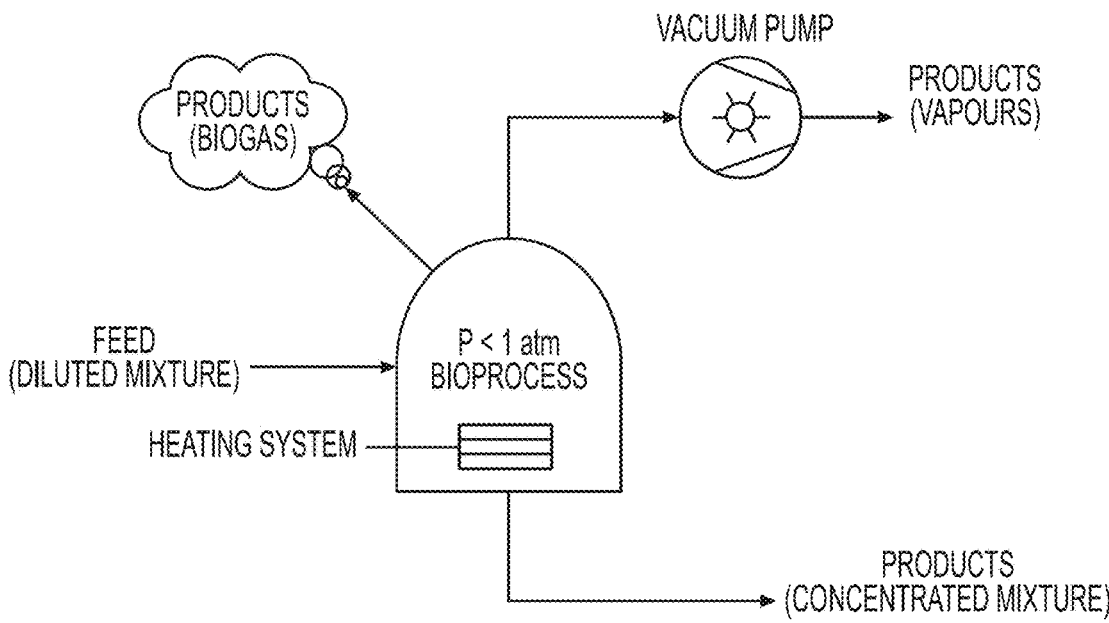
FIG. 8A-8B are schematic diagrams illustrating process configurations of the invention.
Figure 8B:
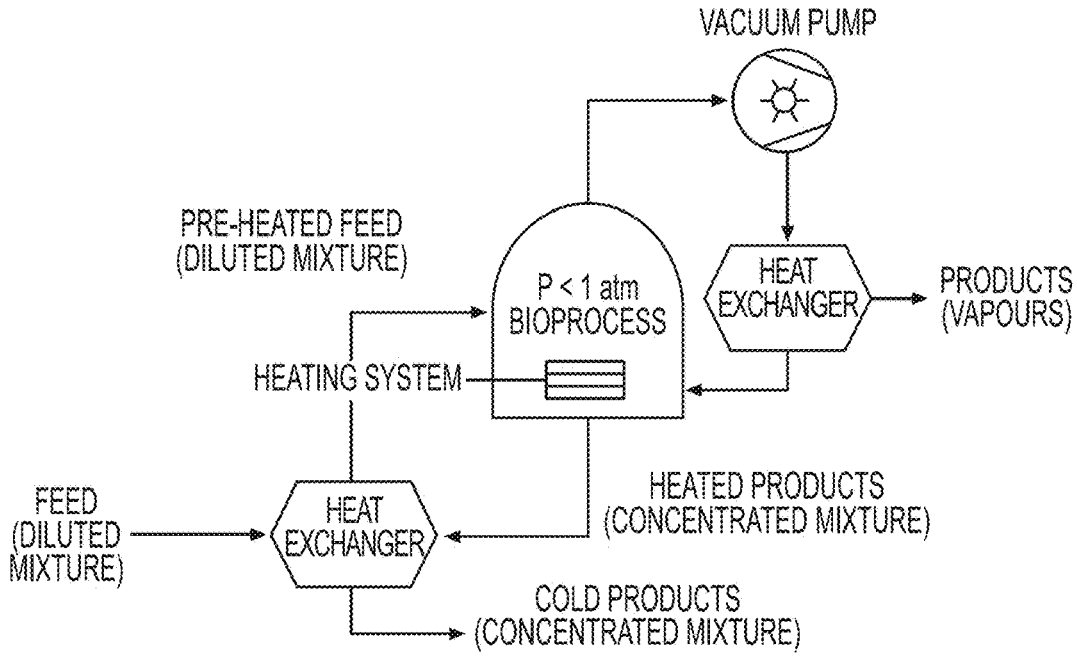

FIGS. 8A-8B illustrates alternative embodiments of process layouts. The removal of the mass from the system in the form of gaseous and condensable products enables the function, of the disclosed treatment system, of thickening and dewatering in the same treatment process, as well as the use of this technology a semi-continuous or semi-continuous treatment system. As a result, the treatment method and system disclosed herein can carry one of more of the following functions and processes, simultaneously or in any sequential order: (a) transport to treatment chamber, (b) pre-thickening, (c) biological treatment, (d) post-thickening, (e) in-situ chemical treatment and conditioning, (f) dewatering, (g) recovery, (h) washing, (i) disposal. Therefore, another inventive aspect of the current method and treatment system consists of the integration, in a single treatment system, of multiple processes otherwise carried out using several treatment systems in series.

Figure 9:
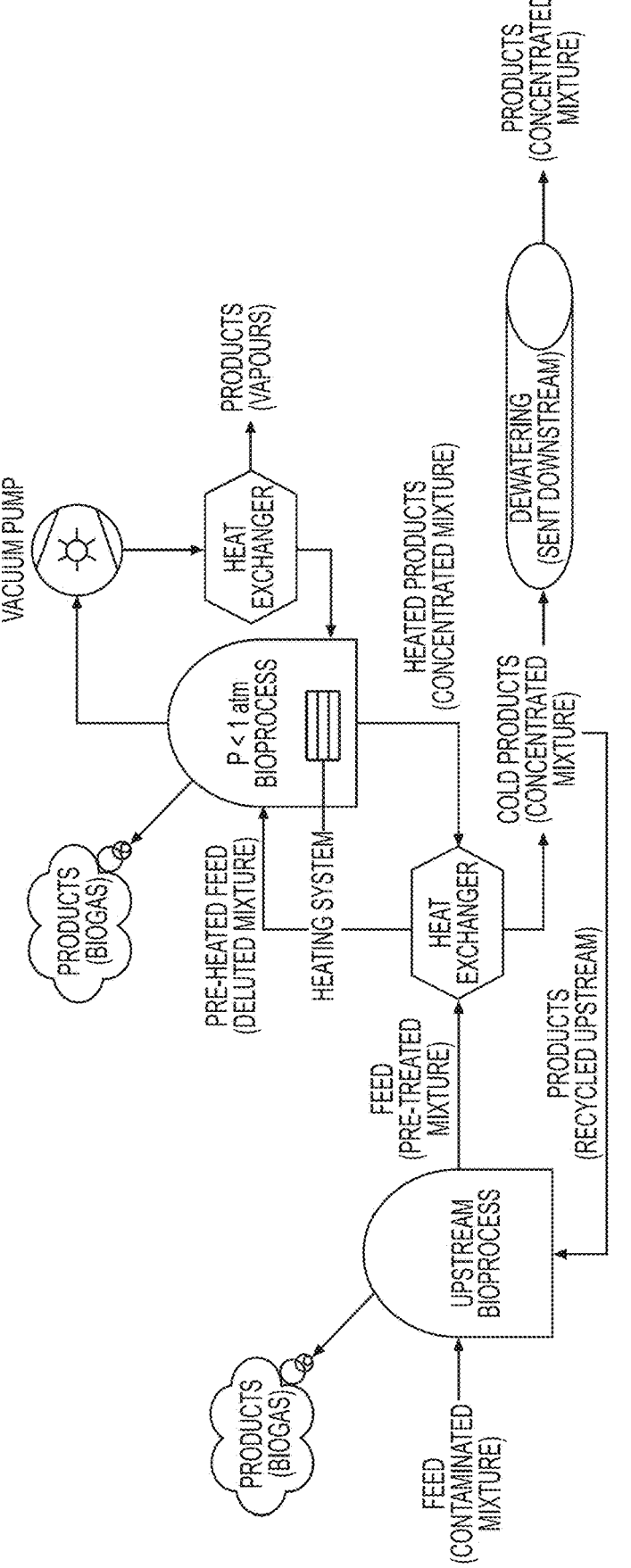
FIG. 9 is a schematic diagram illustrating one embodiment of a process configuration of the invention that is integrated with an existing bioprocess.

The disclosed embodiments can be integrated in existing process schemes. FIG. 9 illustrates, by way of example, the integration of the vacuum bioprocess of one embodiment of the invention in a typical plant dealing with municipal sludge and biosolids. More specifically, in the case represented in FIG. 9, the process of this embodiment has been used in a configuration also known as "recuperative thickening," which includes separation of the particulate fraction of the anaerobic digestate coming from an upstream bioprocess (e.g., anaerobic digestion process in this example), followed by the recycling of a portion (between 0 and 100%) of the concentrated stream (indicated in the figure as "cold products" back to the anaerobic digestion state (indicated in the figure as upstream bioprocess). The intent of this process is to increase and control the particulate retention time (or SRT), with the goal of improving the biochemical conversion of the feed into products. In other embodiments, the vacuum bioprocess could be located entirely upstream of the anaerobic digester or entirely downstream of the anaerobic digester, and the digester could be an aerobic digester.

In a different embodiment of the current invention, a volatile liquid with a boiling point lower than water (for example, ethanol, which—at 1 atmosphere pressure—boils at 78.37° C. as opposed to 100 C for the case of water) could be intentionally added to the feed (i.e., the contaminated mixture) or to the treatment chamber with the intent of enhancing particle hydrolysis, recovered as condensate, and recycled back to the feed or the treatment chamber for an arbitrary number of cycles.

In another embodiment of the current invention, a solid or non-volatile catalyst is introduced to the feed and/or to the treatment chamber, and retained in the system an arbitrary number of cycles thus exploiting the distinctive feature of this treatment method of allowing the particulate fractions (in this case, the catalyst) to be retained in the treatment system for an arbitrary and theoretically infinite amount of time. Such catalyst could be, for example, a solid acid such as synthetic zeolites (zeolites ZMS-5, ZSM-11, etc.), synthetic silica-alumina, an oxide mixtures, an inorganic chemicals, such as metal oxides, sulfides, sulfates, nitrates, phosphates, and halides. The catalyst could also be a heteropoly acid or a solid base such as hydrotalcites, basic zeolites and organic bases attached to mesoporous silicas.

Benefits

Embodiments of the invention can enable one or more benefits in connection with (A) improving nutrient management and recovery of value-added products; (B) advanced solids destruction and reduction in sludge volume; (C) enhancements of process performance and superior product integration; (D) superior sludge quality; (E) mitigation of typical issues encountered to anaerobic bioprocesses; and/or (F) enhancement of microbial communities. Each of these potential benefits is explained below.

(A) Improving Nutrient Management and Recovery of Value-Added Products:

Reducing/eliminating recycling of nutrients to main stream—Unlike other conventional anaerobic digestion processes, where the digestate is dewatered and the ammonia and phosphorous rich liquid stream from dewatering is returned to the liquid treatment train, the vacuum-digestion can regularly produce a condensate that is not only free of solids but also low in nutrients. This condensate does not require any further treatment and hence need not be recirculated back to the liquid treatment train. Occasionally when flash heating or pH adjustment is practiced, the condensate may be rich in ammonia, which if not recovered, will be recycled back to the liquid treatment train.

Advanced nutrients control in the waste and condensate streams by in-situ and ex-situ chemical and biochemical treatment—Nutrients such as ammonia and phosphorus are not volatile at certain thermodynamic conditions, for example pH=6-7 and T=20-70 C. Therefore, using the technology disclosed in this invention, nutrients will accumulate in the treatment chamber rather than being discharged in side-streams. Before discharging the process residues rich in nutrients, chemical and/or biochemical treatment can be applied to the highly concentrated mixture to facilitate extraction of soluble or particulate components. For example, for the case of phosphorus, $H_2O_2$ and/or iron can be applied to induce precipitation of the soluble phosphorus in the solids. And by varying pH and temperature, ammonia can be directed to stay in the liquid form as ammonium ion or in the gas phase as ammonia gas (which could also be recovered from the gas, for example as ammonium sulfate by bubbling the ammonia-rich gas phase in a sulfuric acid bath).

Recovery of one or more value-added products from the residues accumulated in the system—Many value-added products potentially present in wastewater and biosolids (precious metals, nutrients, cellulose, coagulants, pharmaceutical compounds, personal care products, etc.) are non-volatile and would tend to accumulate in the treatment system, thus facilitating the extraction and further purification to high-purity chemicals. In a conventional anaerobic digestion process, the efficiency of the process and the quality of the biosolids produced is mainly due to the biological activities. In this process, a new biosolids with high quality will produced because of many factors such as combined biological, thermal and mechanical processes. In addition, separating portion of the water and extracting volatile compounds by vacuum will produce new solids not only rich in nutrients and/or high solids content but also with new compositions.

Selective concentration and recovery of value-added materials such as cellulose—The possibility of operating vacuum-based digestion without regularly removing solids from the system allows the technology to be operated for an optimal period of time and under optimal thermodynamic conditions. Such optimal time and operating conditions could be selected to maximize the accumulation of certain compounds, such as cellulose, with the aim of recovering the accumulated material. The same concept can be applied to other valuable products such as nutrients, microbial products, precious metals, etc.

Selective concentration of volatile fatty acids and ammonia products using flash heating and flash pH adjustments in conjunction with temperature and vacuum—Volatile fatty acids and ammonia, are valuable products of anaerobic digestion. In conventional digesters, which have continuous feed entering and digestate leaving the digester, the VFA and ammonia concentrations in the digester do not accumulate to high concentrations. In this process, because of the lack of digestate and discontinuous condensate, the concentrations in the digester reach much higher levels than in conventional digesters. When the VFA and ammonia reach high levels, flash heating and/or pH adjustment with vacuum can facilitate the recovery of high purity condensates rich in VFA and/or ammonia.

Recovery of fertilizers by dosing chemicals in a vacuum-based and temperature-assisted digestion process—As a result of the extremely long SRT in the process, the biosolids are expected to be fully stabilized i.e. Class A biosolids. In this process, once the biosolids reach complete stabilization, chemicals such as potassium, can be precisely dosed to achieve the desired NPK (nitrogen:phosphorous:potassium) ratio for commercial-grade fertilizers. In contrast to a conventional digester, even if it has the same stabilization efficiency as the vacuum-based digester, the chemical dosing system has to be continuously operated.

Fractionation and selectively extraction of gases and volatile compounds from a biosolids treatment process—The gasses and volatiles produced in the digester have varying vapor pressures which, due to the cyclical nature of the vacuum evaporator operation, can be more or less removed by deploying sequential vacuum gradients, resulting in the partially-selective removal and condensation of volatiles.

Recovery of value-added products from a cake using ionic fluids—Ionic fluids, due to their ease of separation and recovery, are increasingly being used in petroleum and chemical processing to extract contaminants or valuable components from complex mixtures. By concentrating non-volatile solids into a concise volume, this invention enables the economic use of ionic fluids to recover value-added products e.g., extracellular polymeric substances (EPS)-type materials for commercial use, or to extract/remove e.g., hydrophobic contaminants such perfluorocarbon and micro-plastic materials.

Selective control of stripped gases to control products— The application of vacuum can enhance the stripping of dissolved anaerobic digestion gases from the reactor, including carbon dioxide, hydrogen, ammonia, hydrogen sulfide, among others. The stripping/removal of these different gases impacts a number of aspects related to the digester, both directly and indirectly including: (1) removal of carbon dioxide (an acid gas) causes the sludge pH to rise. In this way, the digester pH can be controlled to where production of volatile fatty acids is maximized; otherwise, pH tends toward over-acidification to where production of alcohols and ketones are favored (solventogenesis); (2) removal of hydrogen (a key component for methane production) causes a shift toward fermentative microbes (acid-formers). This causes VFA levels accumulate and methane production to slow down; (3) hydrogen is also needed by sulfate-reducing bacteria, and so removal of hydrogen reduces the rate of hydrogen sulfide generation. Removal of hydrogen sulfide (a metal-binding agent) frees up essential micronutrients (iron, cobalt, nickel) for exocellular production of hydrolytic enzymes, and so accelerates the fermentation process; (4) Removal of ammonia (a microbial inhibitor) prevents its accumulation in the reactor, allowing long solids retention times without experiencing inhibited methane production; (5) Removal of volatile fatty acids (an important supplemental carbon source) prevents its further conversion to methane in the reactor, allowing its recovery to support plant processes such as biological phosphorus removal and denitrification. Thus, by controlling the pH, temperature, and vacuum, certain of these gases can be made more or less volatile so that they are more or less selectively removed from the reactor. Thus, the above described advantages can be selectively controlled.

(B) Advanced Solids Destruction and Reduction in Sludge Volume:

Efficient solids separation enabling advanced control of the solids concentration in a treatment process, with consequent volumetric waste minimization, and higher solid cake from downstream dewatering processes—Evaporating soluble fractions from the contaminated mixture is an efficient separation strategy, since particles are retained with high efficiency (>90%) in the reactor vessel and non-volatile components are concentrated in the digestate. In parallel, soluble and volatile components (water and compounds with boiling point similar to water) can be extracted by evaporation. If such vacuum-based technology is operated and optimized in accordance with biochemical reactions timescales, superior control of particulate solids concentration can be achieved in the treatment chamber. More specifically, this can be achieved by controlling the volumetric ratio of particulates retained in the treatment chamber to the discharged one. Producing minimal volume of wasted particulate (at high concentration) would also logically lead to a lower volumetric amount of disposed biosolids and a more concentrated cake from downstream dewatering processes (i.e. centrifuges). The downstream dewatering treatment can provide a fraction having a total solids content of greater than 20%, greater than 30%, of greater than 50%.

Generation of stabilized and ultra-dewatered biosolids— The vacuum-based bioprocess tends to accumulate inerts and non-biodegradable matter. As such, their concentrations in the system are expected to increase over time. When a desired treatment goal is reached, it is possible to accelerate the dewatering process by extending the length/strength of the vacuum and/or by modifying the environmental variables of the system (temperature, pH, etc.). Thus, ultra-dewatering i.e. high particulate solids concentrations exceeding those typically produced with mechanical separation devices can be obtained.

Optimization of solids concentration and the biosolids conditioning prior to mechanical dewatering—When the vacuum-based separation is used to control solids concentration in the bioprocess, the volume of wasted biosolids is minimal and at much higher particulates concentration than the one typically generated by the conventional digestion processes (10%-15% vs. 2-3%). In this regard, the total solids can be controlled to be in a range of from 2 to 99%, 4 to 90%, 5 to 40%, from 2 to 20%, from 10 to 30% or from 15 to 30%. The solids can be controlled, for example, by adjusting the rate of evaporation (i.e. condensate stream) and the rate of removal of the fermentate/digester from the treatment chamber. For example, in one aspect, a steady state concentration of solids in the chamber can be achieved and controlled by setting a ratio of the rate of feed, rate of condensation, and rate of fermentate/digestate removal. This may be accomplished while enabling the degradation of the solids and the other advantages described herein. The reduced volume and the higher particulate solids concentration is beneficial to mechanical and thermal dewatering processes. Moreover, the digester can be used as treatment chamber for chemical/biological conditioning of sludge with treatment agents (e.g., oxidant, enzymes, reducing agents, acids/based, etc. could be added) prior to downstream dewatering. One or more treatment agents can be added at different times during the treatment process, e.g., each treatment agent can be added more than 2 days apart from each other, more than 5 days apart from each other, or more than 15 days apart from each other, and may be timed such that a solids content of the fermentate/digestate differs at each dosage by more than 0.5% (e.g., a first treatment agent is dosed at a first timing at a first solids content, and a second treatment agent is dosed at a second timing when the solids content is at least 0.5%, 1.0%, or 5.0% greater than the first timing). Alternatively, the treatment agents can be added at the same time as each other.

Elimination of biosolids production and alleviating disposal logistics and cost (trucks traffic, etc.) for a desired and controllable period of time—Vacuum is an effective way of liquid separation from biosolids. This process reduces the biosolids volume by evaporating liquids. In the meantime, accelerated biological and chemical reactions further reduce particulate solids by destruction of mass and conversion to gases. As a result, the system can reach a steady-state with no discharge and disposal of biosolids over a period of time.

Optimization of the cost of biosolids disposal in a treatment process (equalization effect of the technology)—Influent biosolids quality usually varies with respect to types and concentrations of organics, micropollutants, heavy metals, etc. Since digestion primarily impacts the biodegradable organics, the digested biosolids quality also varies, thus impacting disposal options and costs. The vacuum-assisted bioprocess could be operated at various hydraulic loadings and hydraulic retention times (HRT), without affecting the biological performance of the system. As a result, the treatment chamber can be seen as biosolids accumulation and equalization chamber as well. This makes it possible to optimize disposal cost by utilizing the treatment system as an equalization chamber for the treated biosolids without affecting biochemical transformation occurring therein.

Accomplishment of complete degradation and zero particulate solids discharge from the treatment of a contaminated fluid—Using vacuum-based bioprocesses, it is possible to retain a particle in the system for an infinite period of time. Therefore, complete degradation (at time=infinite) of organic matter can be achieved. This would automatically lead to a zero particulate solids discharge process where only the inert fraction accumulates in the system. Inerts can finally be solubilized using acids, bases, solvents, strong oxidizing or reducing agents, and combinations thereof, thus confirming this process viability to produce zero particulate solids as a waste.

Acceleration of biosolids destruction—By applying intermittent vacuum, the removal of liquid from the system and optimal mixing can be achieved. It leads the sludge volume reduction and the acceleration of hydrolysis which can improve particle destruction, respectively.

Concentrated sludge—Because the process results in a concentrated sludge, the sludge is easier to treat to an extent that is not practical in conventional systems, e.g., to destroy residual bacteria, to destroy prions, and to extract microplastics.

(C) Enhancements of Process Performance and Superior Product Integration:

A treatment method able to integrate, in a single vessel and unit operation, of biological and physico-chemical treatment processes and operating at the following conditions: vacuum=0-1 bar/atm; temperature=0-100 degrees C.; pH=0-14; TDS=0-100 grams/L. Even slight vacuum and modestly elevated temperature can create the following biological, physical and chemical phenomena which can provide surprisingly favorable treatment performance. It is believed that the superior performance is due to a combination of factors including (i) the combination of vacuum and temperature resulting in biosolids boiling which promotes mixing of the biosolids; (ii) this combination also resulting in liquid evaporation and separation from the biosolids; (iii) elevated temperatures promoting microbiological activities, such as enhanced growth rates; (iv) elevated temperatures enhancing chemical reaction rates; and (v) elevated temperatures reducing biosolids viscosity which is favorable for mixing and chemical and biological reactions.

Full separation of treatment time (age) of the soluble (and evaporated) component HRT (water and volatile fractions) from particulate (and non-evaporated) components (SRT)—Biochemical reactions, mediated by microbial communities, are governed by mean cell residence time (MCRT) or solids retention time (SRT) rather than fluid age or hydraulic retention time (HRT). In the conventional digestion technologies, the particulate (rich in microbes) and water travel together in the treatment chamber and are characterized by the same liquid and particulate solids age when leaving the system. As such, SRT=HRT. In the methods and systems of embodiments of the invention, the concept of evaporation under vacuum allows the soluble components that are evaporated to have a distinct residence time from the particulate component of the mixture. As such, full decoupling of SRT from HRT is achieved. Moreover, the particulate and non-evaporated fractions that are typically the less biodegradable ones are those which are retained in the system for times longer than the HRT. Such times can be fully controlled by the operator, and therefore full biodegradation can theoretically be achieved.

Treatment of a contaminated fluid using intermittent vacuum operations—Vacuum is only required intermittently to achieve the desired system performance, including liquid separation, solids reduction, contaminant destruction, etc. The degree of vacuum and frequency can be optimized to achieve both contaminant treatment and energy minimization.

Integration, in a single unit treatment process, of multistage processes such as biosolids extraction & transport, thickening, digestion, stabilization, dewatering and nutrient removal—Conventional biosolids treatment processes include thickening, digestion/stabilization, and dewatering, with the ammonia- and phosphorous-rich liquid from dewatering treated to reduce recycled ammonia and phosphorous to the plant, which can constitute 20%-30% of the influent loadings. The vacuum-based digestion process is a single unit process that replaces the aforementioned biosolids treatment train due simultaneous thickening, stabilization, and dewatering of biosolids in the digester, as well as the recovery of the solids-free nutrients rich condensate.

Enhancement of the treatment via modification of the physico-chemical characteristics of a contaminated fluid by in-situ dosing of chemicals under vacuum pressure and temperature—The vacuum-based technology where fluid is moved by evaporation instead of mechanical pumping makes possible the optimal treatment of the particulate residues retained in the system, since the latter constitutes the slowly biodegradable or non-biodegradable fractions of the contaminated fluid. As a result, physical, chemical and biological agents can be injected, when required, to accelerate the degradation of such recalcitrant fractions. This way, the treatment efficiency can be highly optimized since the dosing of the chemical can be done only when required and is not wasted on other fractions not requiring the same.

Selection and enhancement of the microbial consortium as a function of the residual non-degraded contaminants—As the vacuum-based (or evaporation-assisted) digestion process evolves, the slowly biodegradable and non-biodegradable fractions accumulate in the treatment chamber. Therefore, the microbial populations able to degrade such fractions have an opportunity to prevail over the others, which would instead be starved by the lack of readily biodegradable material that has already been converted to end products. As a result, the competition is in favor of slow growing organisms able to thrive on less biodegradable substrates. On the other hand, SRT is a key factor in the microbial consortium and the biodegradability of organic materials. The vacuum (negative pressure) can selectively enrich the fermentative bacteria as they are spore forming bacteria and hinder the growth of the non-spore forming methanogens, as their cellular membrane becomes permeable by the vacuum. By hindering methanogenesis, the volatile fatty acids production will be enhanced significantly. Furthermore, due to the very long SRT, the disintegration, hydrolysis, solubilization, and biodegradability of the contaminants will be considerably enhanced. In another aspect, where methanogenesis is desired, the vacuum, temperature, and/or pH can be controlled to reduce the time required for the sludge to undergo methanogenesis by enabling methanogen populations to selectively thrive over fermentative bacteria. In systems without a vacuum, the sludge will first go through a fermentation stage for at least about 4 or 5 days. But by using a vacuum, methanogenesis can be achieved in less than 4 days including, e.g., 0.25 days, 1 day, 2 days, or 3 days.

Treatment enhancement using recovered heat from a vacuum digestion process to separate components of sludge (such as oil, fat and grease ("FOG")) from the feed—Biosolids that are rich in FOG can be readily preheated using the recovered heat, to solubilize fats and grease, and facilitate the recovery of oils.

Integration, in a single vessel, of vacuum-based digestion with physico-chemical and biological particulate reduction/solubilization technologies including ultrasounds, grinders, hydrolytic enzymes, acid/base, advanced oxidation processes, etc. —The vacuum-based digestion could synergistically work with other well-known methods for enhancing biodegradability, including for example the use of mechanical processes for particulate reduction, the ad-hoc (continuous or intermittent) dosing of chemicals targeting certain fractions of the contaminated mixture (enzymes for proteins and cellulose degradation, acid/base for particle solubilization, grinders and homogenizers for improving mixing via viscosity changes, etc.). Integrated vacuum assisted digestion with ultrasonic will decrease the dissolved gases concentration; enhance the mass transfer; increase the microorganisms' growth rate; and enhance the solubilization of the particulates. Decreasing the dissolved gases concentration is known to enhance the fermentation process. This integrated vacuum-based digestion with ultrasonication is a means for causing a localized pressure in a liquid to drop to below the evaporating pressure in the aqueous phase, which results in the formation of micro-bubbles or cavitation bubbles. During cavitation, micro-bubbles form at various nucleation sites in the fluid and grow during the rarefaction phase of the sound wave. In the subsequent compression phase, the bubbles implode and the collapsing bubbles release a violent shock wave that propagates through the medium.

Recovery of heat from a vacuum digestion process to modify the feed characteristics of the fluid (rheology, degradability, etc.)—The consistent amount of heat recovered in the process could be reused, rather than for evaporation, but for pre-treating the feed in order to increase the soluble fraction, decrease the particle size, optimize the viscosity and accordingly improve the biodegradability of the biosolids and enhance biogas production, and/or produce more volatile fatty acids.

Integration of the treatment methods and systems into existing sewage infrastructure (sewer bottlenecks) and into decentralized sewage treatment units—The possibility of extracting mass and volume by vacuum evaporation, and simultaneously producing high-quality condensates needing low or no treatment prior to reuse or disposal, creates the possibility of using the method and system disclosed in this document as complementary technology to decentralized septic systems such as Imhoff tanks, black water cisterns, etc.

(D) Superior Sludge Quality:

Advanced pathogen control in a biosolids treatment process to achieve superior sludge quality—A primary objective of anaerobic digestion is to reduce the pathogen content and so enable beneficial re-use of the digested biosolids for e.g., improving agricultural soils. Due to the extended solids retention time under thermophilic digestion temperatures, embodiments can provide for superior pathogen destruction. Further, high concentrations of the digested biosolids enable economical post-treatment of residuals with supplemental disinfection procedures.

Advanced treatment of recalcitrant contaminants such as endocrine disruptors, personal care products, pharmaceuticals, etc.—Destruction of persistent toxic xenobiotic chemicals can be enabled by e.g., introducing, supplementing, or regenerating ferric ions to culture iron-reducing bacteria capable of degrading such recalcitrant materials; and/or performing aggressive post-treatment of the particulate solids (after digestion) e.g., by advanced oxidation processes.

Accumulation of slowly or non-biodegradable contaminants for potential in-situ treatment with targeted chemical and biochemical compounds (acids, bases, solvents, oxidizing/reducing agents, light, enzymes, catalysts, etc.)—The vacuum-based treatment process preferentially removes water and readily biodegradable volatile organic matter such as VFAs or ammonia. This results in a net accumulation of slowly and non-biodegradable particulates in the treatment chamber, since the readily biodegradable components either undergo biochemical transformation due to the extremely long particulate retention time (going to gaseous products collected by the vacuum pump) or are extracted as volatile products in the condensate. The accumulation of difficult-to-treat constituents gives the opportunity of applying ad-hoc in-situ or ex-situ chemical or biochemical treatment of such recalcitrant fractions using a variety of treatment agents. It also enables the use of catalysts in the treatment chamber, since the latter can be selected with physico-chemical properties (particle size, volatility, etc.) such that they are fully retained in the treatment chamber.

Enhancement of the biodegradability of a contaminated fluid—If vacuum-based bioprocesses are used to concentrate the slowly and non-biodegradable fraction of a contaminated fluid, the same fractions can be subjected to treatment to enhance their biodegradability. Hence, the overall biodegradability of the contaminated fluid can be enhanced.

During vacuum treatment of sludge, an increase in pH was unexpectedly observed, which is believed to be caused by the removal of carbon dioxide (an acid gas). This increase in pH could lead to several advantages in sludge processing, since alkaline sludge treatment is a well-established process to inactivate pathogens, accelerate fermentation and enhance biogas production. Also, this allows the digester pH to be controlled to increase or maximize the production of volatile fatty acids; otherwise, pH tends toward over-acidification to where production of alcohols and ketones are favored (solventogenesis).

(E) Mitigation of Typical Issues Encountered During Anaerobic Bioprocesses:

Prevention of foaming in anaerobic digestion as a result of infinite sludge retention time—Foaming is a common problem that occurs in anaerobic digestion due to the accumulation of fats, oils, and grease (FOG). The aforementioned organics have very slow biodegradation rates, and thus would accumulate in conventional digestion processes. In this process, because of the infinitely long solids retention times, FOG can be biodegraded.

Reduction of inhibition by selectively removing biochemical reaction products from the reactor (ammonia, acids, etc.)—At certain concentrations, ammonia and volatile fatty acids, which are products of the anaerobic digestion process, can inhibit biodegradation. In this process, the accumulation of such inhibitors in the digester is mitigated by flash heating and/or pH adjustment, which increases the inhibitors volatility, and hence can be readily recovered in the condensate.

Minimization of undesirable dissolved gases (GHGs, etc.) from biosolids—The use of negative pressure during digestion allows the production of a condensate or residual digestate where the amount of dissolved gas is minimal, due to the gas transfer from liquid to vapor induced by the negative pressure, the temperature and other operating conditions (pH, salinity, etc.).

Superior odor formation, management and control in a biological and chemical process associated with the use of vacuum—Since the technology operates under negative pressure and in sealed vessels, odors cannot escape from the system and can be managed efficiently without generating issues for the surrounding population.

A self-equalizing pH in the treatment chamber, which is highly beneficial in anaerobic digestion as inhibition could occur when pH<5 or >9—The application of vacuum, in combination with certain pH and temperature in the treatment chamber, can induce CO2 stripping. As a result, the pH in the treatment chamber tends to stay rather constant irrespective of the production of acids during digestion. The same effect could be anticipated in case of excessive accumulation of ammonia. In that case, the presence of ammonia would raise the pH which then would lead to conditions conducive for ammonia stripping. In essence, the physico-chemical conditions established in a vacuum-based digestion process are such that the pH is equalized by physico-chemical mechanisms (evaporation/stripping) as well as by chemical buffers accumulated in the treatment system over time.

Optimal SBR cycles can be identified based on COD destruction profile and hydraulic and particle residence times—The cyclic behavior in COD degradation, induced by partial inhibition of microbial communities responsible for transforming organic matter into gaseous products (methane, hydrogen, H2S, etc.), identifies optimal treatment times that can be used to configure the system as a sequencing batch reactor (SBR), with the typical cycle of filling, contacting, treating, unloading.

(F) Enhancement in Microbial Communities:

Simultaneous optimization of biochemical and physico-chemical process rates by enhancing microbial activity, mass transfer and biosolids composition—Under atmospheric conditions, the bubbling point of a contaminated fluid is reached at 100 C or higher. Under those conditions, biology is severely slowed down or totally inhibited. Therefore, bubbling and biological activities are reached under process-incompatible conditions if operated under atmospheric conditions. When negative pressure is applied, the bubbling point of a water mixture is reduced, and can reach as low as 20-30 C under very low vacuum. As such, biochemical reactions can be simultaneously optimized, and integrated into physico-chemical processes in a single treatment chamber. Moreover, multiple treatment chambers can be used to optimize multiple bioprocesses and physico-chemical processes if convenient to operate the latter in temporal and spatial sequence.

Innovative bioprocesses with various pure cultures sensitive to microbial contamination, by sterilizing the feed to protect pure inoculum in a bioprocess—Pure anaerobic microbial cultures have superior bioprocessing kinetics than mixed cultures. Real raw feedstocks contain bacteria and pathogens that would cause metabolic shifts in the bioprocess. For example, methanogens in feed would reduce the biohydrogen production potential of pure cultures by consuming hydrogen. Thus, in this process, the recovered heat can be used to sterilize the feedstock to avert any undesired microbial shifts in the reactor.

Upgrade of slowly biodegradable carbon to readily biodegradable carbon and simultaneously recover high-purity readily biodegradable carbon—Due to the enhanced microbial communities enabled by the extended solids retention time in the digester, complex poorly-biodegradable organics can be converted into smaller, more volatile readily-biodegradable organics that can be captured in the evaporator condensate, and subsequently used as 'clean' supplemental carbon to support biological nutrient removal processes within the treatment facility.

Enhancement of biomass tolerance and resistance to toxic compounds—The co-existence of biomass, toxicants, and recalcitrant compounds, in the same treatment chamber for longer times than in conventional digesters allow the biomass to develop resistance towards toxicants and inhibitors. As a result, better biodegradability rates could be achieved in the system and less inhibitory effects could be displayed by the microbial community.

EXAMPLES

Figure 10:
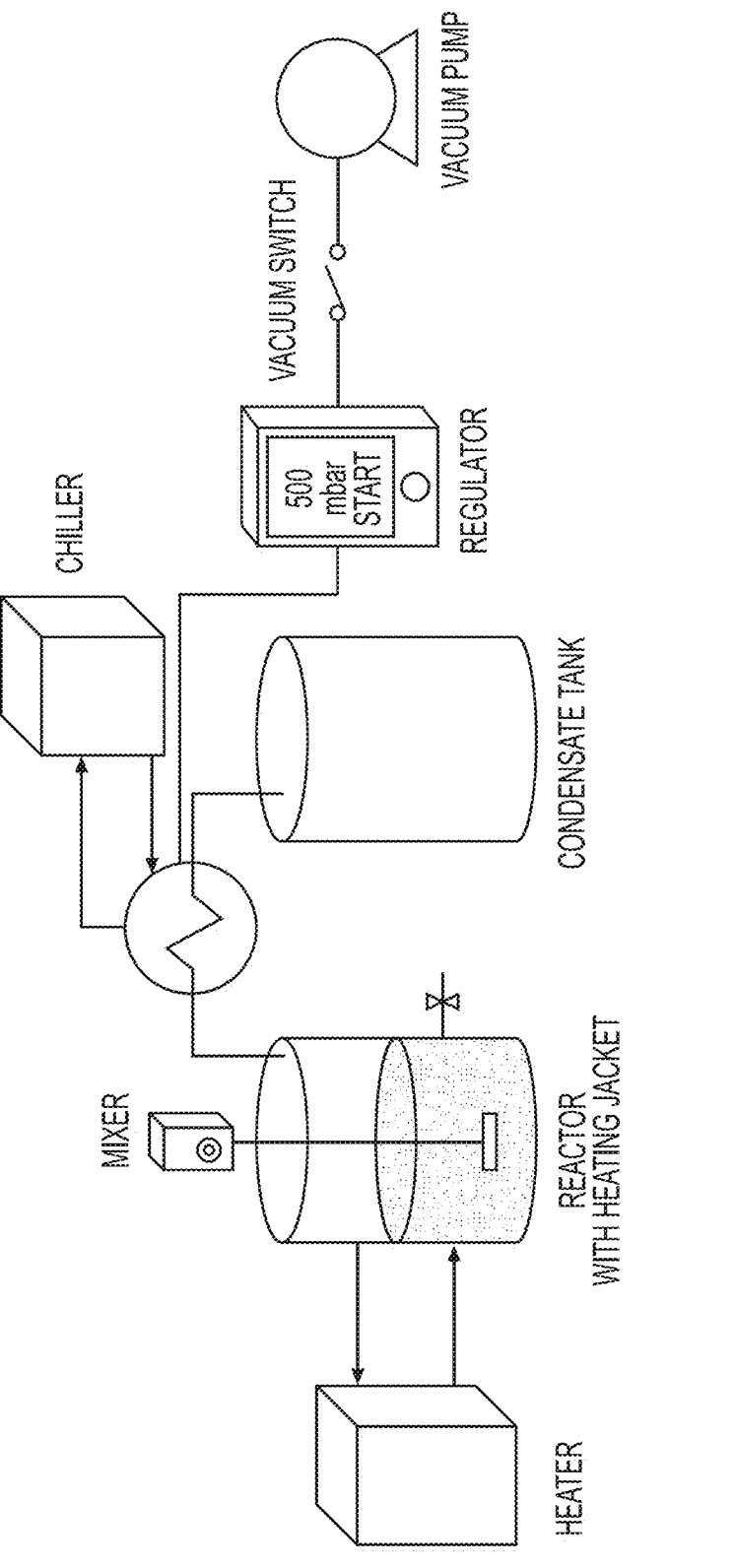
FIG. 10 is a schematic diagram of the lab scale system used in the examples.
Figure 11:
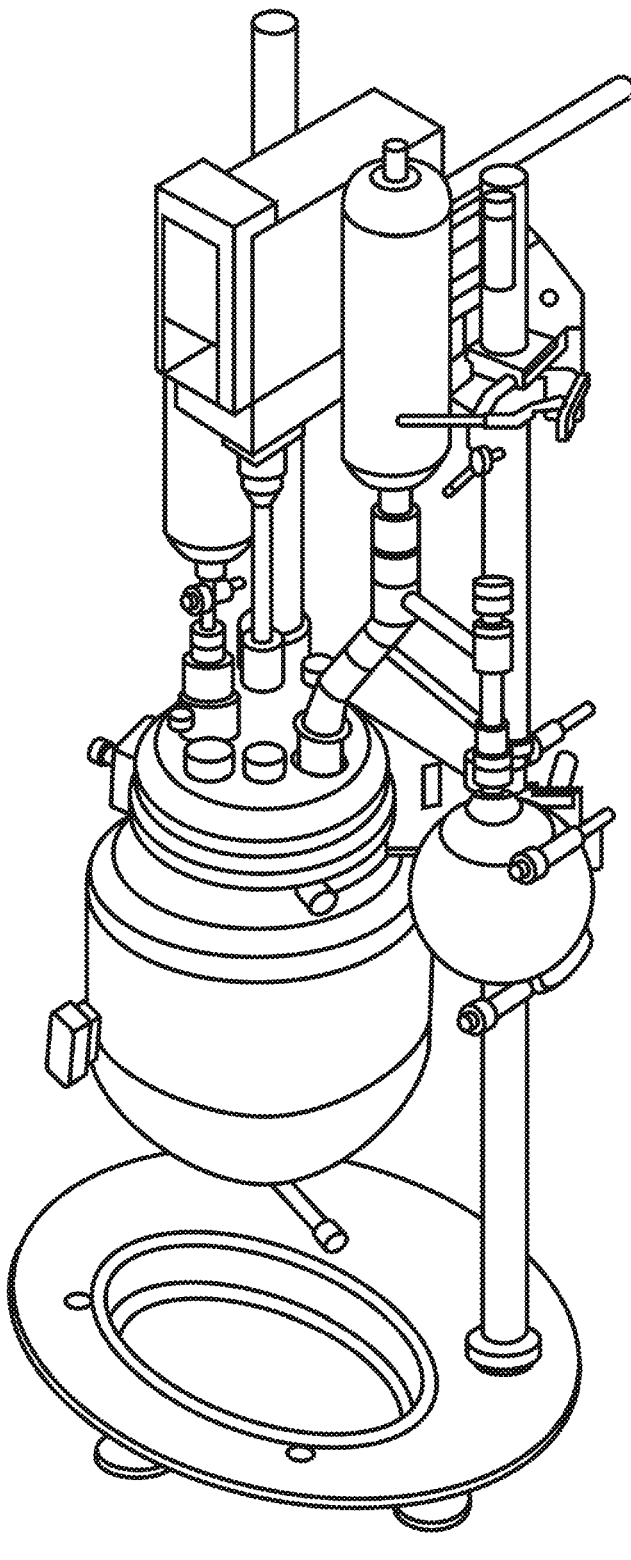
FIG. 11 is a perspective view of the treatment chamber used in the examples.
Figure 12:
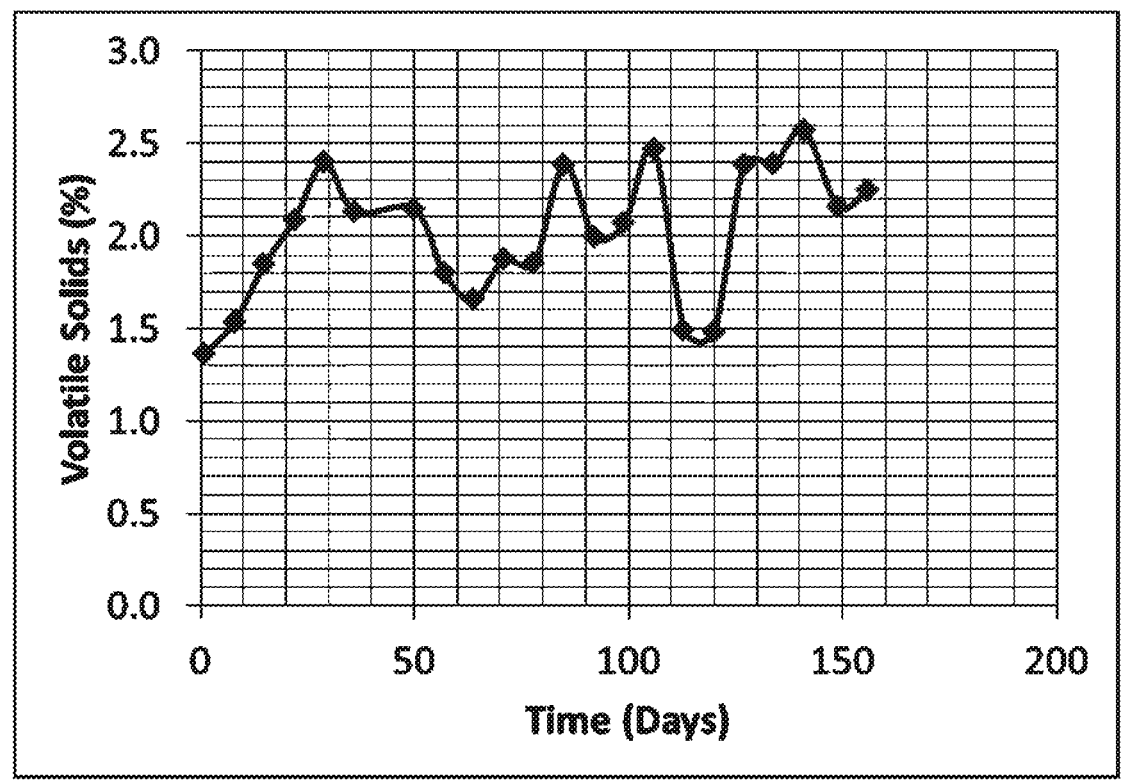
FIGS. 12-21 are graphs showing measured characteristics of the sludge used as a feed in the examples.
Figure 13:
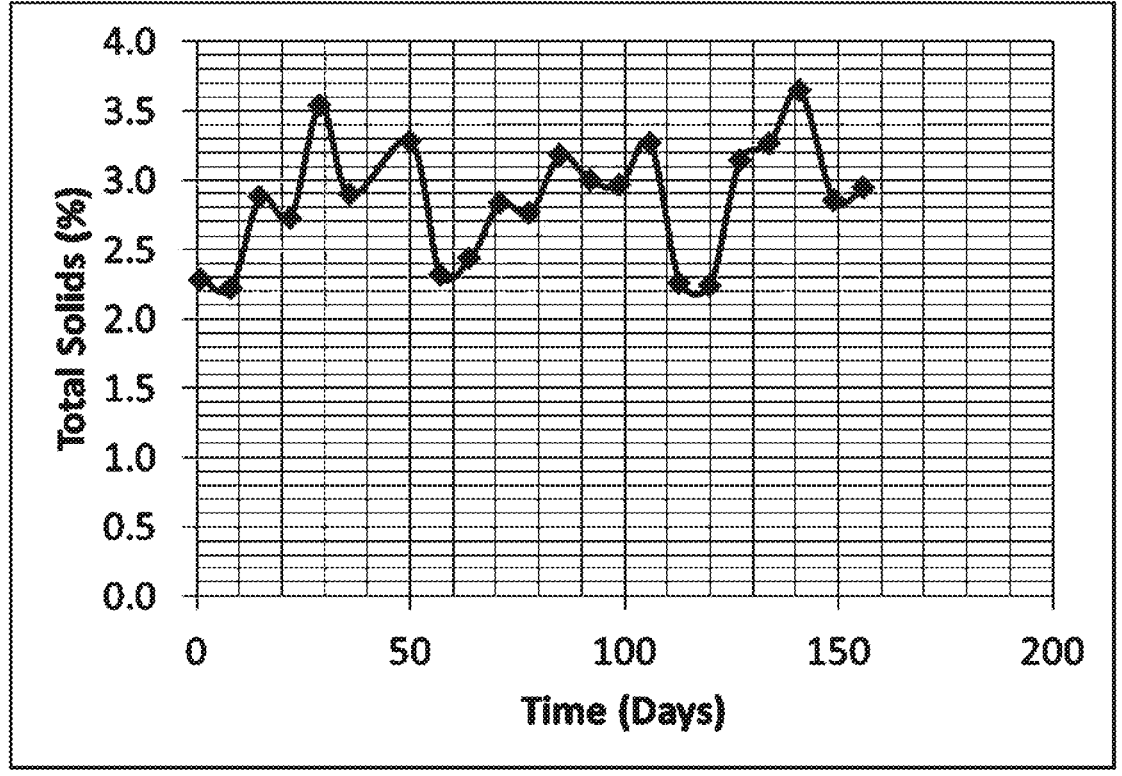
Figure 14:
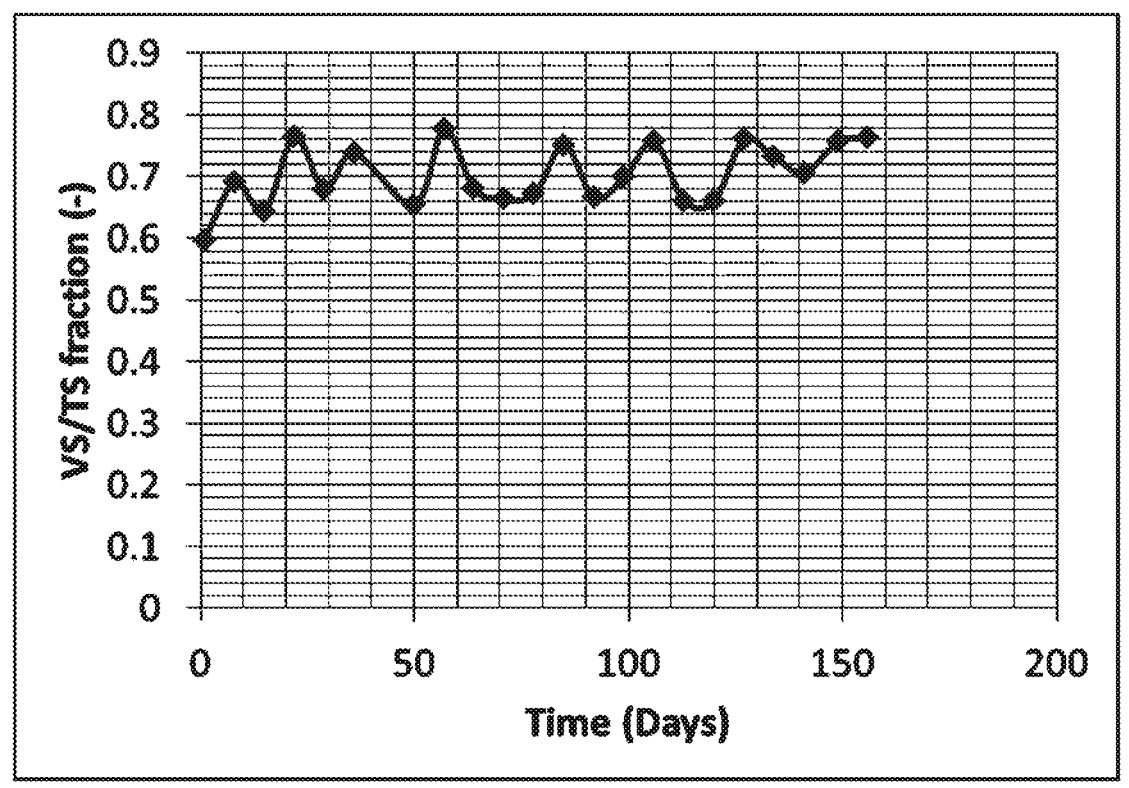
Figure 15:
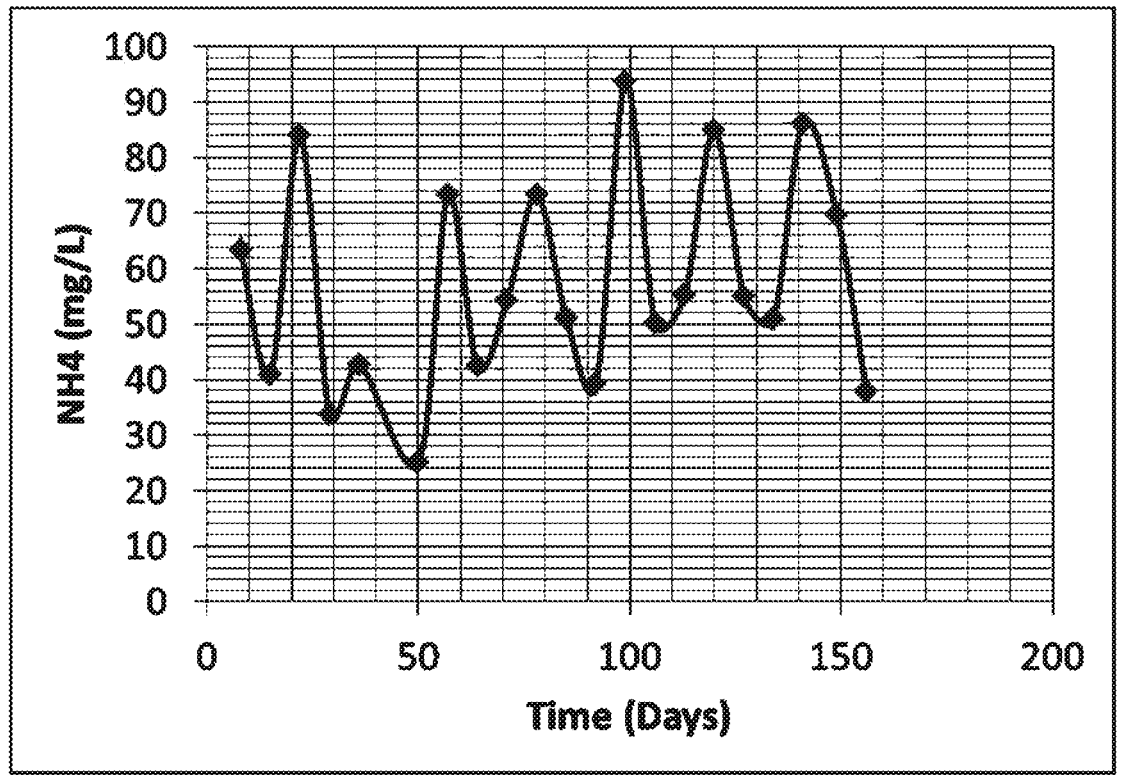
Figure 16:
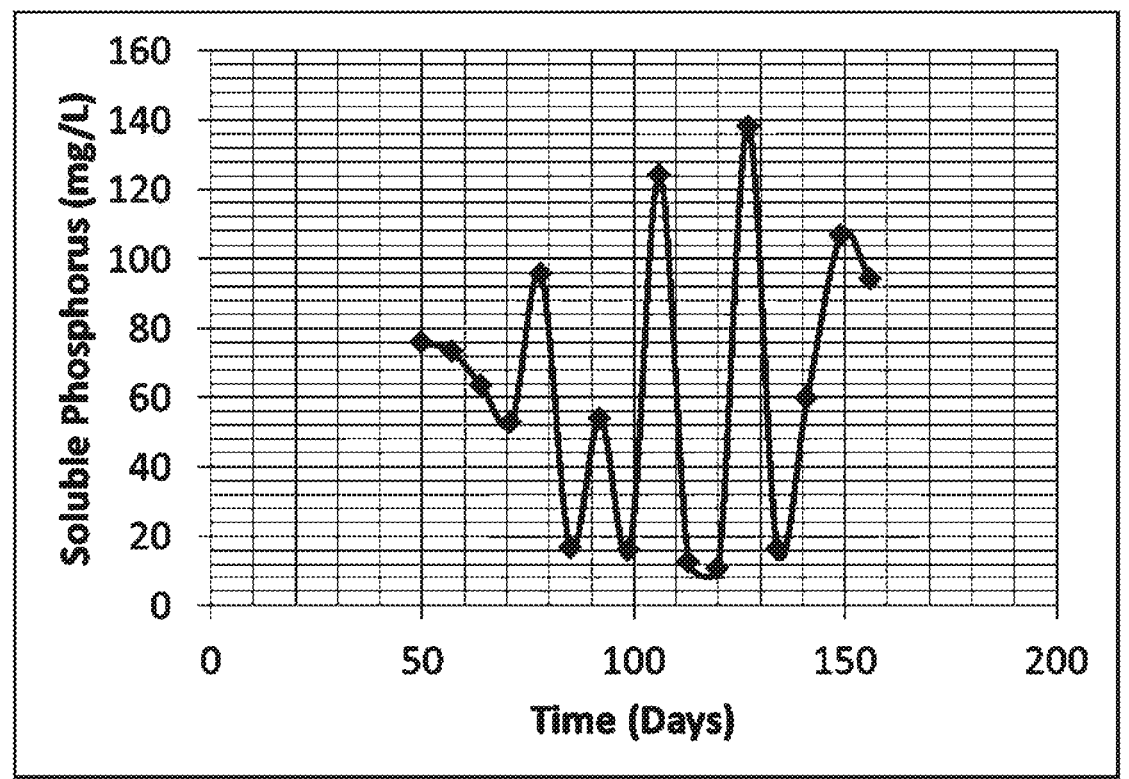
Figure 17:
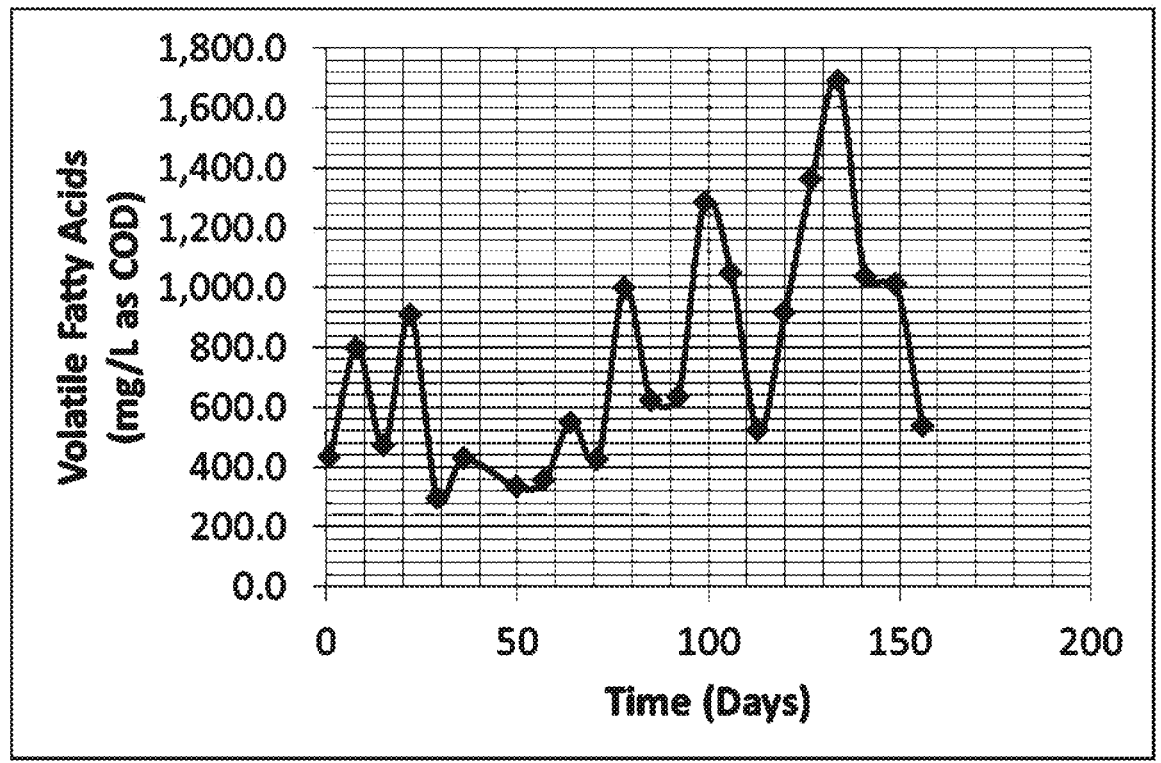
Figure 18:
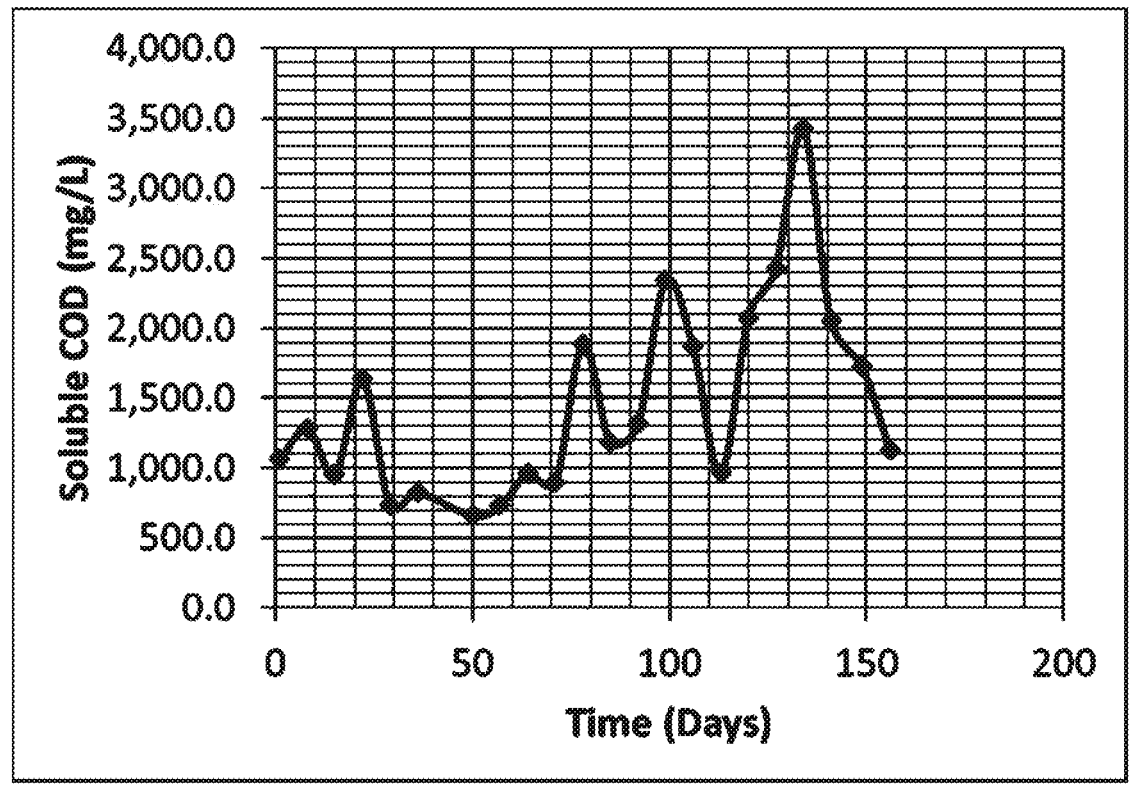
Figure 19:
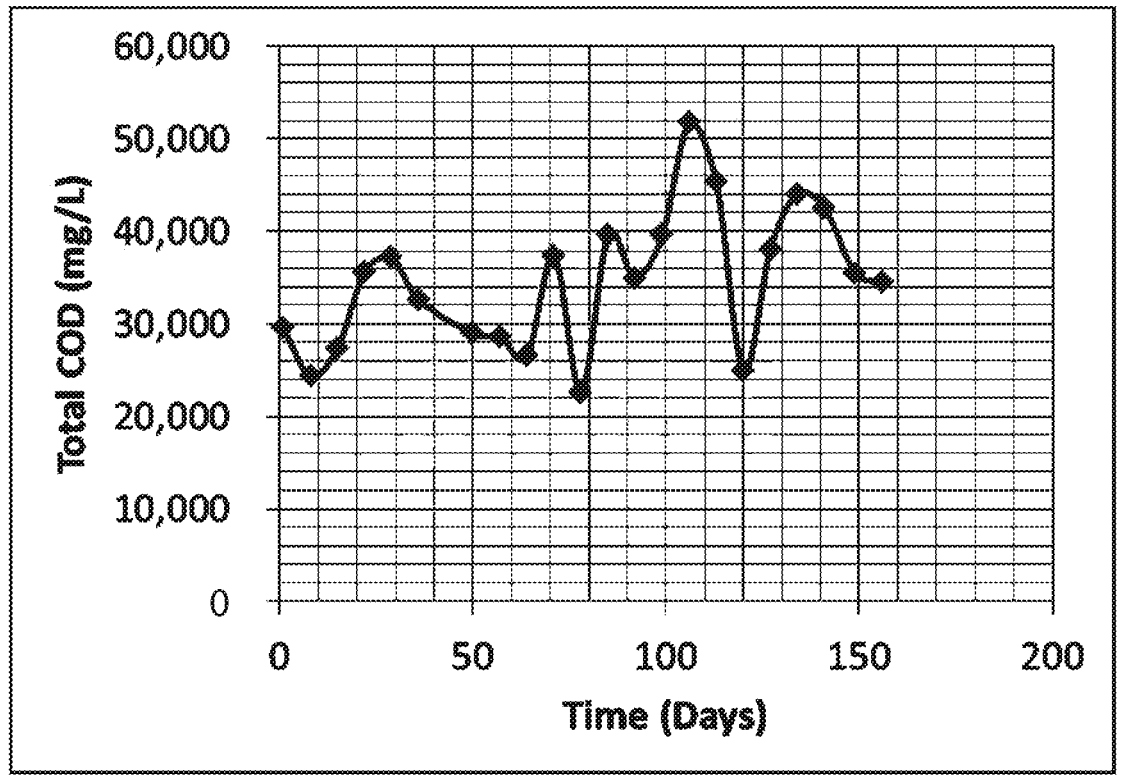
Figure 20:
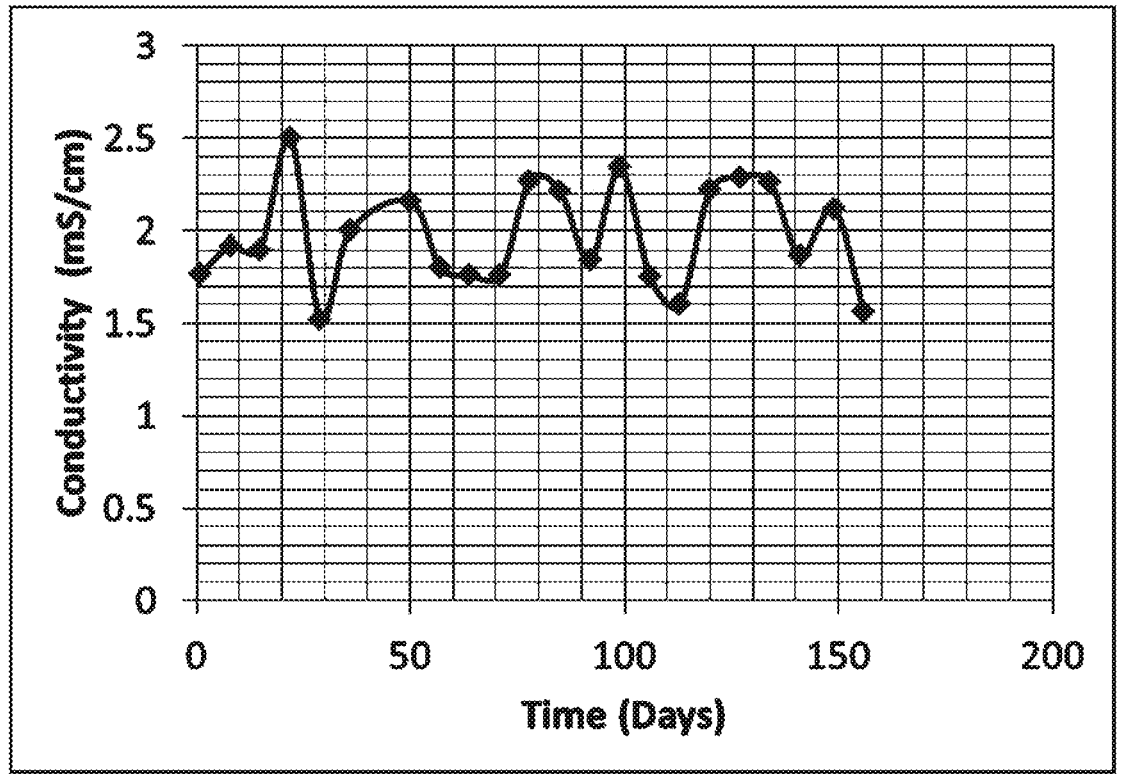
Figure 21:
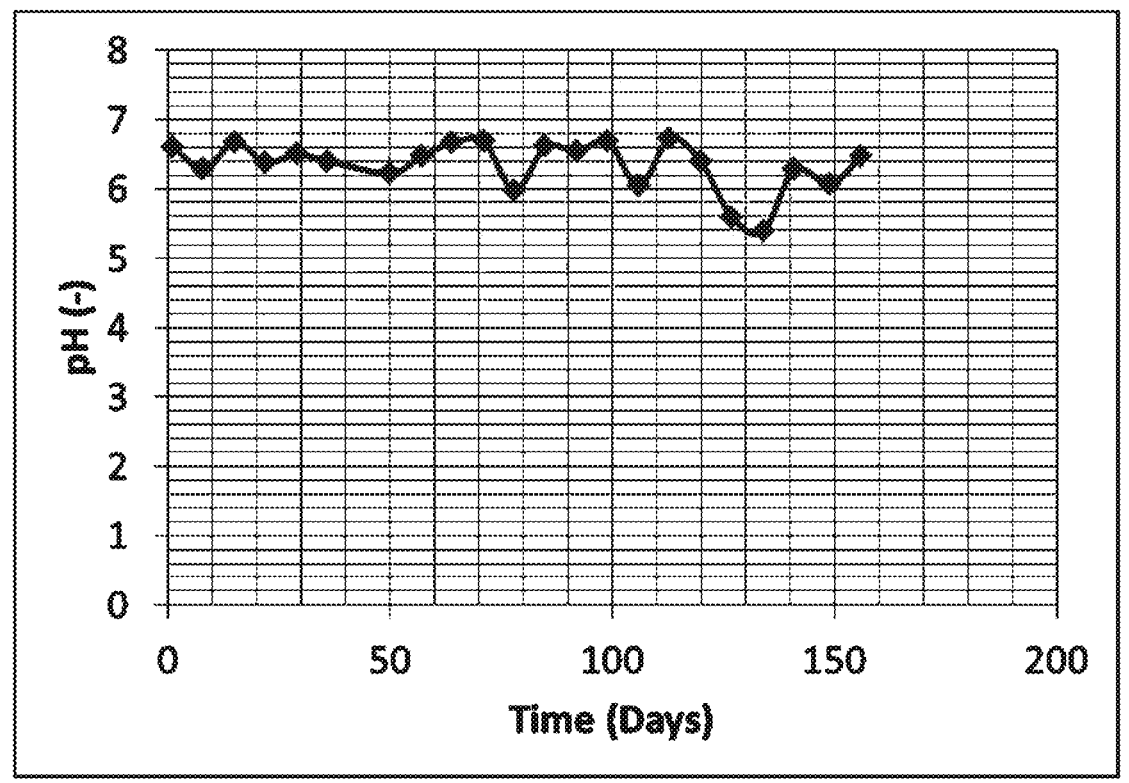
Figure 22:
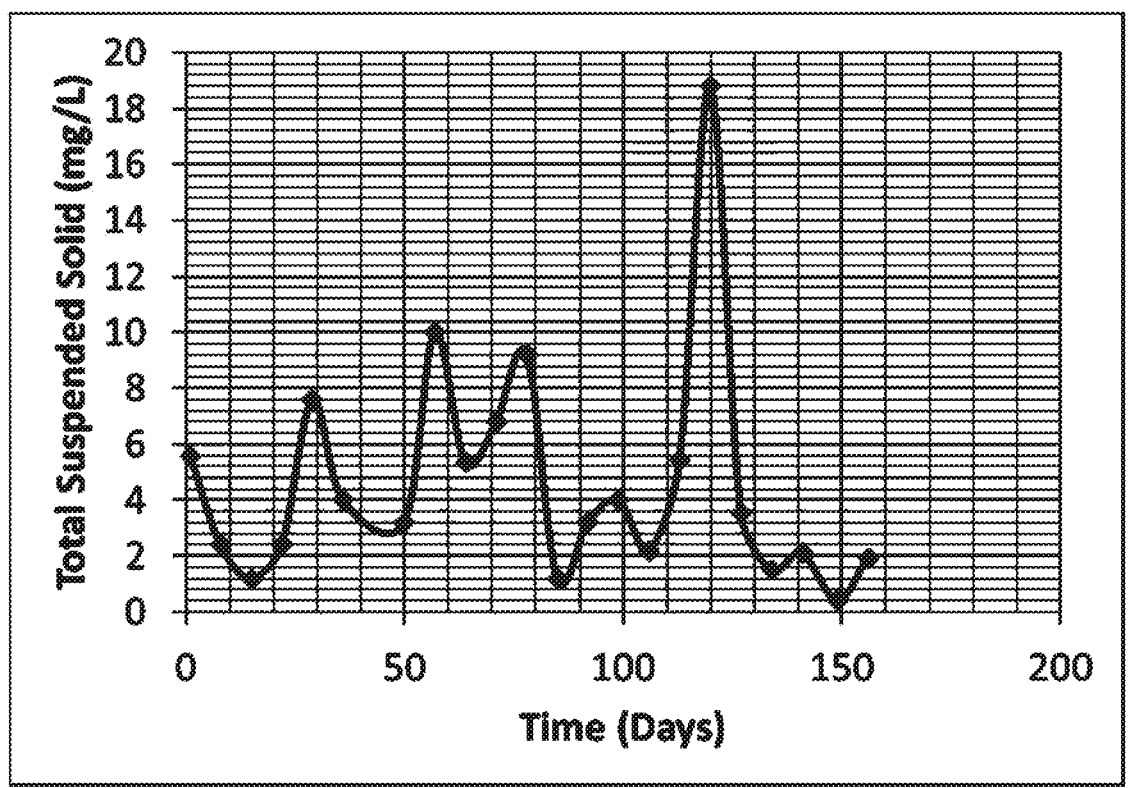
FIGS. 22-29 are graphs showing measured characteristics of the collected condensate in the examples.
Figure 23:
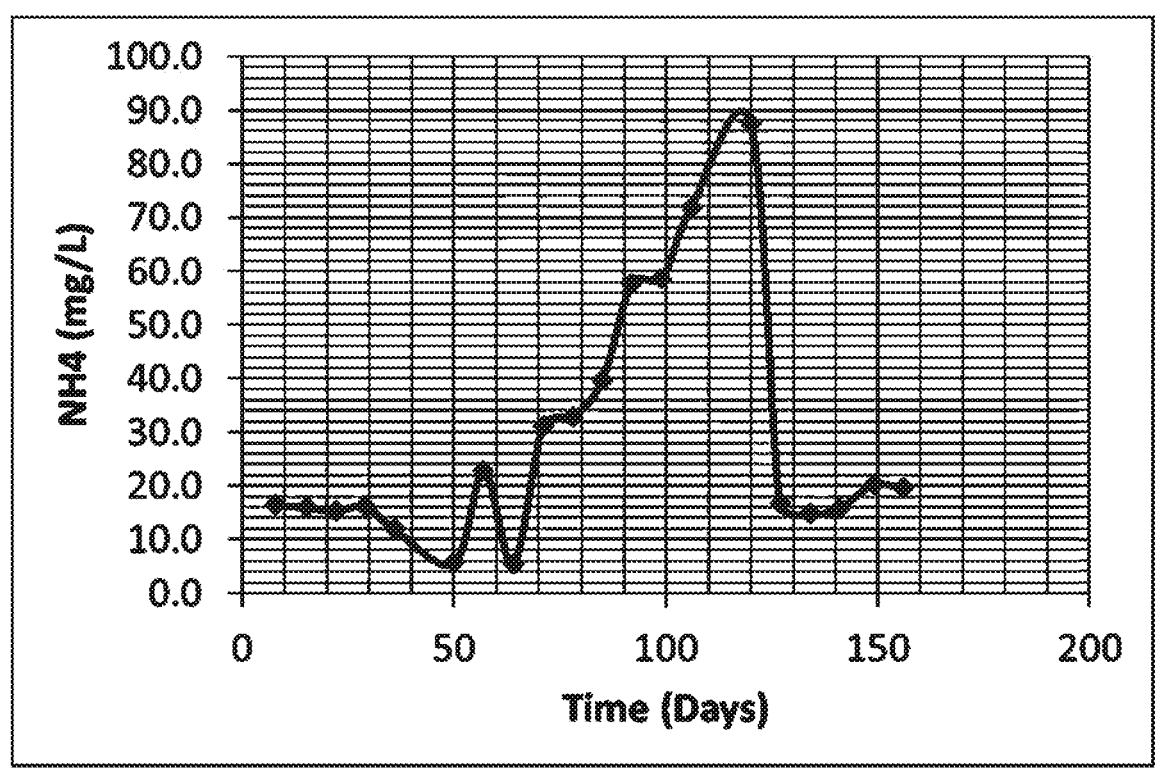
Figure 24:
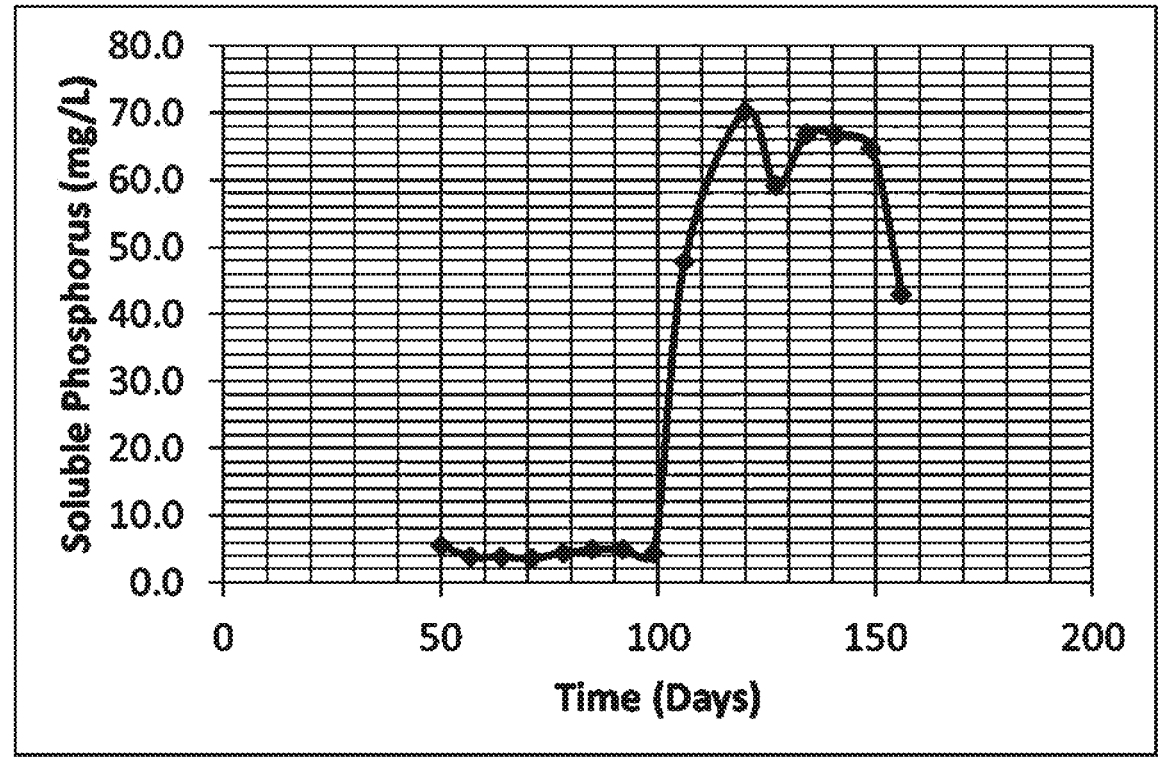
Figure 25:
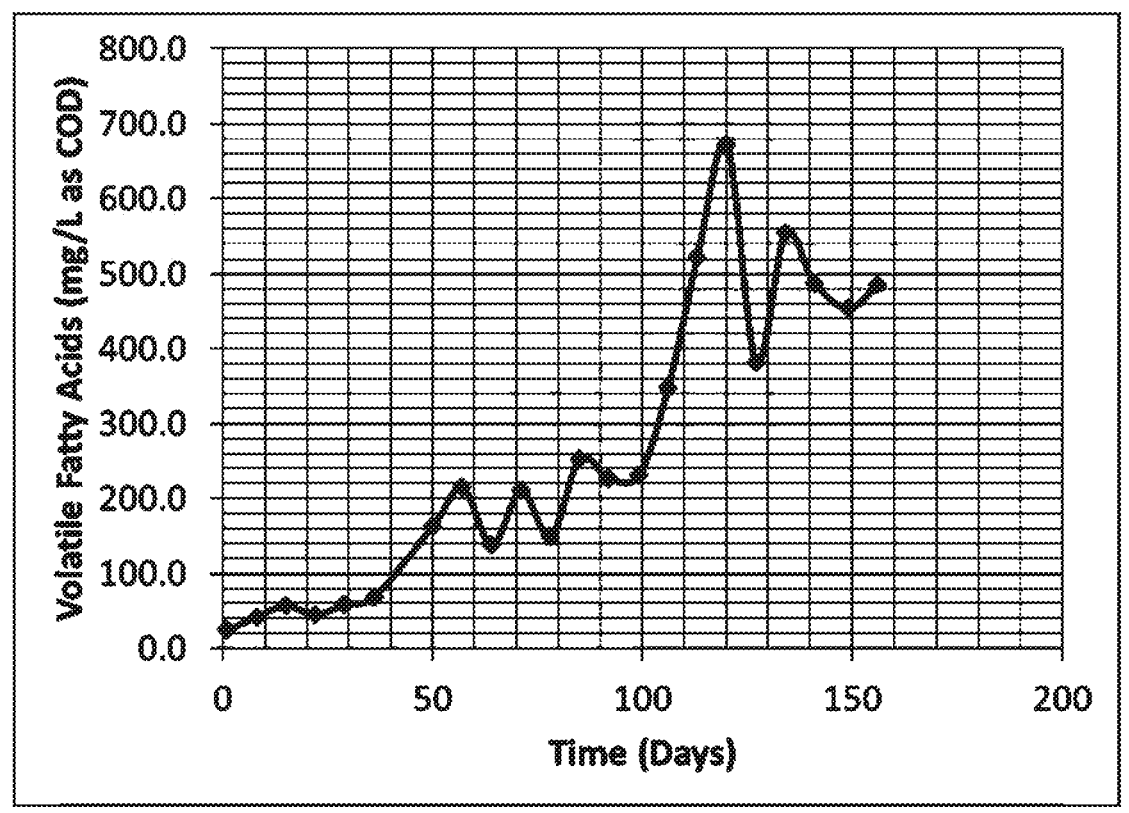
Figure 26:
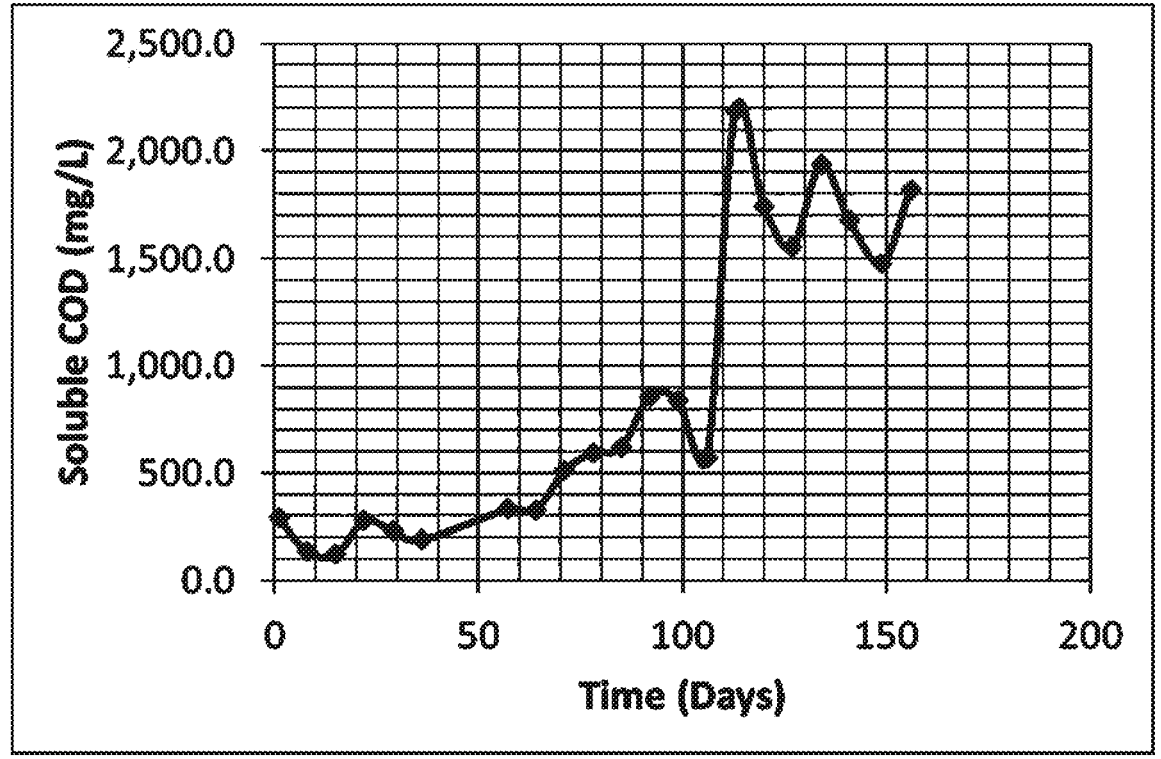
Figure 27:
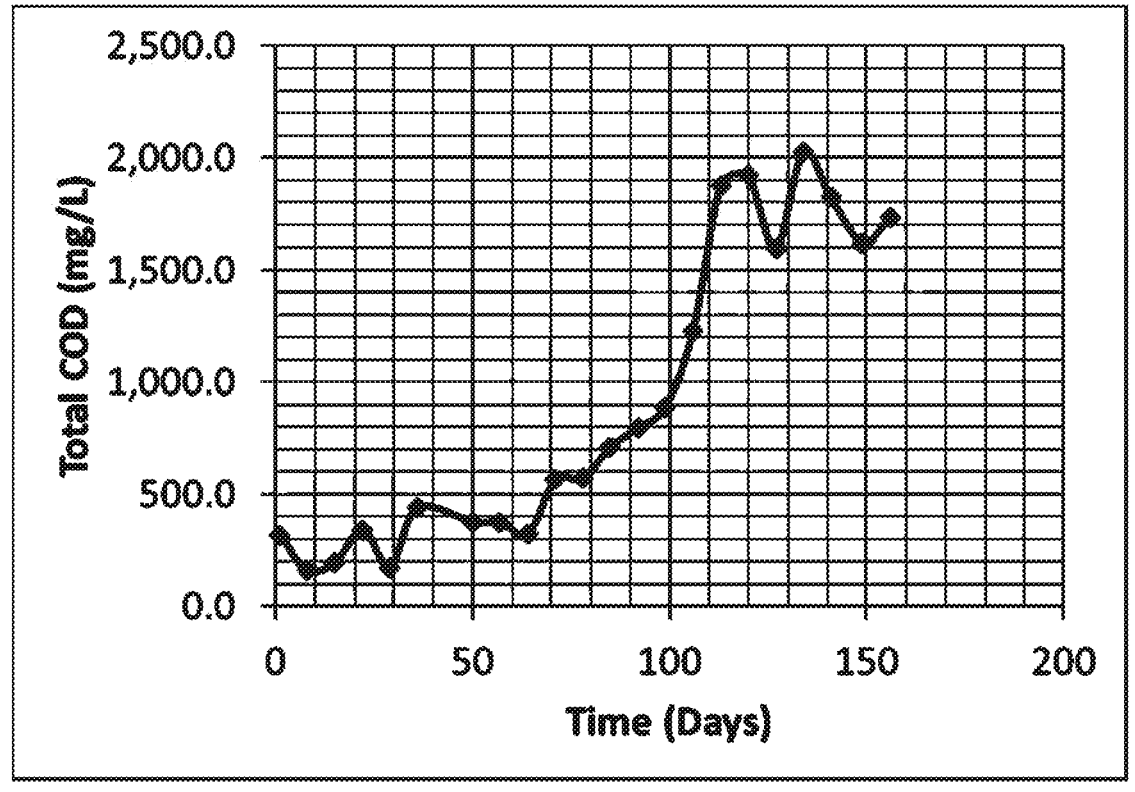
Figure 28:
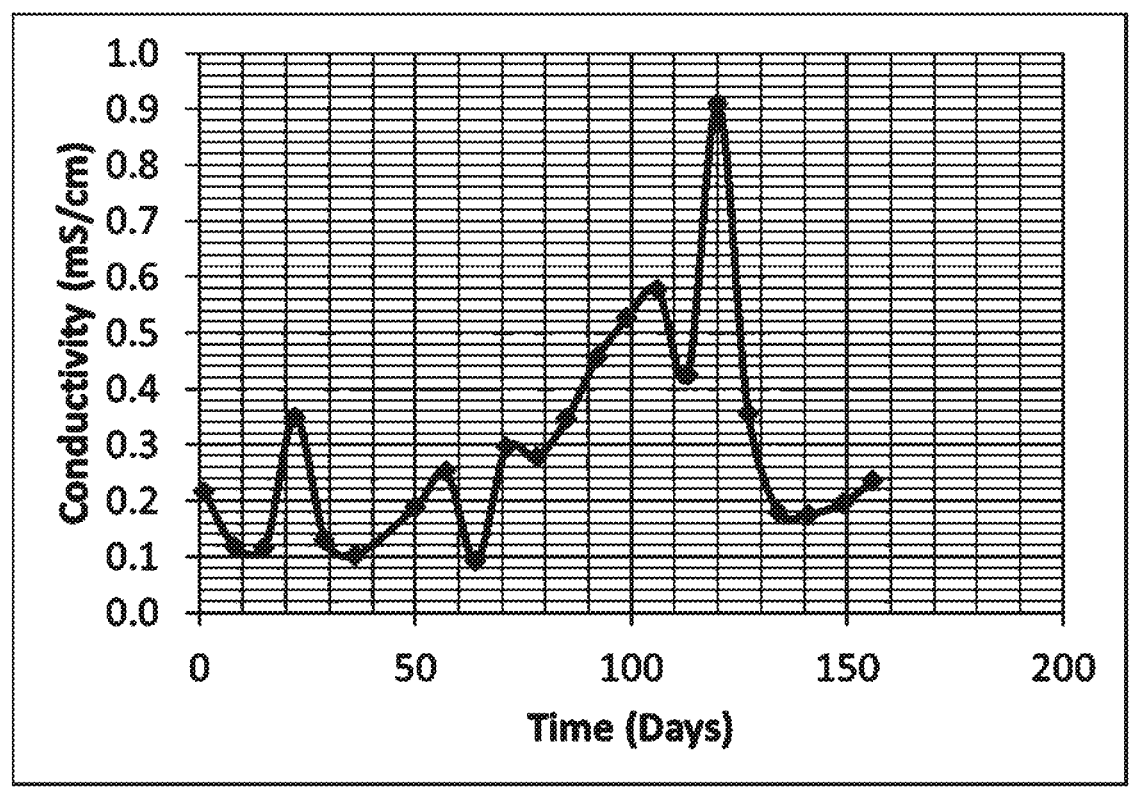
Figure 29:
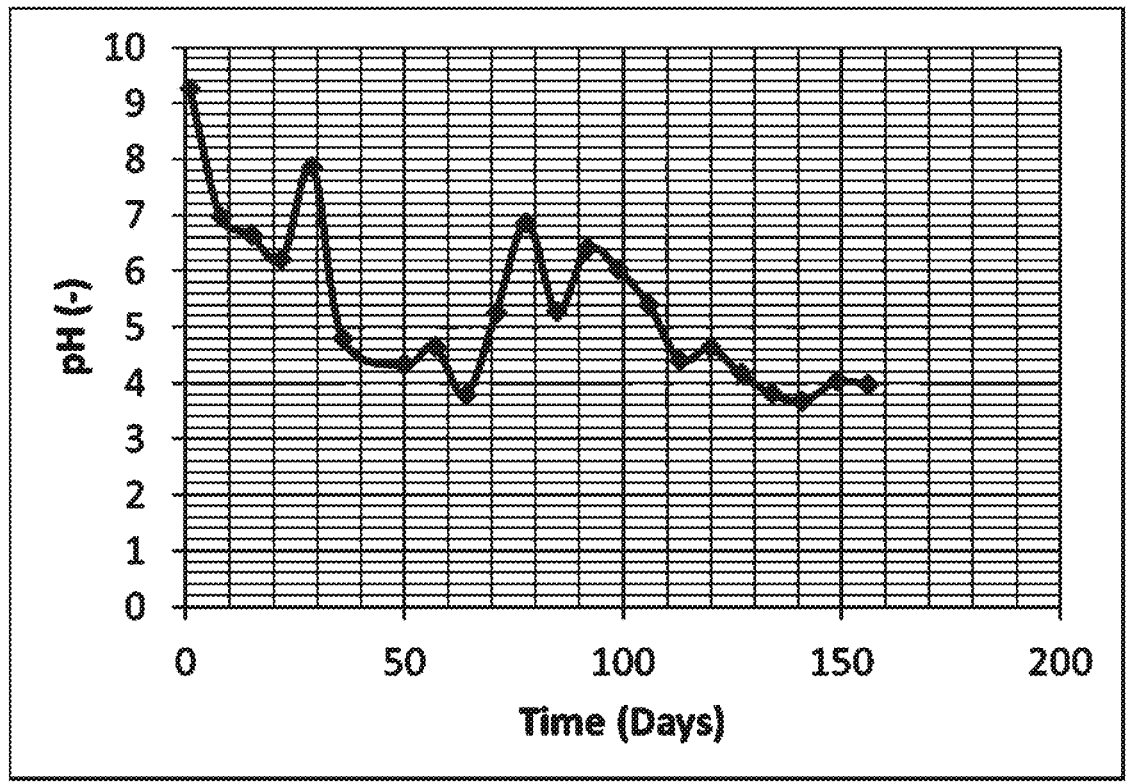
Figure 30:
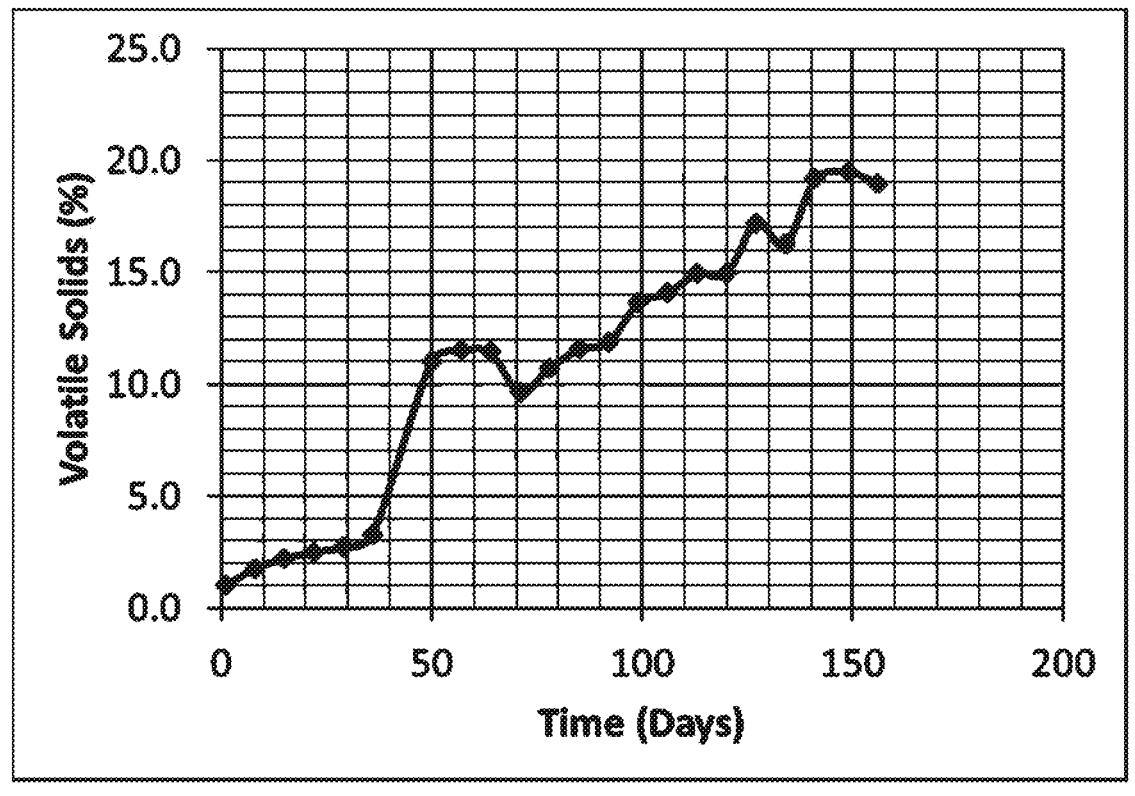
FIGS. 30-39 are graphs showing measured characteristics of the fermentate/digestate.
Figure 31:
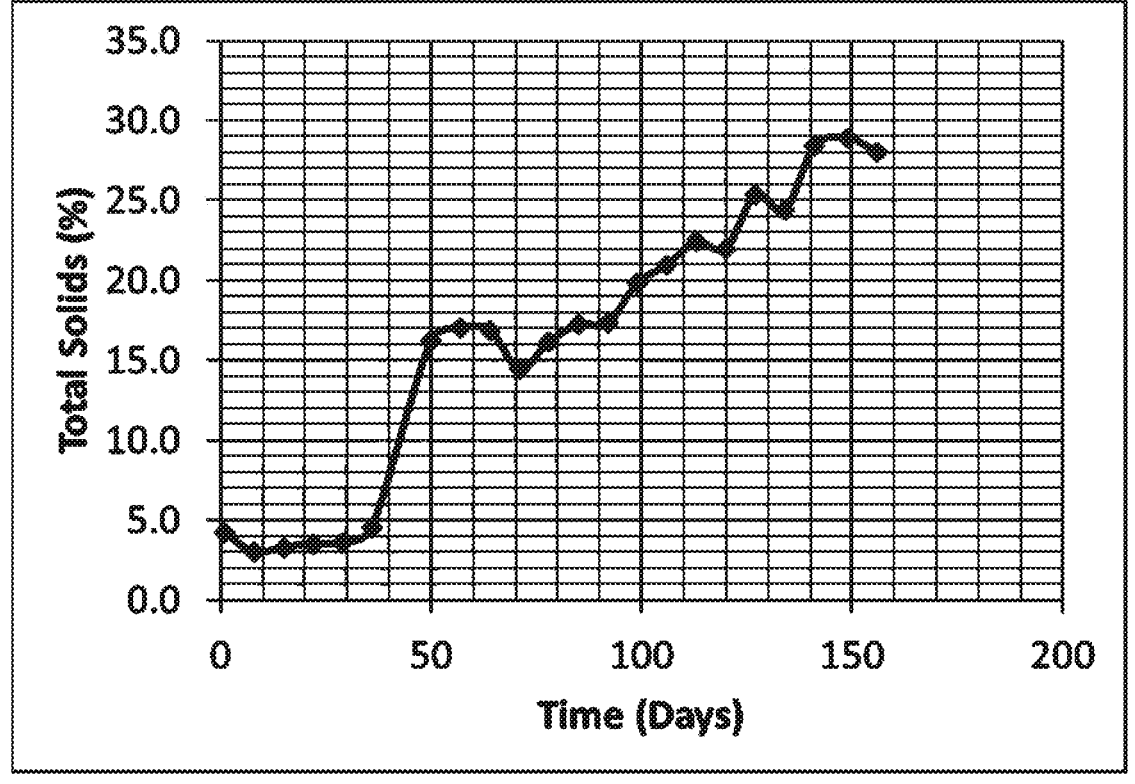
Figure 32:
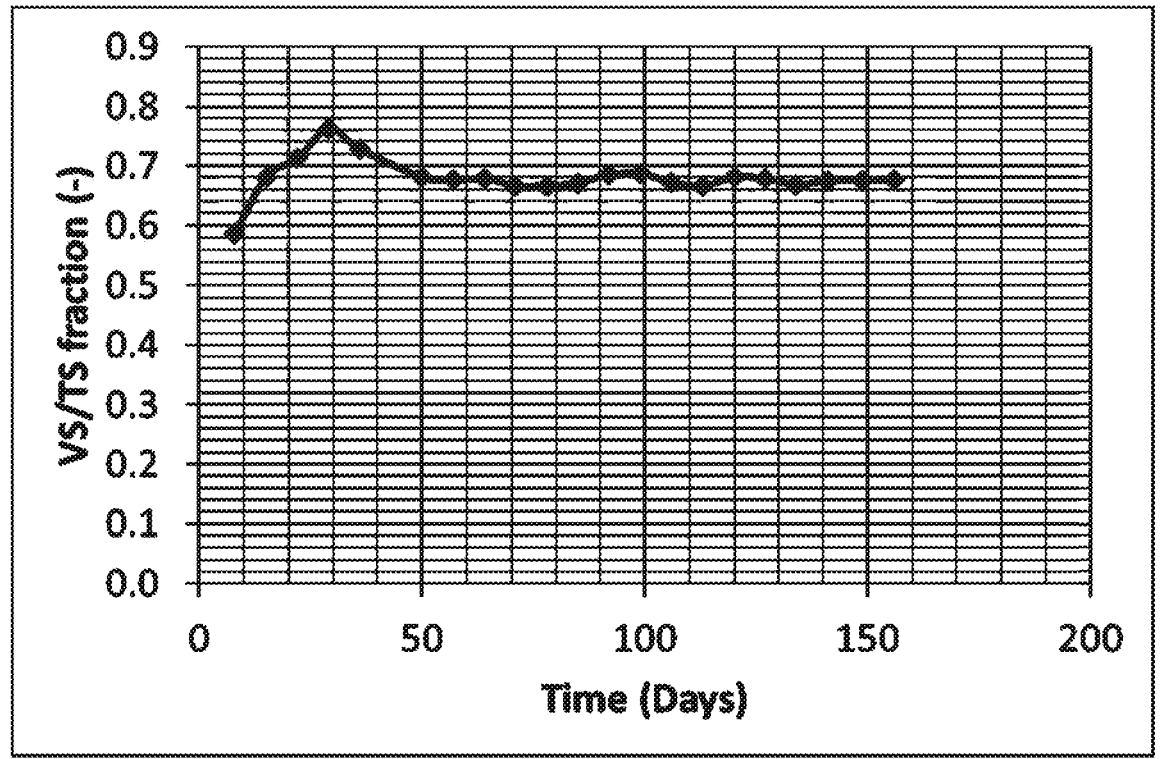
Figure 33:
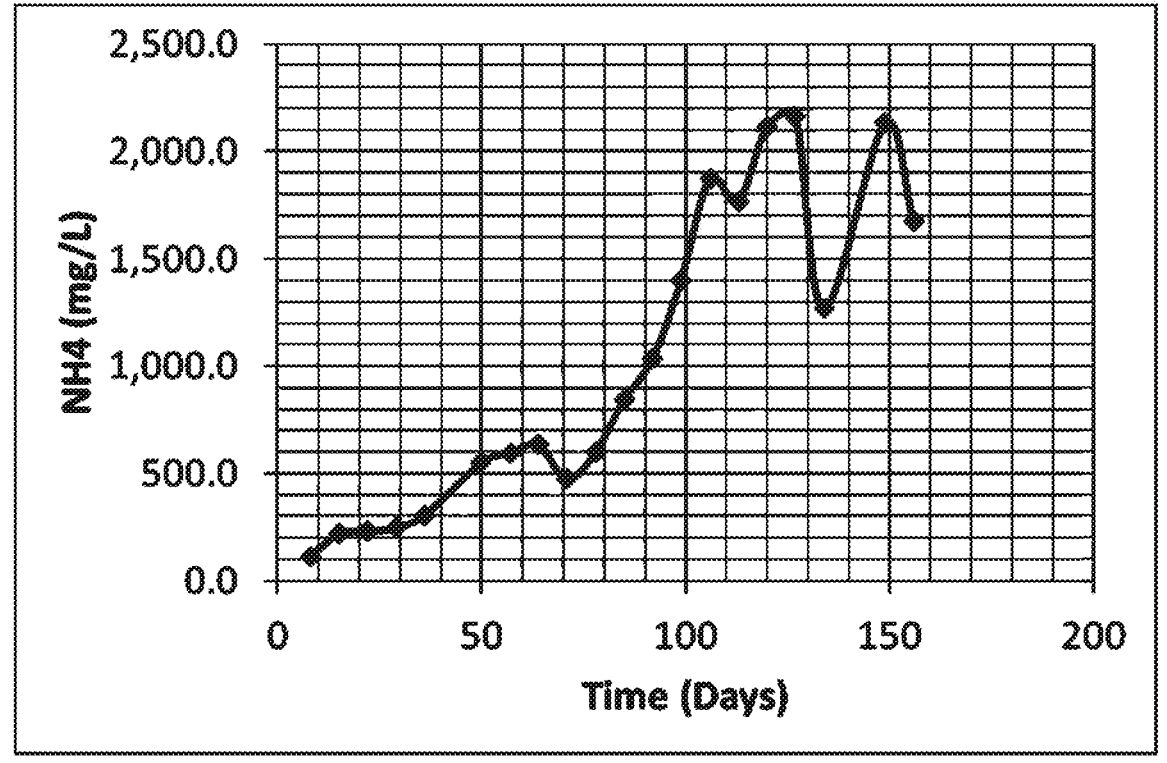
Figure 34:
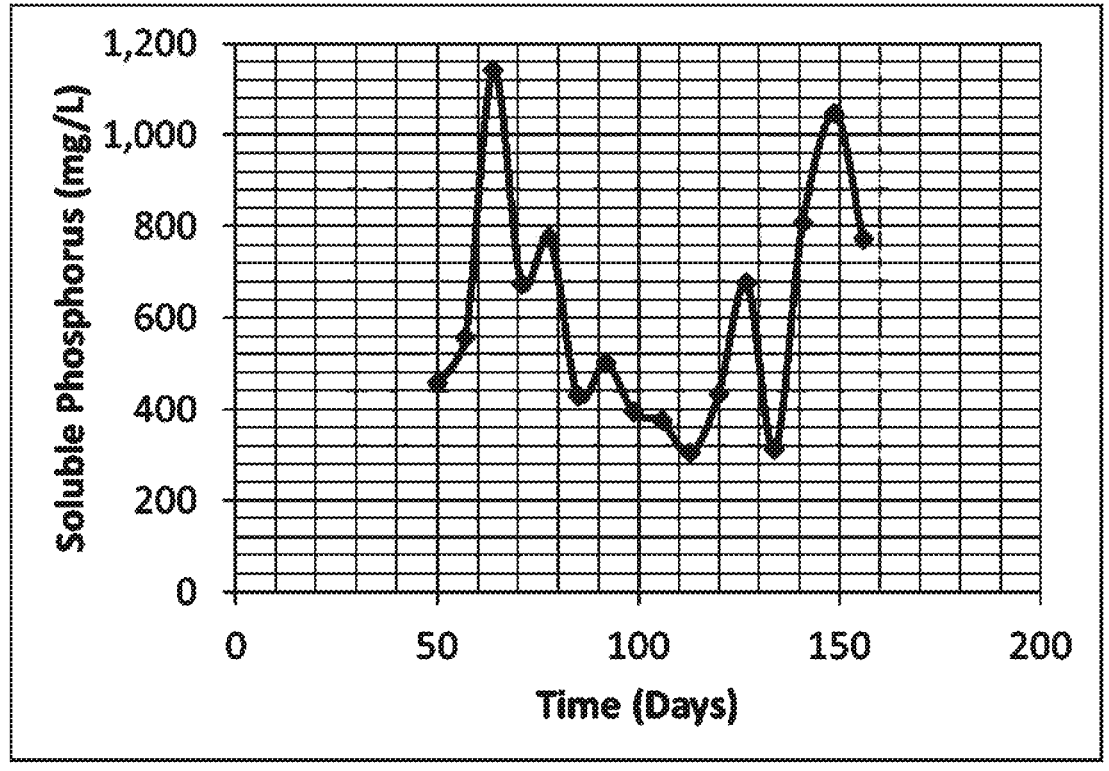
Figure 35:
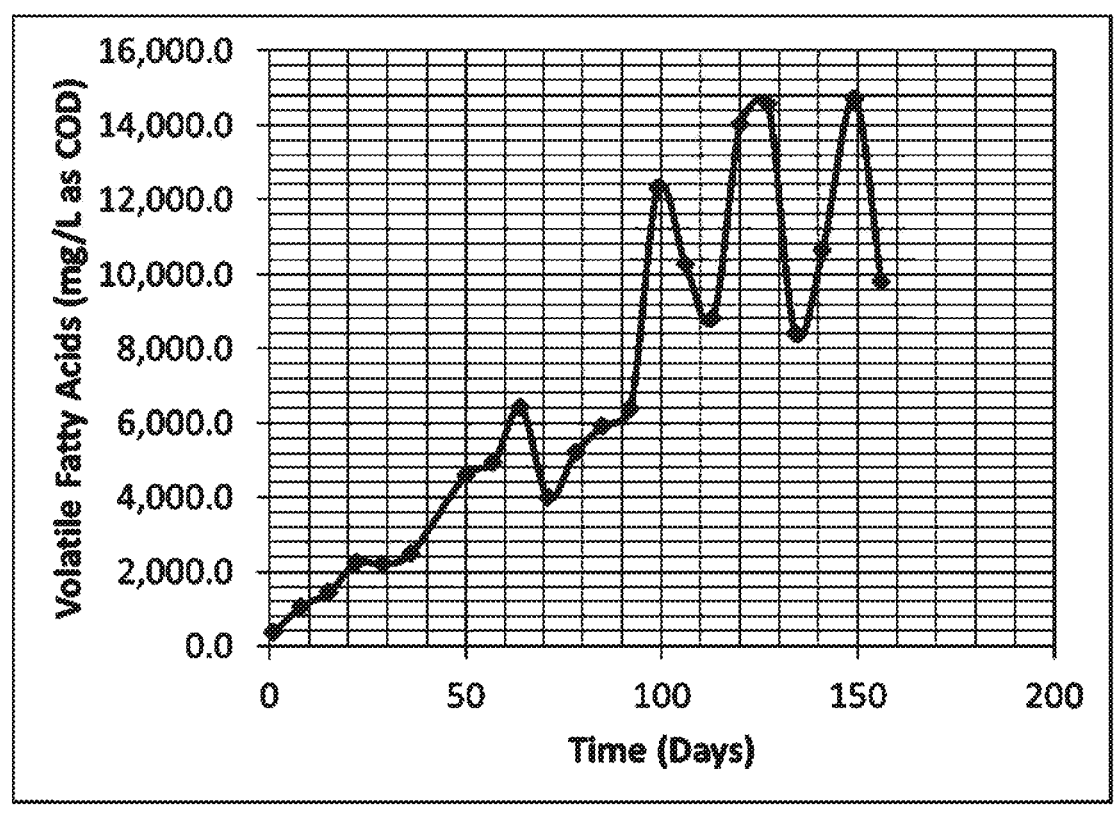
Figure 36:
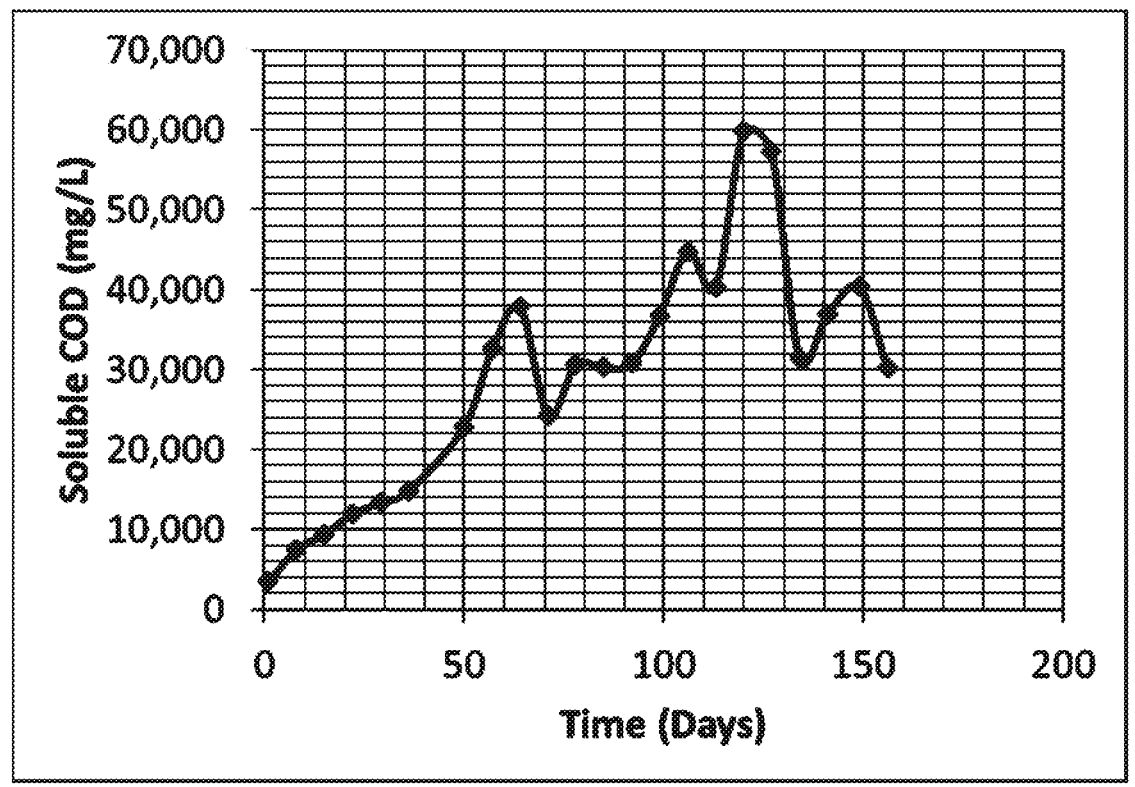
Figure 37:
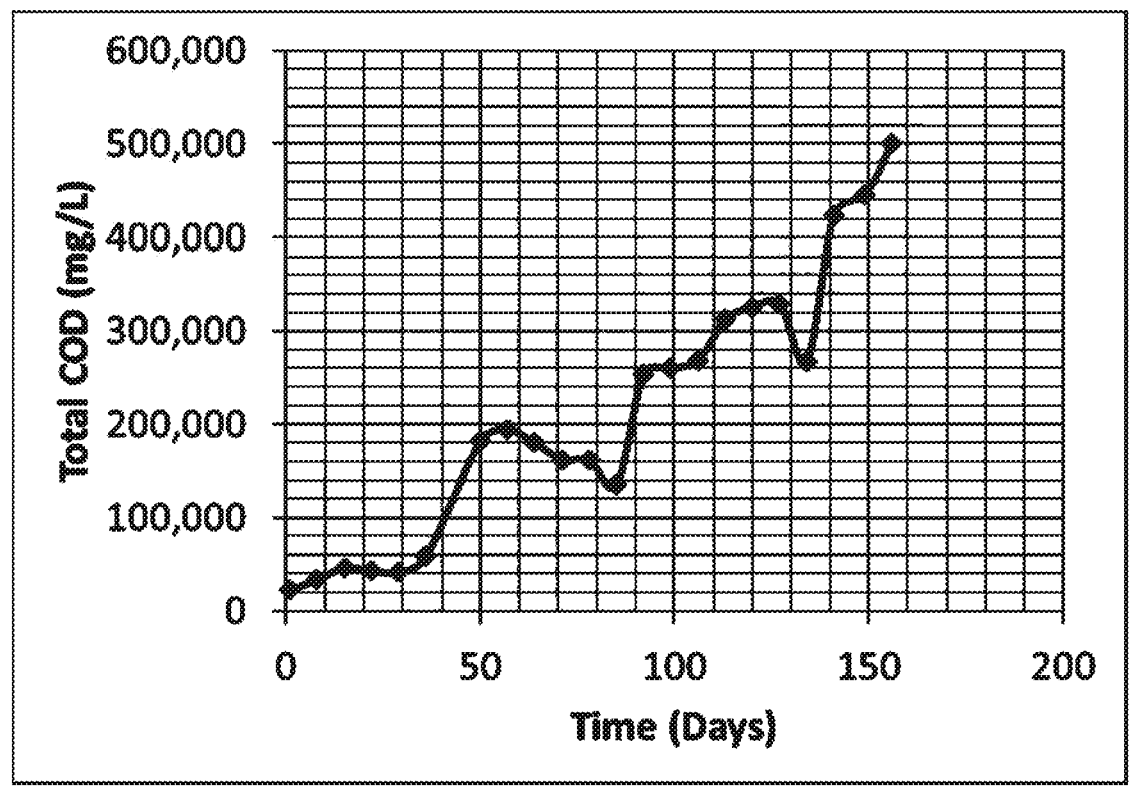
Figure 38:
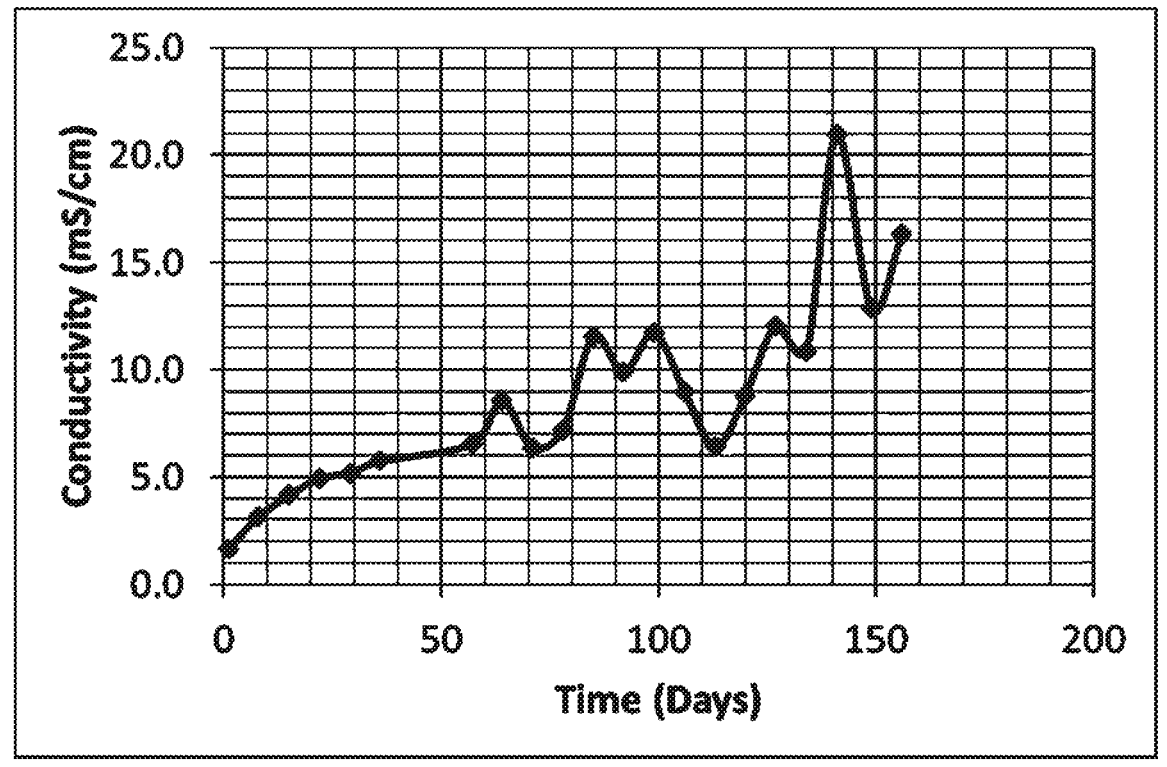

An experimental treatment system is shown schematically in FIG. 10. A diagram of the system is shown in FIG. 11. The treatment system comprises:

A treatment chamber consisting of a double-walled glass vessel where hot water was recirculated to keep the temperature at the desired set point;

A double-walled condenser, made of glass to avoid corrosion, to recover—as liquid—the evaporated soluble components periodically extracted from the treatment chamber;

A chiller, intended to produce cold water to maintain the temperature of the condenser at a desired value to achieve full recovery of the vapor constituents from the evaporate;

A vacuum pump, connected to the treatment chamber, operated to keep the pressure at the desired target, assisted by an automatic vacuum controller;

The condensate trap, installed between the condensate tank and vacuum pump, to avoid the potential damage associated with uncondensed vapor or liquid accidentally reaching the body of the vacuum pump;

A vacuum switch with the function of allowing to turn on and off the vacuum pump when the vacuum pressure reach at desired target;

In this experiment, a vacuum-based bioreactor was fed with primary sludge collected from the underflow of a primary clarification unit located at a municipal wastewater facility. The experiments were conducted under thermophilic condition, and periodic vacuum application. No external inoculum was used to start up the bioreactor. The experiment conditions are reported in Table 2.

TABLE 2

| | Experimental condition used during the test | | | |
|---|---|---|---|---|
| Contaminated Mixture | Temperature | Vacuum pressure | Hours of vacuum operation per day | Mixing |
| Primary sludge from municipal wastewater | 50-70° C. | 200-300 mbar | 2-4 | Mechanical or Manual |

The standard operating procedure followed during experimentation was composed of the following major steps:
1. Turn on the chiller.
2. Set the target vacuum pressure as 400-500 mbar using the vacuum controller.
3. Run the vacuum pump to get to the target pressure in the treatment chamber.
4. Evacuate the biogas by vacuum.

5. Gradually reduce the pressure (via the vacuum controller) until 200-300 mbar.

6. Once boiling conditions are reached, collect the evaporate as condensate.

7. Once the desired condensate volume has been removed, turn off the vacuum pump. In this experiment, the vacuum pump was turned off when $\frac{1}{20}^{th}$ to $\frac{1}{5}^{th}$ the volume of the reactor was removed, e.g., about 150-600 ml.

8. Extract the condensate from the condensate bottle and measure its volume.

9. Feed into the treatment chamber as much contaminated mixture (primary sludge) as the amount of condensate extracted so that the overall volume of is kept to 3 liters.

10. Activate the mixer.

11. Leave the system for 24 hour, and the next day repeat 1-10.

As indicated above, one aspect of certain embodiments is the possibility of carrying out simultaneous thickening, digestion and dewatering of the contaminated matrix. As such, the concentration in the treatment chamber can be controlled to increase over time. In this experimentation, when the concentration of the contaminated mixture reached value that was no longer compatible with torque applied by the mechanical mixing used in the lab system (e.g., total solids>10-15% total solids), mechanical mixing was no longer provided, and the untreated contaminated mixture (fresh primary sludge) was mixed with the residual contaminated mixture (accumulated in the bioreactor) only manually, and once a day, by manually stirring the system using the mixing shaft.

Tables 4-6 below respectively show several measured attributes of the feed, the condensate, and the fermentate/digestate over a 156 day experimental period.

The test methods for each attribute are shown in Table 3 below.

TABLE 3

Test Methods

| No | Character | Method |
|---|---|---|
| 1 | pH, Conductivity | For pH: probe type Hach Multi Meter HQ 40d pH: PHC725 For Conductivity: probe type # CDC401 |
| 2 | COD | Hach Method 8000 (appended hereto) |
| 3 | VFAs | Hach Method 10240 (appended hereto) |
| 4 | sP (Phosphorus, Total) | Hach Method 10127 (appended hereto) |
| 5 | NH3-N | Hach Method 10031 (appended hereto) |
| 6 | TS, VS | Standard Method 2540 Solids (2017) |

Feed Characteristics:

TABLE 4

Characteristics of the primary sludge used as a feed

| T Day | pH — | Cond mS/ cm | TCOD mg/ L | sCOD mg/ L | VFA mg/ L | sP mg/ L | NH4 mg/ L | TS % | VS % |
|---|---|---|---|---|---|---|---|---|---|
| 1 | 6.6 | 1.77 | 29,500 | 1063 | 433.4 | n/a | | 2.3 | 1.4 |
| 8 | 6.29 | 1.92 | 24,333 | 1283 | 795.0 | n/a | 63.5 | 2.2 | 1.5 |
| 15 | 6.66 | 1.90 | 27,433 | 953 | 471.3 | n/a | 40.8 | 2.9 | 1.8 |
| 22 | 6.38 | 2.50 | 35,600 | 1635 | 909.0 | n/a | 84.0 | 2.7 | 2.1 |
| 29 | 6.5 | 1.52 | 37,200 | 730 | 296.9 | n/a | 33.7 | 3.5 | 2.4 |

TABLE 4-continued

Characteristics of the primary sludge used as a feed

| T Day | pH — | Cond mS/ cm | TCOD mg/ L | sCOD mg/ L | VFA mg/ L | sP mg/ L | NH4 mg/ L | TS % | VS % |
|---|---|---|---|---|---|---|---|---|---|
| 36 | 6.4 | 2.00 | 32,600 | 825 | 425.9 | n/a | 42.7 | 2.9 | 2.1 |
| 50 | 6.23 | 2.16 | 29,000 | 660 | 332.8 | 76 | 25 | 3.3 | 2.1 |
| 57 | 6.47 | 1.80 | 28,600 | 730 | 353.6 | 73.2 | 73.2 | 2.3 | 1.8 |
| 64 | 6.66 | 1.76 | 26,500 | 965 | 548.9 | 63.3 | 42.3 | 2.4 | 1.7 |
| 71 | 6.68 | 1.76 | 37,400 | 895 | 424.8 | 53 | 54.4 | 2.8 | 1.9 |
| 78 | 5.98 | 2.27 | 22,550 | 1885 | 997.2 | 95.7 | 73.3 | 2.8 | 1.9 |
| 85 | 6.61 | 2.21 | 39,550 | 1180 | 621.7 | 16.7 | 51.1 | 3.2 | 2.4 |
| 92 | 6.54 | 1.84 | 34,950 | 1315 | 631.3 | 54 | 39.2 | 3.0 | 2.0 |
| 99 | 6.68 | 2.34 | 39,550 | 2340 | 1283.5 | 15.8 | 93.6 | 3.0 | 2.1 |
| 106 | 6.05 | 1.75 | 51,750 | 1865 | 1046.5 | 124.4 | 50.1 | 3.3 | 2.5 |
| 113 | 6.72 | 1.60 | 45,350 | 958 | 520.6 | 12.4 | 55.2 | 2.3 | 1.5 |
| 120 | 6.39 | 2.22 | 24,950 | 2070 | 914.0 | 10.6 | 84.9 | 2.2 | 1.5 |
| 127 | 5.58 | 2.29 | 38,050 | 2430 | 1358.4 | 138.3 | 54.9 | 3.1 | 2.4 |
| 134 | 5.39 | 2.26 | 44,000 | 3420 | 1691.7 | 16.3 | 50.9 | 3.3 | 2.4 |
| 141 | 6.28 | 1.87 | 42,500 | 2055 | 1036.3 | 59.7 | 86.2 | 3.6 | 2.6 |
| 149 | 6.07 | 2.12 | 35,500 | 1720 | 1010.6 | 106.6 | 69.7 | 2.9 | 2.2 |
| 156 | 6.46 | 1.56 | 34,550 | 1130 | 534.6 | 94.1 | 37.8 | 2.9 | 2.2 |

These measured values are illustrated graphically in FIGS. 12-21.

Condensate Characteristics:

TABLE 5

Characteristics of condensate extracted by evaporation

| Time Day | pH — | Cond mS/ cm | TCOD mg/ L | sCOD mg/ L | VFA mg/ L | sP mg/ L | NH4 mg/ L | TSS mg/ L |
|---|---|---|---|---|---|---|---|---|
| 1 | 9.26 | 0.22 | 317 | 290 | 24.8 | n/a | n/a | 5.6 |
| 8 | 6.96 | 0.12 | 160 | 137 | 42.4 | n/a | 16.4 | 2.4 |
| 15 | 6.65 | 0.12 | 197 | 123 | 57.4 | n/a | 15.9 | 1.2 |
| 22 | 6.21 | 0.35 | 340 | 280 | 45.5 | n/a | 15.3 | 2.4 |
| 29 | 7.87 | 0.13 | 175 | 230 | 59.0 | n/a | 16.1 | 7.6 |
| 36 | 4.79 | 0.10 | 440 | 190 | 69.1 | n/a | 11.8 | 4 |
| 50 | 4.33 | 0.19 | 375 | n/a | 163.7 | 5.6 | 5.6 | 3.2 |
| 57 | 4.66 | 0.25 | 375 | 330 | 215.1 | 3.8 | 22.8 | 10.0 |
| 64 | 3.79 | 0.09 | 320 | 325 | 138.5 | 3.8 | 5.4 | 5.3 |
| 71 | 5.26 | 0.30 | 565 | 510 | 210.7 | 3.6 | 31.2 | 6.8 |
| 78 | 6.86 | 0.28 | 570 | 595 | 149.8 | 4.4 | 33 | 9.2 |
| 85 | 5.28 | 0.35 | 710 | 620 | 253.6 | 4.9 | 39.6 | 1.2 |
| 92 | 6.41 | 0.46 | 796 | 860 | 226.8 | 5 | 57.8 | 3.2 |
| 99 | 6.03 | 0.53 | 890 | 840 | 230.6 | 4.4 | 58.7 | 4.0 |
| 106 | 5.39 | 0.58 | 1230 | 570 | 347.8 | 47.8 | 71.7 | 2.2 |
| 113 | 4.41 | 0.43 | 1875 | 2190 | 522.7 | n/a | n/a | 5.5 |
| 120 | 4.63 | 0.91 | 1920 | 1740 | 671.5 | 70.3 | 87.5 | 18.8 |
| 127 | 4.17 | 0.36 | 1595 | 1555 | 382.0 | 59.1 | 16.7 | 3.5 |
| 134 | 3.81 | 0.18 | 2025 | 1935 | 554.3 | 66.8 | 14.7 | 1.5 |
| 141 | 3.68 | 0.18 | 1825 | 1675 | 486.9 | 66.7 | 15.8 | 2.1 |
| 149 | 4.03 | 0.20 | 1620 | 1480 | 454.8 | 64.7 | 20.2 | 0.4 |
| 156 | 3.98 | 0.24 | 1735 | 1820 | 485.4 | 43 | 19.7 | 1.9 |

These measured values are illustrated graphically in FIGS. 22-29.

The data measured from the condensate shows that the produced water portion is substantially superior as compared to a produced water portion that would be generated in a conventional digester system, e.g., from centrifuging the sludge. In this regard, the TSS results shown above show that the condensate is virtually solid-free. By comparison, the TSS of centrifuge water in a conventional process may be in the range of 1,000-10,000 mg/L. Similarly, the values for the ammonia, soluble phosphorous, VFAs, and COD are substantially lower than would be obtained in a conventional process from a centrifuge. The result is a much cleaner water portion that can be recycled upstream in the plant, for example.

Alternatively, as indicated above, the pH, temperature, and/or salinity can be adjusted/controlled to flash off ammonia and/or VFAs into the condensate to produce a fraction that is relatively richer in those components. For example, a VFA rich fraction could be produced and recycled as a carbon source in the system. The pH can be controlled by adding a pH adjusting agent, such as a base.

Fermentate/Digestate Characteristics:

enriched in VFAs and has the potential of being used as an external carbon source in BRN plants. High levels of propionic acid are useful since propionic acid is preferred for biological phosphorous removal. The process can be controlled to concentrate propionic acid levels to more than 250 mg/L, more than 500 mg/L, or from 600-1000 mg/L, for example. Same considerations applies for the condensate stream, whose VFA content is comparable with the primary

TABLE 6

Characteristics of fermentate/digestate accumulated in the treatment chamber

| Time Day | pH — | Cond mS/cm | TCOD mg/L | sCOD mg/L | VFA mg/L | sP mg/L | NH4 mg/L | TS % | VS % |
|---|---|---|---|---|---|---|---|---|---|
| 1 | 6.7 | 1.7 | 22466.7 | 3430.0 | 368.4 | n/a | n/a | 4.2 | 1.0 |
| 8 | 6.2 | 3.1 | 33966.7 | 7463.3 | 1072.5 | n/a | 110.8 | 3.0 | 1.8 |
| 15 | 6.1 | 4.2 | 46466.7 | 9420.0 | 1446.1 | n/a | 221.0 | 3.3 | 2.2 |
| 22 | 5.9 | 5.0 | 43200.0 | 11995.0 | 2236.3 | n/a | 230.0 | 3.5 | 2.5 |
| 29 | 5.9 | 5.2 | 41800.0 | 13330.0 | 2201.5 | n/a | 247.0 | 3.6 | 2.7 |
| 36 | 5.7 | 5.8 | 58650.0 | 14830.0 | 2484.0 | n/a | 304.0 | 4.5 | 3.3 |
| 50 | 5.7 | n/a | 182700.0 | 22875.0 | 4603.1 | 457.5 | 552.0 | 16.2 | 11.0 |
| 57 | 5.7 | 6.6 | 194550.0 | 32545.0 | 4924.7 | 556.0 | 597.3 | 17.1 | 11.5 |
| 64 | 5.7 | 8.6 | 180100.0 | 37900.0 | 6414.7 | 1142.0 | 634.0 | 16.9 | 11.4 |
| 71 | 5.9 | 6.4 | 162000.0 | 24291.7 | 3994.7 | 675.0 | 474.2 | 14.5 | 9.6 |
| 78 | 5.9 | 7.2 | 161778.7 | 30669.3 | 5201.1 | 775.4 | 600.2 | 16.1 | 10.8 |
| 85 | 5.8 | 11.6 | 135171.7 | 30300.0 | 5934.8 | 430.3 | 845.8 | 17.3 | 11.6 |
| 92 | 6.0 | 9.9 | 253923.5 | 30856.6 | 6397.1 | 501.0 | 1035.4 | 17.4 | 11.9 |
| 99 | 6.0 | 11.7 | 260334.9 | 36818.5 | 12313.6 | 394.8 | 1402.8 | 19.8 | 13.6 |
| 106 | 6.0 | 9.0 | 268569.0 | 44848.5 | 10286.0 | 374.1 | 1872.0 | 21.0 | 14.1 |
| 113 | 6.0 | 6.4 | 311880.0 | 40342.0 | 8820.2 | 303.6 | 1766.4 | 22.4 | 14.9 |
| 120 | 5.9 | 8.8 | 325454.4 | 59837.4 | 14018.7 | 432.0 | 2115.0 | 22.0 | 15.0 |
| 127 | 5.8 | 12.1 | 328754.4 | 57233.7 | 14600.4 | 675.9 | 2165.9 | 25.4 | 17.2 |
| 134 | 5.7 | 10.9 | 267553.5 | 31450.0 | 8398.0 | 311.7 | 1267.3 | 24.4 | 16.3 |
| 141 | 5.7 | 21.0 | 424212.6 | 36960.0 | 10642.4 | 807.3 | n/a | 28.4 | 19.2 |
| 149 | 5.9 | 12.9 | 445346.0 | 40386.8 | 14701.8 | 1046.6 | 2133.3 | 28.9 | 19.5 |
| 156 | 5.9 | 16.3 | 501147.1 | 30258.6 | 9792.9 | 772.9 | 1674.3 | 28.0 | 19.0 |

These measured values are illustrated graphically in FIGS. 30-39.

As indicated above, the vacuum bioprocess described herein can be controlled to concentrate the solids in the fermentate/digestate to levels that far exceed conventional digesters, e.g., from 4-90%, 5-40%, 10-35%, or 20-30%. Additionally, non-volatile components such as ammonia can be highly concentrated, which improves the value of the fermentate/digestate as a fertilizer, for example. The ammonia can be concentrated at levels in a range of greater than 100 mg/L, greater than 500 mg/L, greater than 750 mg/L, 100 mg/L to 50.00 mg/L, 500 mg/L to 5,000 mg/L, or 1000 mg/L to 2500 mg/L. Likewise, since the VFAs can be concentrated in the sludge, it may be useful as a carbon source in the system. The VFAs can be concentrated to levels that are in a range of from 100 mg/L to 50,000 mg/L, greater than 1,000 mg/L, greater than 2500 mg/L, greater than 5,000 mg/L, or 10,000-15,000 mg/L, for example. The total COD in the system shows a periodicity, e.g., between 60-90 days and 130-140 days that likely indicates that different microbes are taking over as the sludge composition changes.

Figure 39:
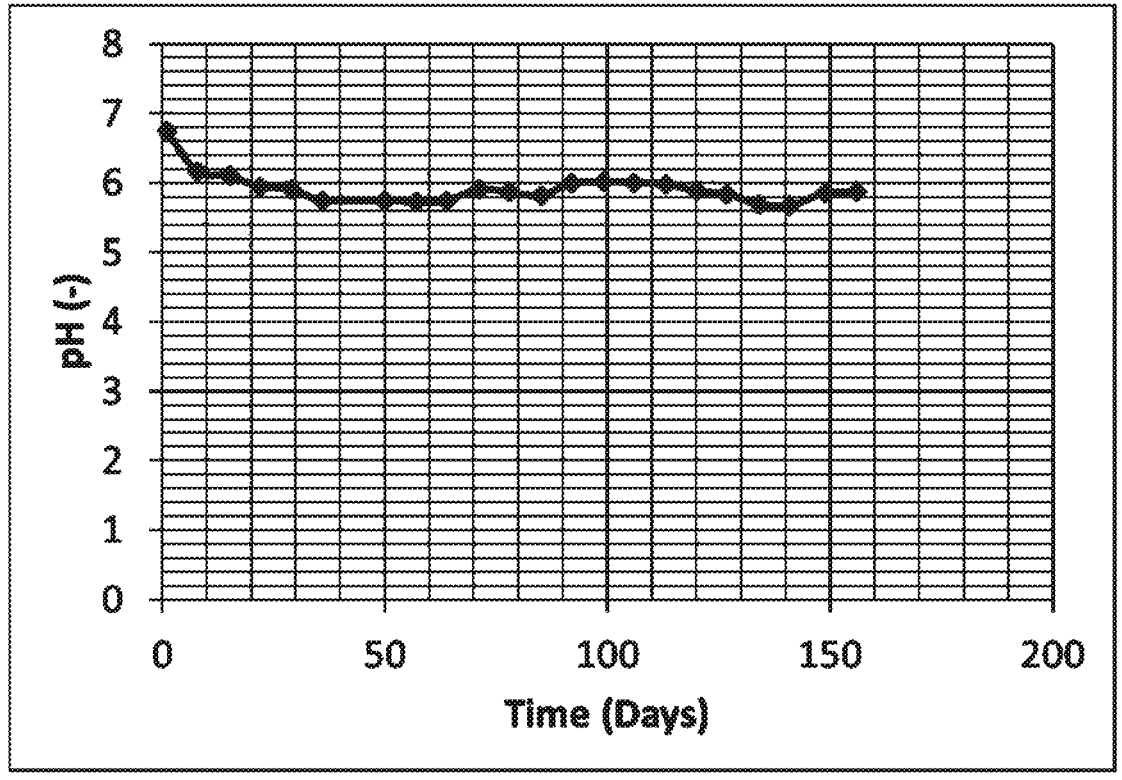

As can be seen in FIG. 39, the pH of the fermentate/digestate is substantially stable over time (e.g., varying by less than +/−0.5 over periods of 50 days or more). This is a surprising effect, and is believed to be due to the CO2 and VFAs being stripped out of the fermentate and into the evaporate.

The composition of volatile fatty acid of each process stream was tested. The sample was collected on day 50, and results of VFAs compositions are reported in Table 7. Results clearly show that the fermentate/digestate is sludge (feed) but with a much higher purity in composition (which makes it an ideal product for the chemical industry and suitable for storage purposes).

TABLE 7

Composition of Volatile Fatty Acids

| Volatile Fatty Acids | Lowest Detection Limit | Units | Primary Sludge | Digestate Fermentate | Condensate |
|---|---|---|---|---|---|
| Acetic Acid | 10.0 | mg/L | 210.0 | 3400.0 | 108.0 |
| Butyric Acid | 1.0 | mg/L | 16.6 | 132.8 | 15.1 |
| Caproic (Hexanoic) Acid | 1.0 | mg/L | <1.0 | <4.0 | <1.0 |
| Formic Acid | 30.0 | mg/L | <30 | 220.0 | <30 |
| Isobutyric Acid | 1.0 | mg/L | 2.7 | <4.0 | 3.6 |
| Isovaleric Acid | 1.0 | mg/L | 1.4 | 13.6 | 3.1 |
| Propionic Acid | 5.0 | mg/L | 92.5 | 744.0 | 56.6 |
| Valeric Acid | 1.0 | mg/L | 2.7 | 19.6 | 3.1 |

Figure 40:
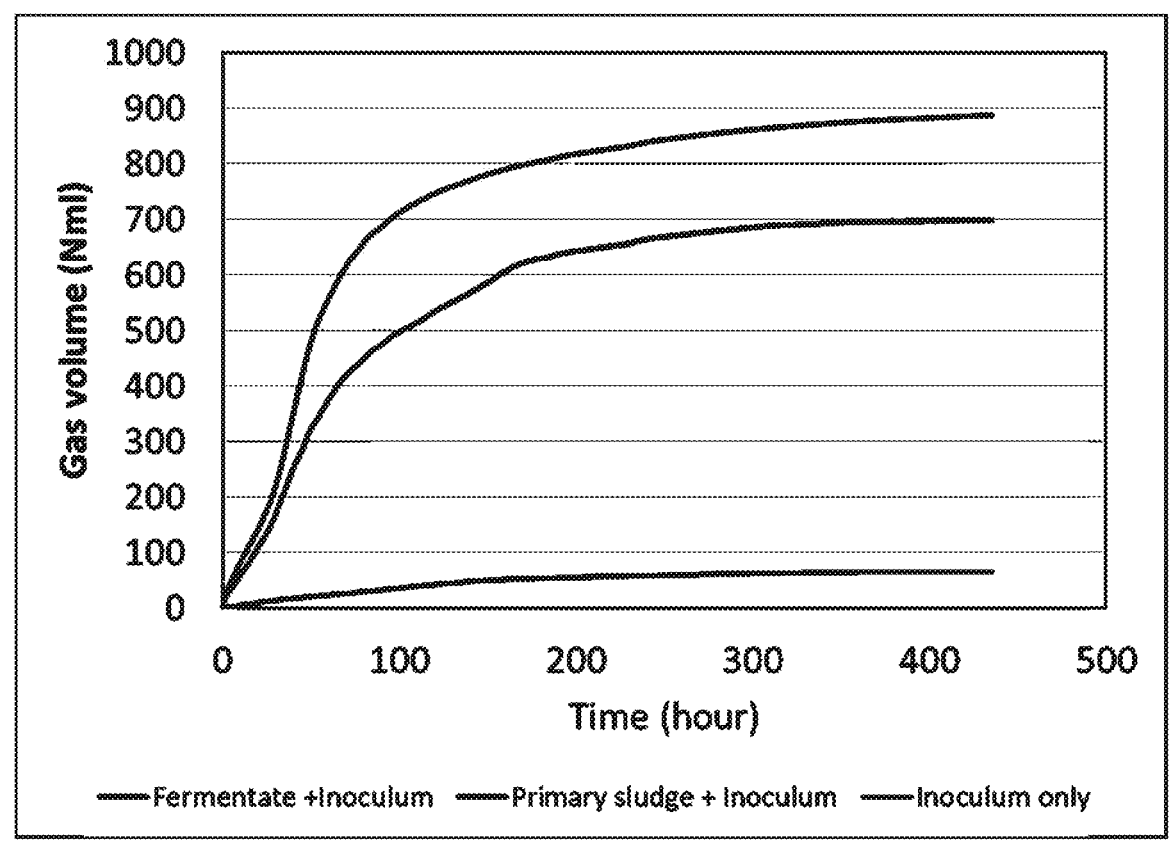
FIG. 40 is a graph showing the results of the biochemical methane potential test.

A biochemical methane potential test was also performed with concentrated mixture from the treatment chamber (digestate/fermentate) which was collected on day 71. This test was performed using a food to microorganism (F/M) ratio of 0.5 g COD of substrate per g VS of inoculum. The BMP test was conducted under mesophilic conditions, with the reactors placed in a heating bath at 40° C., continuously stirring at 150 rpm. Results, reported in FIG. 40 show that the prolonged pre-treatment using the method and system disclosed in herein also enhanced the methane potential of the treated feed, which indicates that the treated feed can produce more biogas. This enables the possibility of integrating the methods and systems in existing treatment schemes as pre-treatment prior to digestion.

Volume and Mass Balances

Based on the above results, it is possible to compute and report the following balances for some key process indicators such as:

Volumetric mass balance and volumetric concentration efficiency

Total chemical oxygen demand (COD) mass balance (integral) and COD destruction efficiency Total volatile solids (VS) mass balance (integral) and VS destruction efficiency Total solids (TS) mass balance and TS destruction efficiency The following expression provides the volumetric mass balance:

VOLUME NON CONDENSABLE GASES=(CU-
MULATIVE VOLUME FED TO THE TREAT-
MENT CHAMBER–CUMULATIVE VOLUME
OF THE CONDENSATE COLLECTED FROM
THE TREATMENT CHAMBER)

Figure 41:
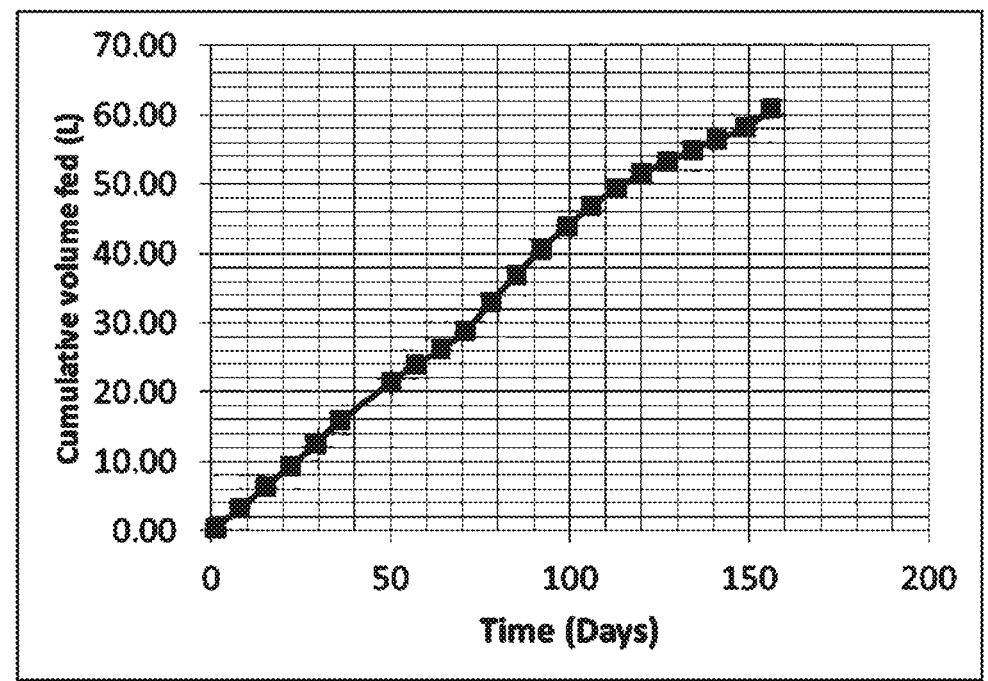
FIG. 41 is a graph showing the cumulative volume of the contaminated mixture fed to the bioreactor.
Figure 42:
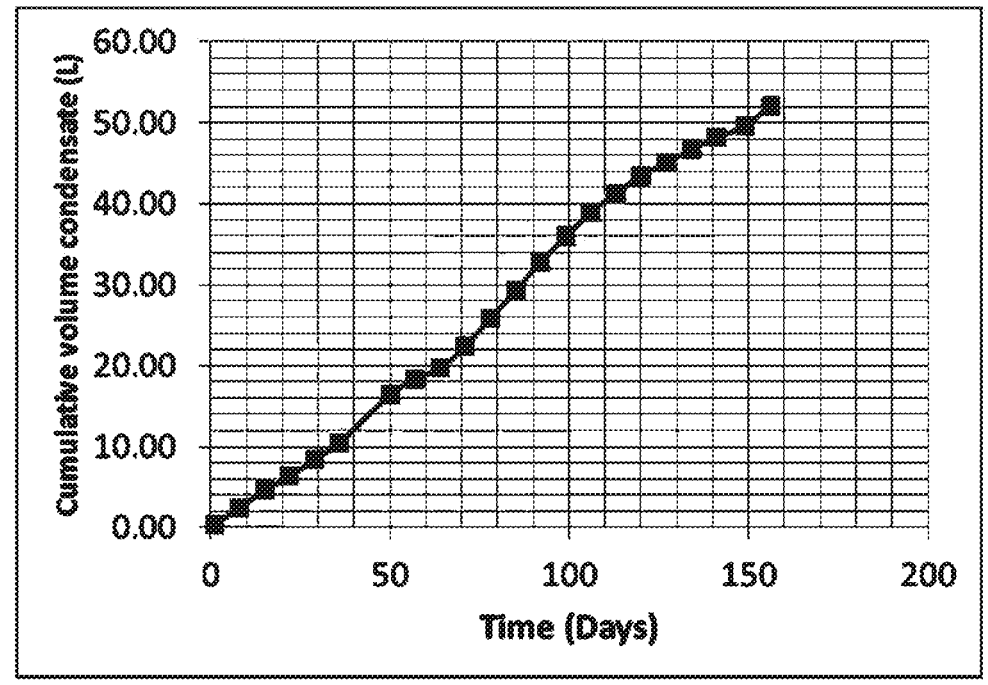
FIG. 42 is a graph showing the cumulative volume of the condensable product collected from the bioreactor.
Figure 43:
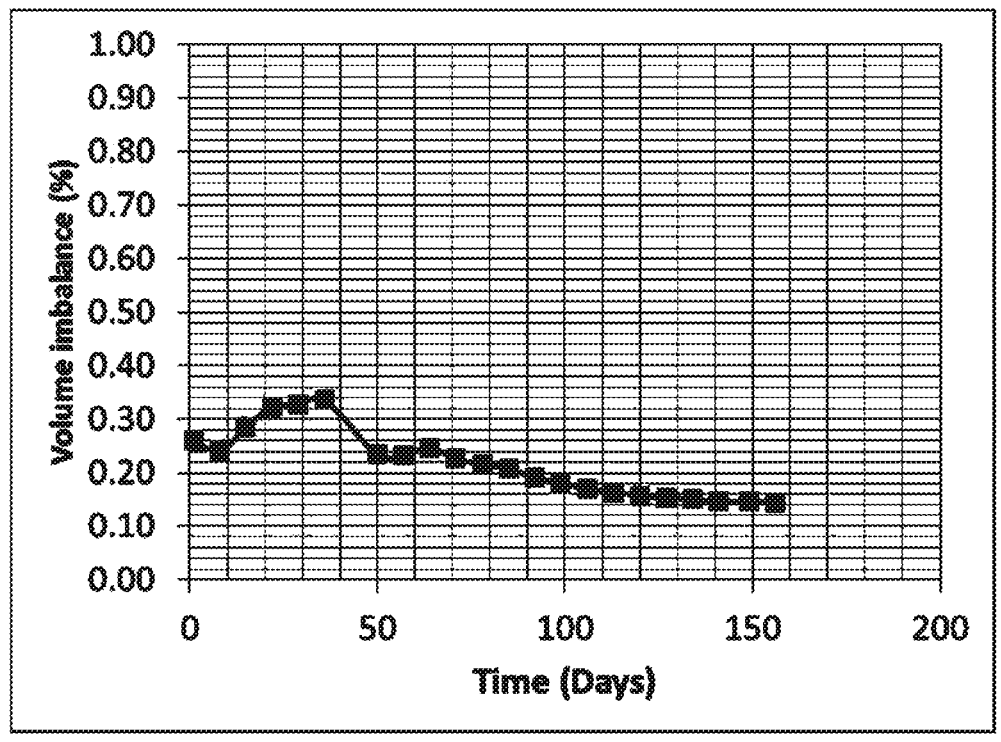
FIG. 43 is a graph showing the volume imbalance, which is presumed to be equal to the non-condensable gases.

FIG. 41 is a graph showing the cumulative volume fed to the system, and FIG. 42 is the cumulative volume of the condensate that was collected. FIG. 43 illustrates the volume imbalance, which is assumed to be equal to the non-condensable gases.

Figure 44:
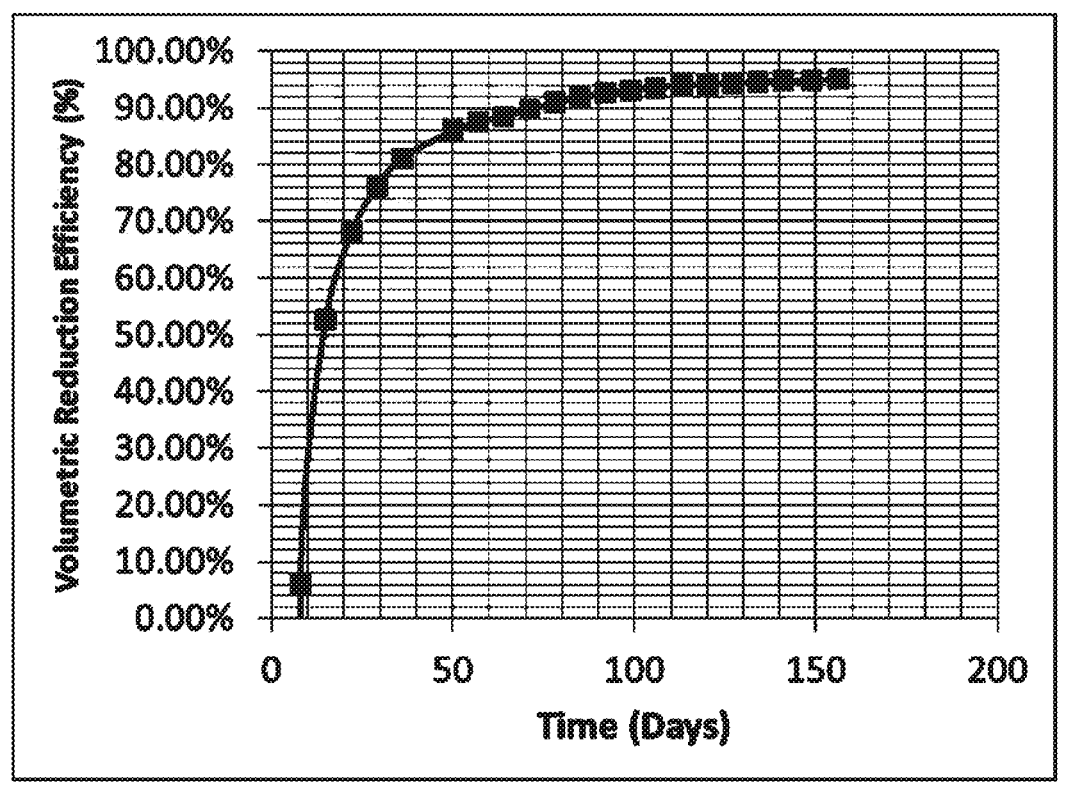
FIG. 44 is a graph showing the volumetric reduction efficiency of the contaminated mixture used in the example.

Using the information presented in FIG. 41, and considering the operating volume of the reactor equal to 3 L, it is possible to estimate the volume reduction efficiency (FIG. 44), which can be obtained from the formula:

VOLUMETRIC REDUCTION EFFICIENCY (%)=
[(1)−(2)]/(1)*100

Where:

(1)=SUMMATION, FROM THE START TO THE EXPERIMENT TO THE GIVEN TIME OF INTEREST, OF THE VOLUME FED TO THE TREATMENT SYSTEM (2)=VOLUME OF MIXTURE IN THE TREATMENT SYSTEM=3 LITRES

In the embodiments, the bioprocess vacuum reactor can be controlled so that the volumetric reduction efficiency is in the range of 50-99.99%, including greater than 70%, greater than 80%, and greater than 90%. This is significant because it shows that the volume of sludge can be dramatically reduced as compared to the feed. So, for example, the process can be controlled so that less than 10% or less than 5% of the fed volume exists as the concentrated sludge.

The next calculated balances are related to the performance of the treatment system disclosed in this invention and can be obtained by mass balances of TS, VS and COD. Specifically, it is possible to estimate the degradation efficiency of the system in terms of total solids reduction using the formula reported below:

NET MASS (TOTAL SOLIDS) FED TO THE SYSTEM
AT ANY GIVEN TIME = (1-f) − (2-c) − (2-fs)
REDUCTION EFFICIENCY OF TOTAL SOLIDS (%) =
[(NET MASS FED − (3-v))/NET MASS FED]*100

Figure 45:
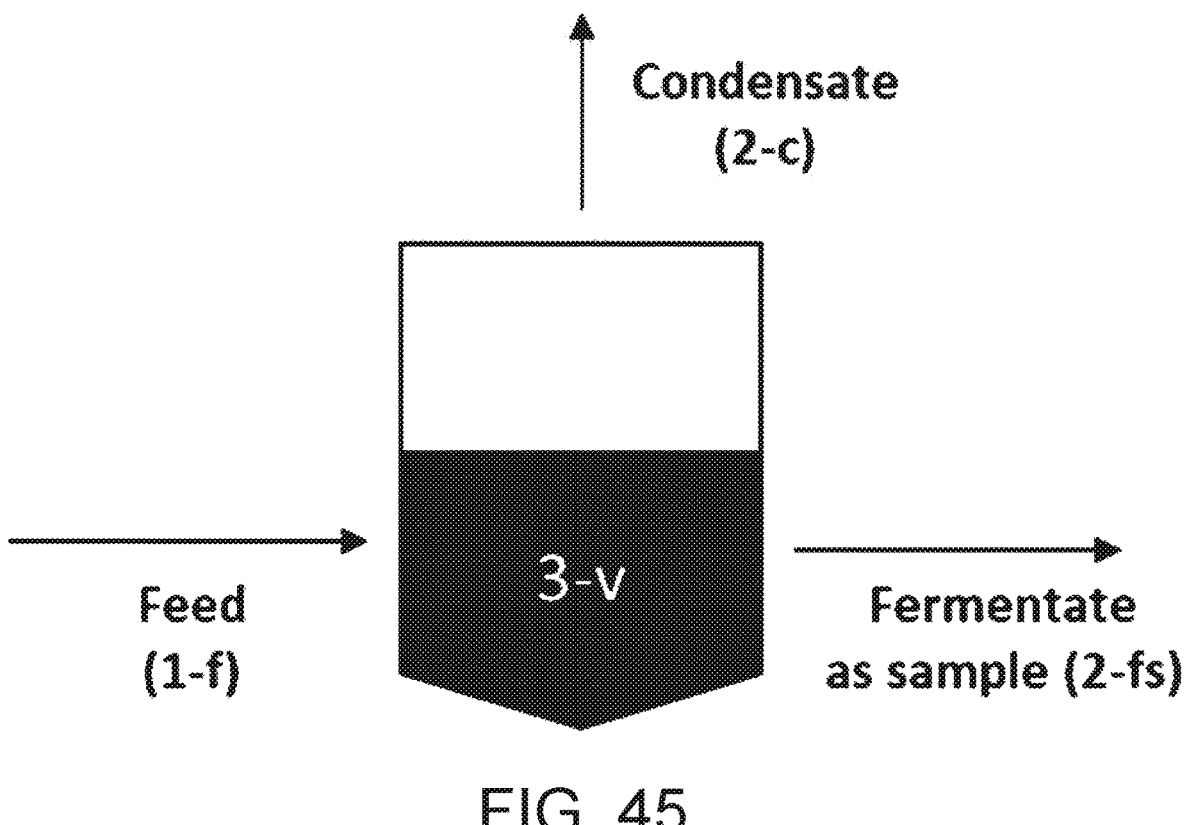
FIG. 45 is a diagram showing the variables for a mass balance of the system.
Figure 46:
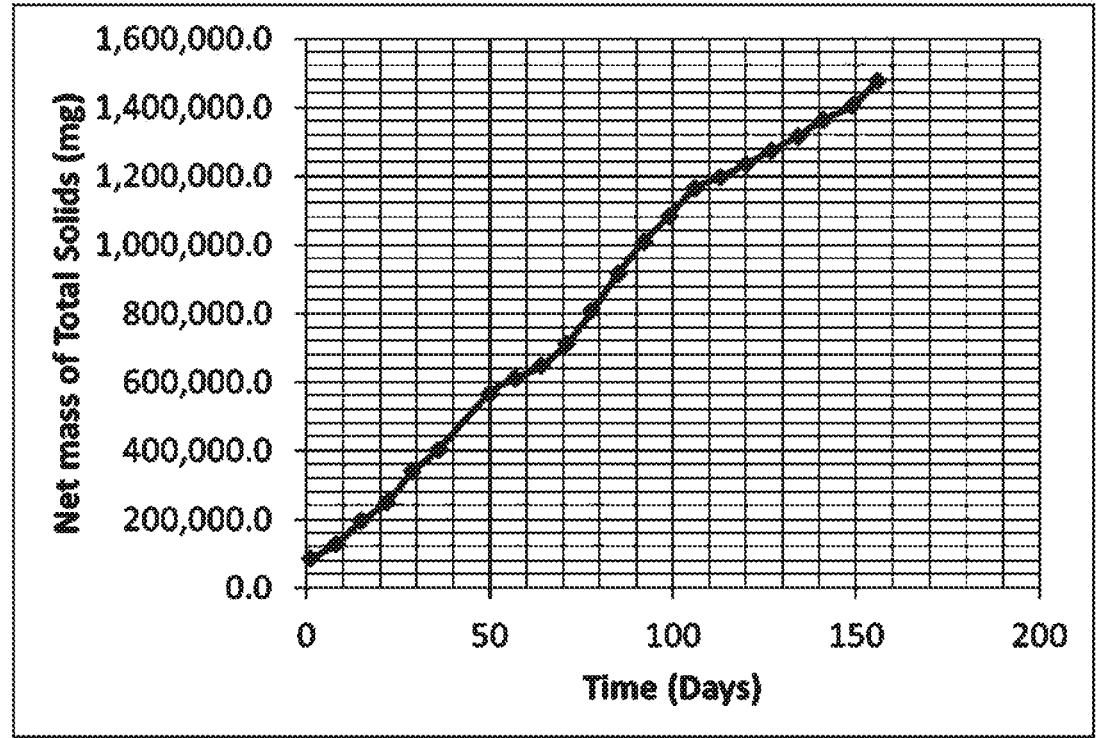
FIGS. 46-49 are graphs showing the total solids mass balance calculations.
Figure 47:
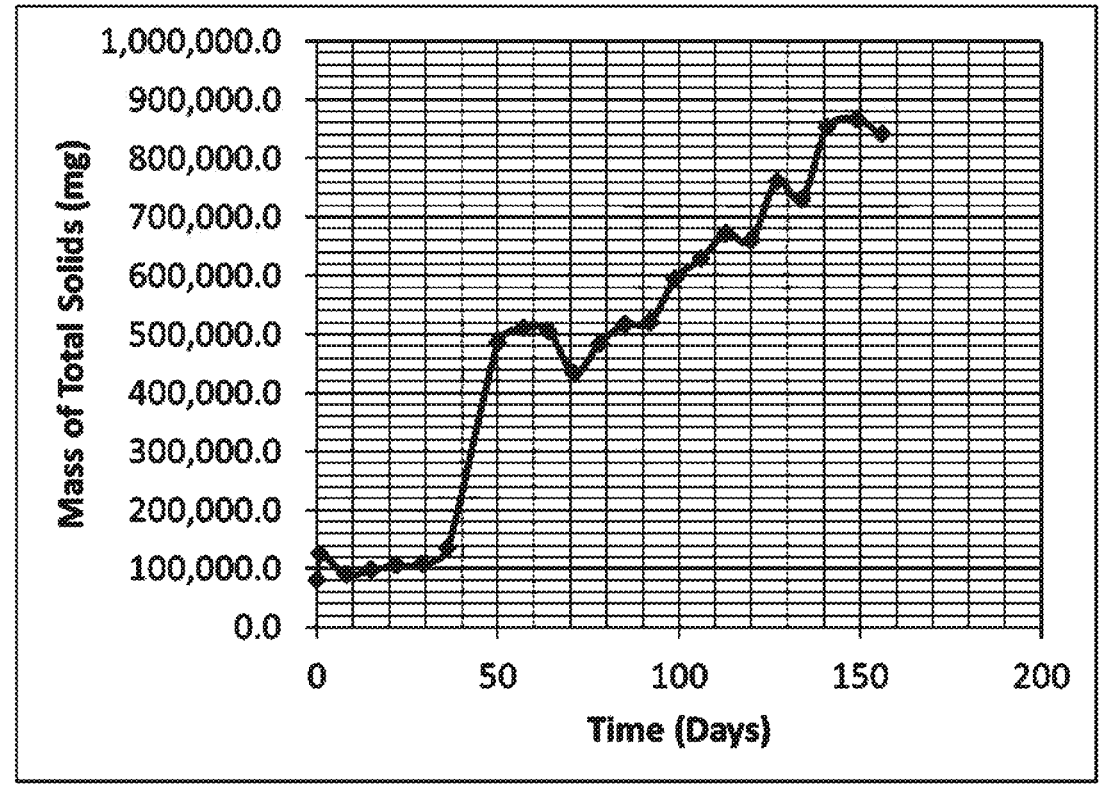

Where:

(1-f)—Mass of Feed mixture (2-c)—Mass of Condensate (2-fs)—Mass of Sampled Digestate/fermentate (3-v)—Mass of Digestate/fermentate in the bioreactor FIG. 45 illustrates a diagram for mass balance, and shows the variables in the above equation.

The calculations was carried out for total solid (TS), volatile solids (VS) and total chemical oxygen demand (TCOD). The following figures and tables report the net mass of the pollutant (TS, VS, TCOD) fed to the system (at any given time), the mass of the pollutant (TS, VS, TCOD) present in the system at any given time and the removal efficiency of the pollutant (TS, VS, TCOD) at any given time.

The result of the mass balance calculations for total solids is summarized in table 8:

TABLE 8

| | | | | | | |
| --- | --- | --- | --- | --- | --- | --- |
| The result of mass balance calculation of total solids | | | | | | |
| Day | 1-f (mg) | 2-c (mg) | 2-fs (mg) | Net (mg) | 3-v (mg) | r-TS (%) |
| 0 | 80943.6 | 0 | 0 | 80943.6 | 80943.6 | |
| 1 | 90088.9 | 1.7 | 4180.8 | 85906.5 | 125422.8 | |
| 8 | 152268.7 | 6.8 | 25254.4 | 127007.5 | 90315.5 | 28.9 |
| 15 | 242765.7 | 9.3 | 48157.5 | 194598.9 | 98156.3 | 49.6 |
| 22 | 324498.6 | 13.6 | 72825.0 | 251660.0 | 105717.9 | 58.0 |
| 29 | 437621.8 | 29.6 | 97905.3 | 339686.9 | 107487.0 | 68.4 |
| 36 | 533009.0 | 38.0 | 129466.8 | 403504.3 | 135263.3 | 66.5 |
| 50 | 712691.7 | 56.6 | 145691.4 | 566943.7 | 486740.2 | 14.1 |
| 57 | 773634.3 | 76.9 | 162748.5 | 610809.0 | 511711.8 | 16.2 |
| 64 | 825615.1 | 83.8 | 179634.3 | 645897.1 | 506573.3 | 21.6 |
| 71 | 906555.1 | 102.5 | 194112.0 | 712340.5 | 434333.1 | 39.0 |
| 78 | 1017922.9 | 134.1 | 210251.1 | 807537.6 | 484172.3 | 40.0 |
| 85 | 1143635.9 | 138.3 | 227515.9 | 915981.8 | 517942.3 | 43.5 |
| 92 | 1252810.7 | 149.6 | 244874.3 | 1007786.8 | 520753.0 | 48.3 |
| 99 | 1348009.3 | 162.1 | 264721.6 | 1083125.6 | 595420.8 | 45.0 |
| 106 | 1448909.2 | 168.6 | 285693.6 | 1163047.0 | 629159.0 | 45.9 |
| 113 | 1504243.2 | 181.4 | 308136.9 | 1195925.0 | 673297.5 | 43.7 |
| 120 | 1553715.4 | 222.0 | 319145.4 | 1234348.0 | 660513.1 | 46.5 |
| 127 | 1606164.9 | 227.6 | 331827.0 | 1274110.2 | 760898.0 | 40.3 |
| 134 | 1659673.0 | 230.0 | 344017.2 | 1315425.8 | 731407.7 | 44.4 |
| 141 | 1716706.1 | 233.3 | 352542.4 | 1363930.4 | 852524.8 | 37.5 |
| 149 | 1766206.7 | 233.9 | 361214.5 | 1404758.4 | 867206.6 | 38.3 |
| 156 | 1846270.8 | 238.7 | 369618.5 | 1476413.6 | 840402.4 | 43.1 |

FIGS. 46-49 graphically show the results in Table 7 with respect to net mass of total solids, mass of total solids, and reduction efficiency of total solids at any given time.

Figure 48:
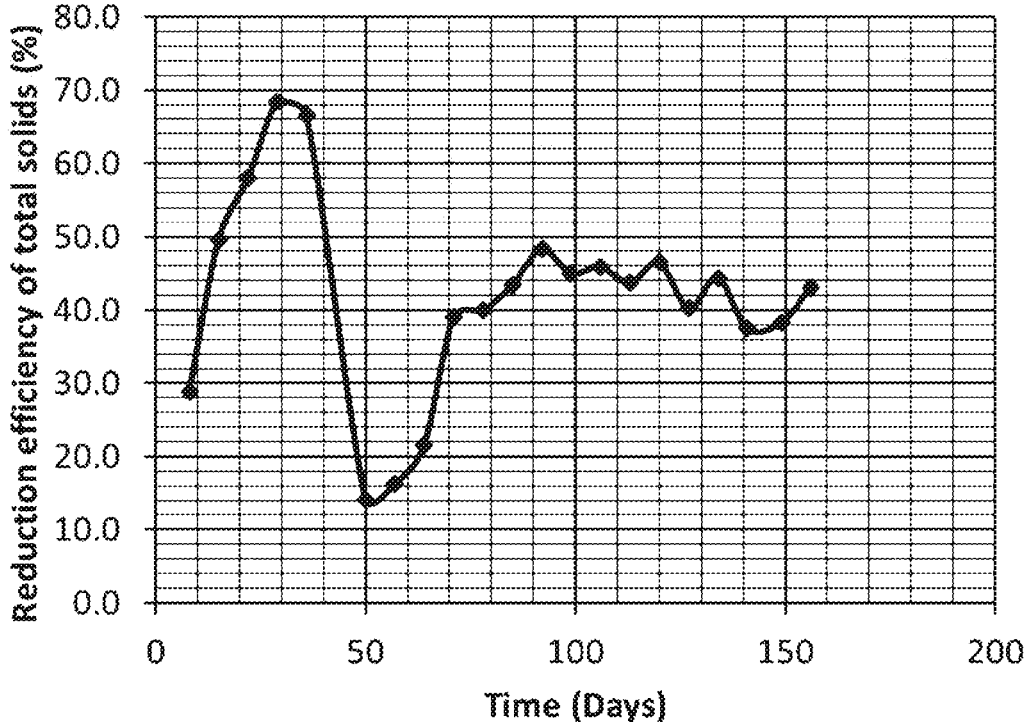

FIG. 48 demonstrates that the process can be controlled so that a substantial amount of the solids are being destroyed by the biochemical and physicochemical processes. The mass reduction efficiency of the total solids can be controlled to be greater than 5%, in the range of from 5% to 99%, from 20% to 70%, from 30 to 60%, or from 35 to 55%.

Figure 49:
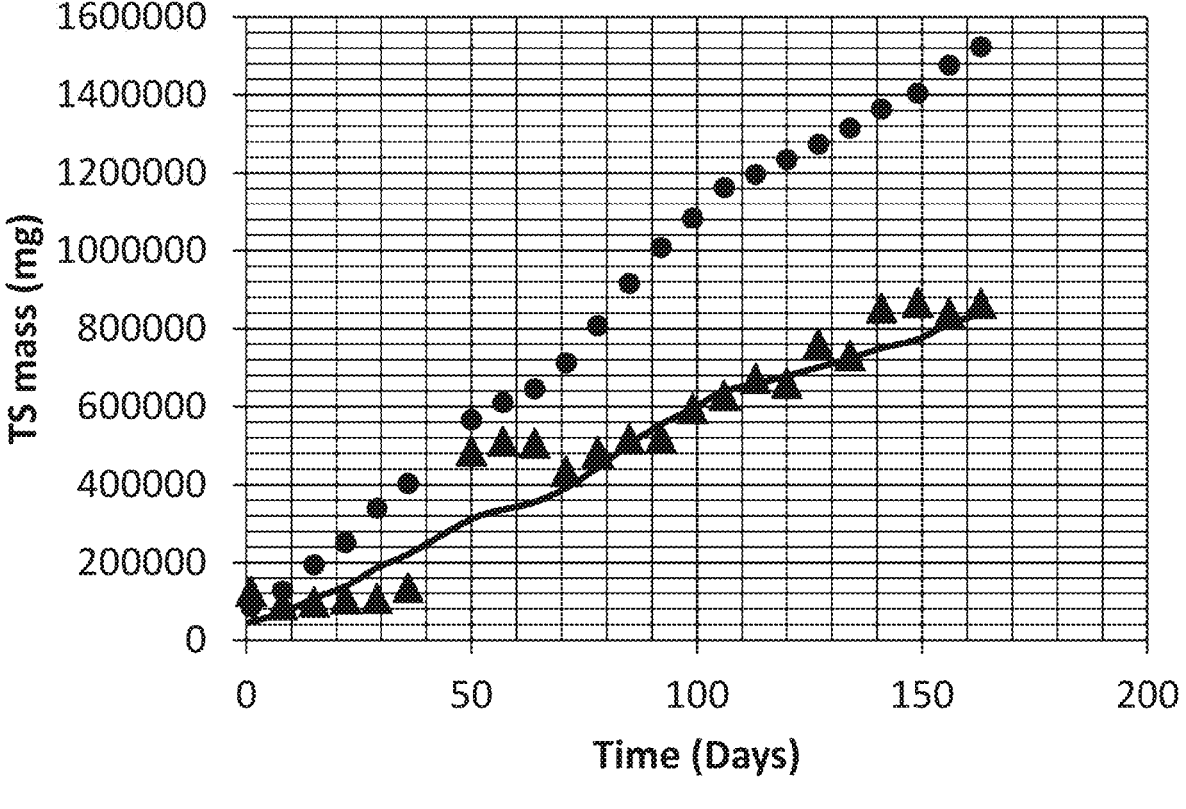
Figure 50:
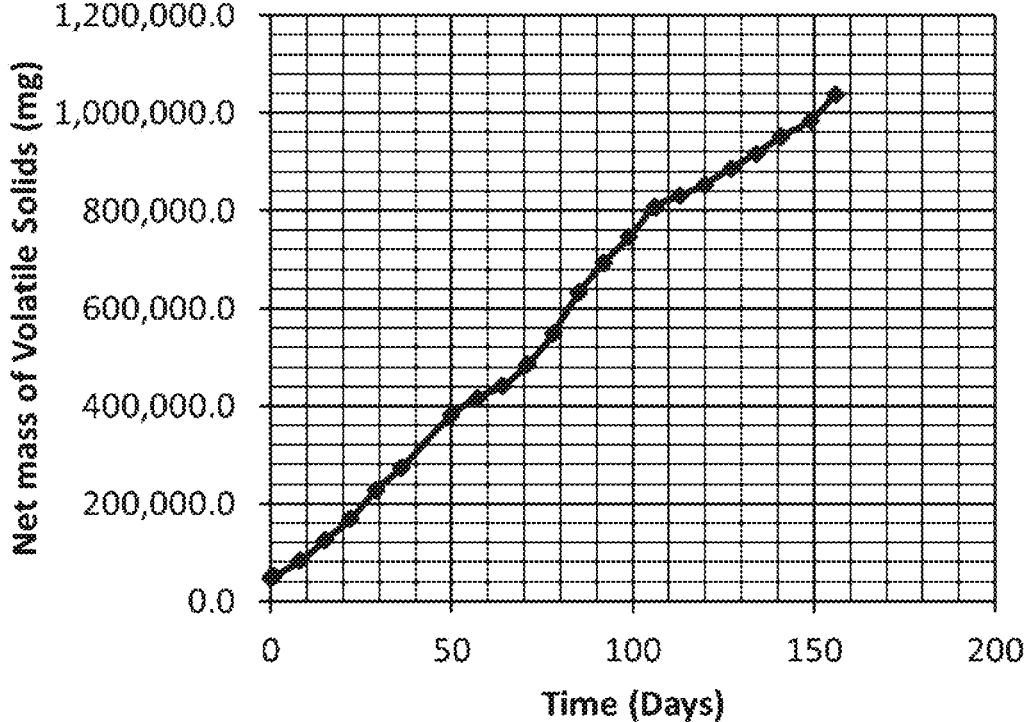
FIGS. 50-53 are graphs showing the mass balance calculations for volatile solids (VF)
Figure 51:
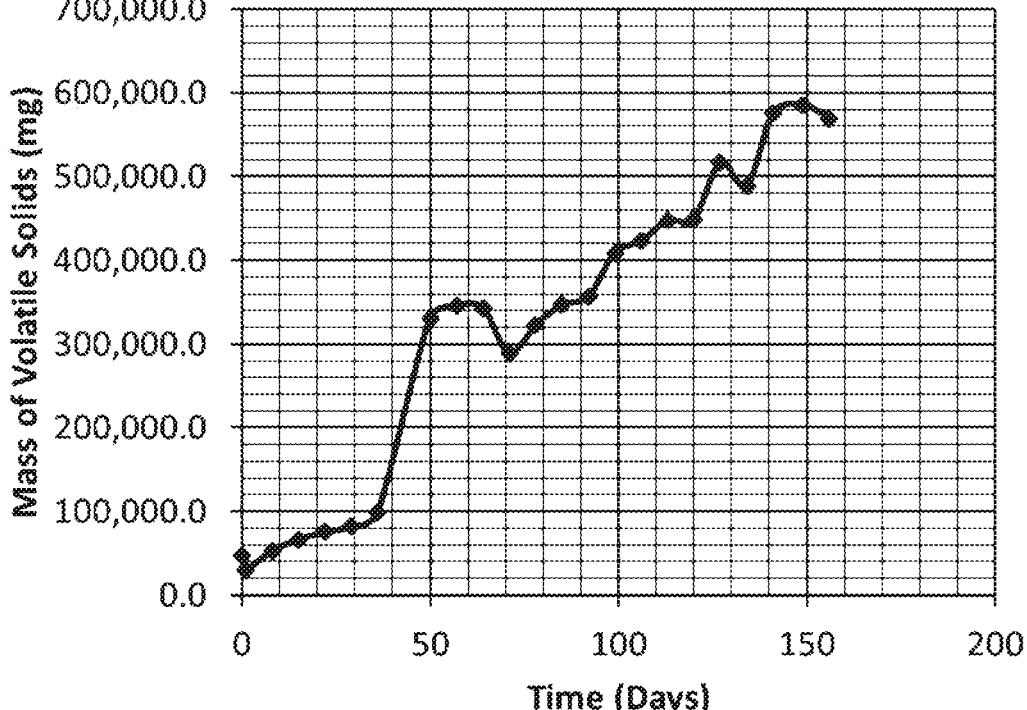
Figure 52:
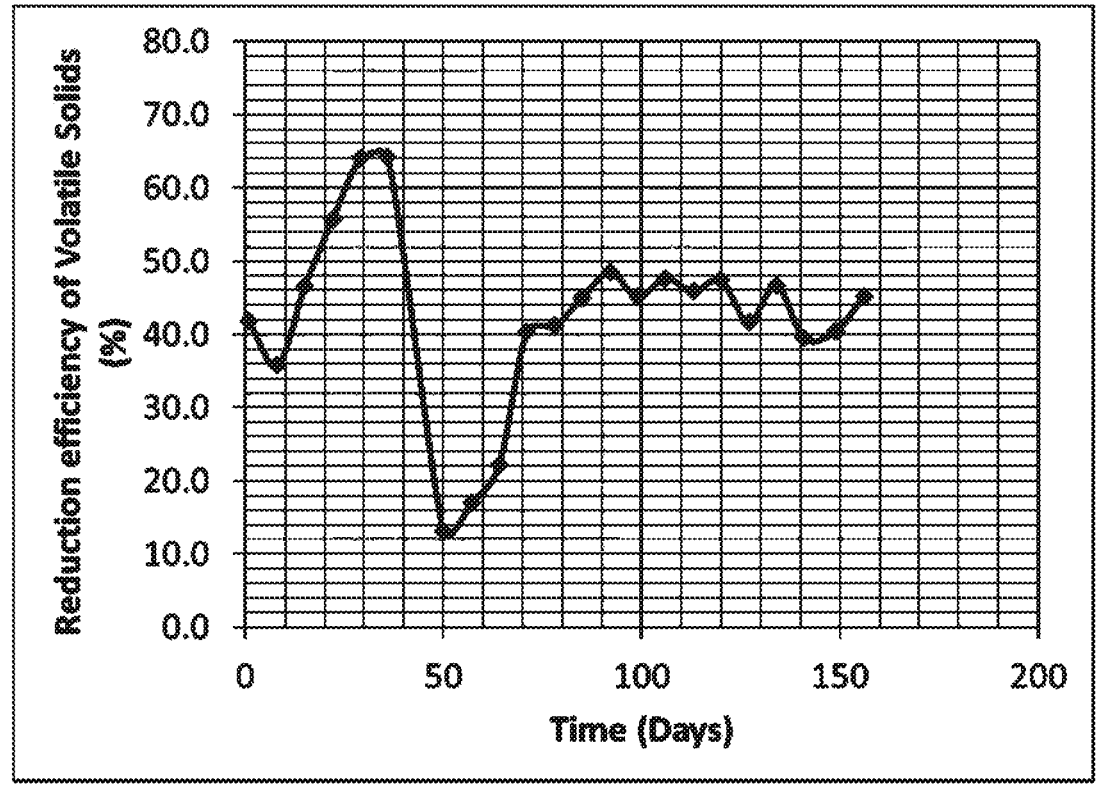

FIG. 49 graphically shows an integral total solids mass balance. The dots show the cumulative net TS mass entered in the treatment system (experimentally quantified). The triangles show the net TS mass accumulated in the treatment system (experimentally quantified). The line shows a model-predicted net TS mass accumulated in the treatment system assuming a degradation efficiency of 45%.

The results of mass balance calculations for volatile solids (VF) are summarized in table 9:

| | | | | | | |
| --- | --- | --- | --- | --- | --- | --- |
| Day | 1-f (mg) | 2-c (mg) | 2-fs (mg) | Net (mg) | 3-v (mg) | r-VS (%) |
| 0 | 47464.4 | 0.0 | 0.0 | 47464.4 | 47464.4 | 0.0 |
| 1 | 52918.2 | 0.0 | 1006.9 | 51911.3 | 30206.5 | 41.8 |
| 8 | 95830.1 | 0.0 | 13370.2 | 82459.9 | 52985.7 | 35.7 |
| 15 | 154058.1 | 0.0 | 28970.2 | 125087.9 | 66857.1 | 46.6 |
| 22 | 216573.6 | 0.0 | 46544.5 | 170029.1 | 75318.6 | 55.7 |
| 29 | 293376.2 | 0.0 | 65683.0 | 227693.1 | 82022.1 | 64.0 |

-continued

| Day | 1-f (mg) | 2-c (mg) | 2-fs (mg) | Net (mg) | 3-v (mg) | r-VS (%) |
|---|---|---|---|---|---|---|
| 36 | 363715.7 | 0.0 | 88668.7 | 275046.9 | 98510.2 | 64.2 |
| 50 | 481150.1 | 0.0 | 99710.0 | 381440.1 | 331236.8 | 13.2 |
| 57 | 528442.8 | 0.0 | 111242.2 | 417200.6 | 345968.3 | 17.1 |
| 64 | 563754.1 | 0.0 | 122690.8 | 441063.3 | 343455.4 | 22.1 |
| 71 | 617483.1 | 0.0 | 132337.9 | 485145.2 | 289413.6 | 40.3 |
| 78 | 692221.2 | 0.0 | 143095.1 | 549126.1 | 322718.1 | 41.2 |
| 85 | 786633.2 | 0.0 | 154675.5 | 631957.8 | 347409.4 | 45.0 |
| 92 | 859244.9 | 0.0 | 166569.9 | 692675.0 | 356832.4 | 48.5 |
| 99 | 925683.2 | 0.0 | 180194.1 | 745489.1 | 408727.4 | 45.2 |
| 106 | 1001936.5 | 0.0 | 194295.7 | 807640.8 | 423047.2 | 47.6 |
| 113 | 1038490.3 | 0.0 | 209237.0 | 829253.3 | 448237.8 | 45.9 |
| 120 | 1071119.0 | 0.0 | 216726.4 | 854392.6 | 449365.0 | 47.4 |
| 127 | 1110986.4 | 0.0 | 225334.4 | 885652.1 | 516479.2 | 41.7 |
| 134 | 1150179.8 | 0.0 | 233470.8 | 916709.0 | 488188.9 | 46.7 |
| 141 | 1190415.5 | 0.0 | 239222.3 | 951193.3 | 575144.0 | 39.5 |
| 149 | 1227863.5 | 0.0 | 245069.7 | 982793.8 | 584744.5 | 40.5 |
| 156 | 1288894.6 | 0.0 | 250761.6 | 1038133.0 | 569191.3 | 45.2 |

FIGS. 50-53 graphically show the results of Table 8 with respect to reduction efficiency of volatile solids, net mass of volatile solids, and mas of volatile solids in the system at a given time. As can be seen, the mass reduction efficiency of volatile solids is substantially the same as the reduction efficiency for the total solids, and can be controlled to be within the same values.

Figure 53:
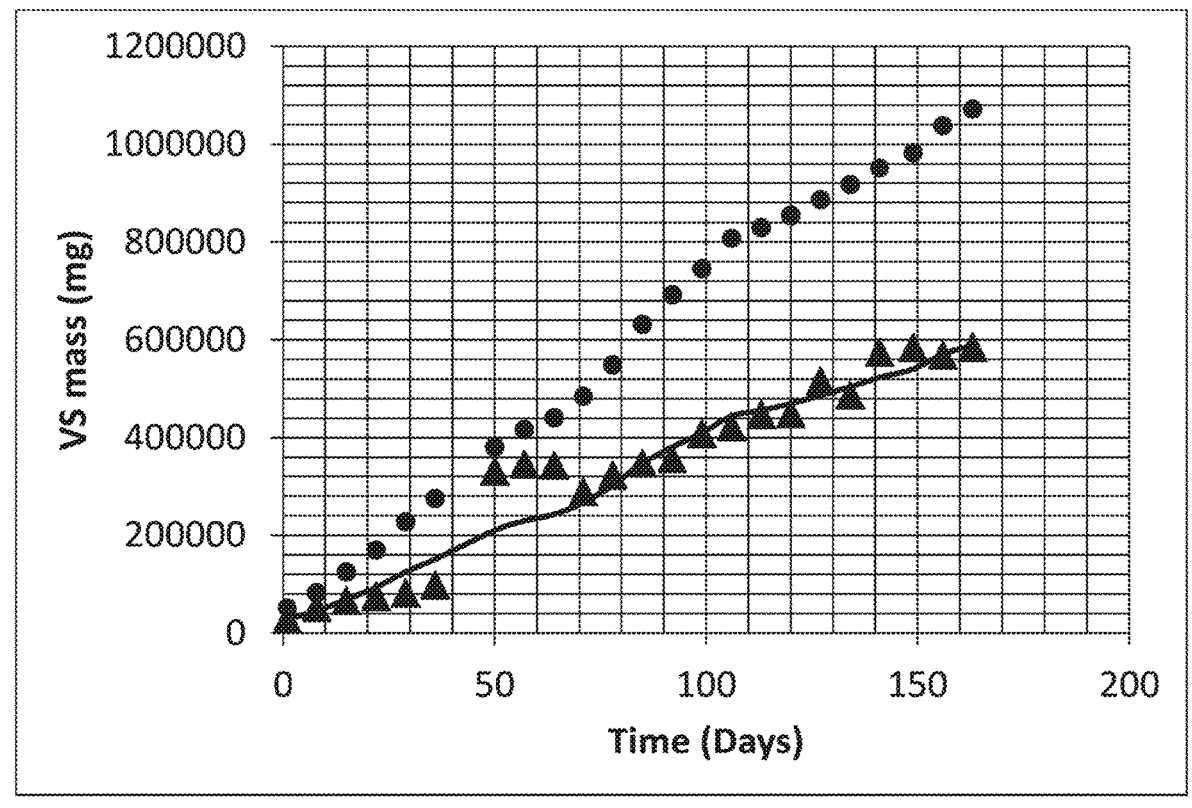
Figure 54:
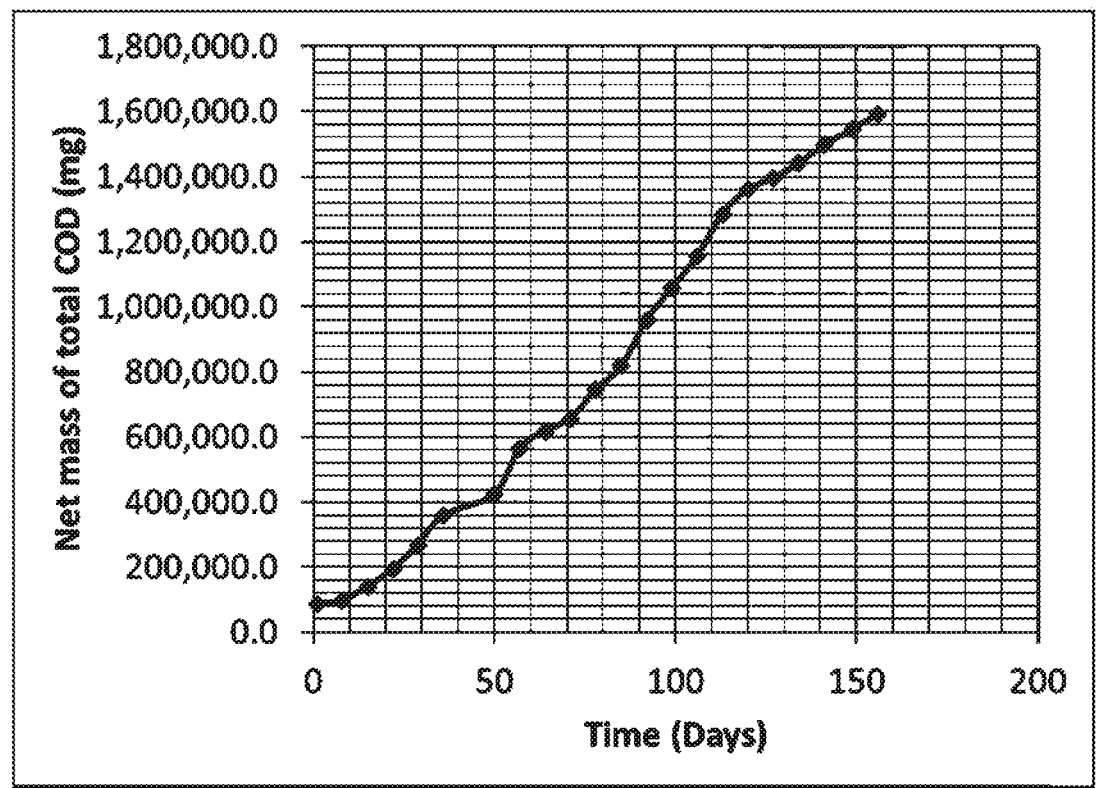
FIGS. 54-57 are graphs showing the mass balance calculations for total COD.
Figure 55:
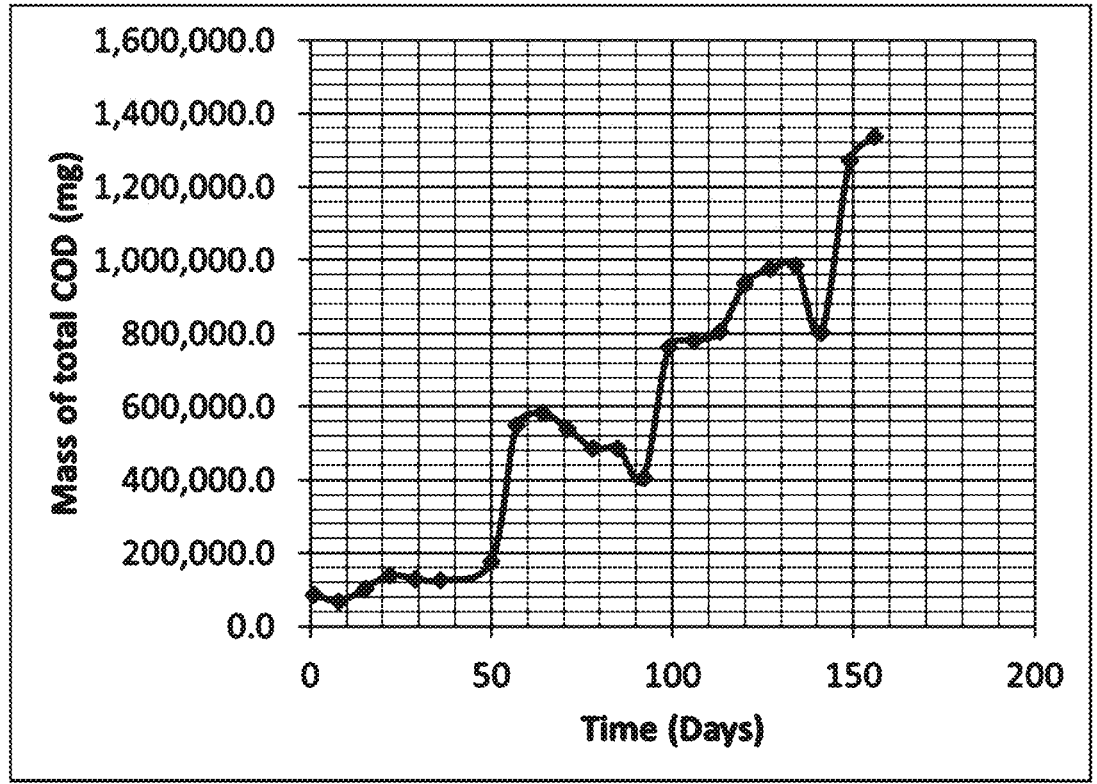

FIG. 53 graphically shows an integral volatile solids (VS) mass balance. The dots show the cumulative net VS mass entered in the treatment system (experimentally quantified). The triangles show the net VS mass accumulated in the treatment system (experimentally quantified). The line is the model-predicted net TS mass accumulated in the treatment system assuming a degradation efficiency of 45%.

The results of mass balance calculations for total COD are summarized in Table 10:

TABLE 10

The result of mass balance calculation of COD

| Day | 1-f (mg) | 2-c (mg) | 2-fs (mg) | Net (mg) | 3-v (mg) | r-COD (%) |
|---|---|---|---|---|---|---|
| 0 | 86400.0 | 0.0 | 0.0 | 86400.0 | 86400.0 | 0.0 |
| 1 | 98200.0 | 93.7 | 2246.7 | 95859.6 | 67400.0 | 29.7 |
| 8 | 166333.3 | 435.3 | 26023.3 | 139874.7 | 101900.0 | 27.1 |
| 15 | 252748.3 | 848.3 | 58550.0 | 193350.0 | 139400.0 | 27.9 |
| 22 | 359548.3 | 1460.3 | 88790.0 | 269298.0 | 129600.0 | 51.9 |
| 29 | 478588.3 | 1827.8 | 118050.0 | 358710.5 | 125400.0 | 65.0 |
| 36 | 586168.3 | 2751.8 | 159105.0 | 424311.5 | 175950.0 | 58.5 |
| 50 | 745088.3 | 4930.2 | 177375.0 | 562783.1 | 548100.0 | 2.6 |
| 57 | 820306.3 | 5691.5 | 196830.0 | 617784.9 | 583650.0 | 5.5 |
| 64 | 876883.8 | 6105.9 | 214840.0 | 655938.0 | 540300.0 | 17.6 |
| 71 | 983847.8 | 7665.3 | 231040.0 | 745142.6 | 486000.0 | 34.8 |
| 78 | 1074837.1 | 9623.2 | 247217.9 | 817996.0 | 485336.0 | 40.7 |
| 85 | 1231257.3 | 12058.5 | 260735.0 | 958463.8 | 405515.0 | 57.7 |
| 92 | 1358475.3 | 14876.5 | 286127.4 | 1057471.4 | 761770.5 | 28.0 |
| 99 | 1485628.6 | 17648.9 | 312160.9 | 1155818.8 | 781004.7 | 32.4 |
| 106 | 1645536.1 | 21326.6 | 339017.8 | 1285191.7 | 805707.0 | 37.3 |
| 113 | 1756643.6 | 25732.8 | 370205.8 | 1360705.0 | 935640.0 | 31.2 |
| 120 | 1811783.1 | 29880.0 | 386478.5 | 1395424.6 | 976363.2 | 30.0 |
| 127 | 1875326.6 | 32463.9 | 402916.2 | 1439946.4 | 986263.1 | 31.5 |
| 134 | 1947486.6 | 35683.7 | 416293.9 | 1495509.0 | 802660.4 | 46.3 |
| 141 | 2013999.1 | 38485.1 | 429020.3 | 1546493.8 | 1272637.8 | 17.7 |
| 149 | 2075591.6 | 40850.3 | 442380.6 | 1592360.7 | 1336037.9 | 16.1 |
| 156 | 2169567.6 | 45161.7 | 457415.1 | 1666990.8 | 1503441.4 | 9.8 |

FIGS. 54-57 graphically illustrate the results in Table 9 with respect to net mass of total COD fed to the treatment system, the mass of total COD present in the system at any given time, and the reduction efficiency of the total COD.

Figure 56:
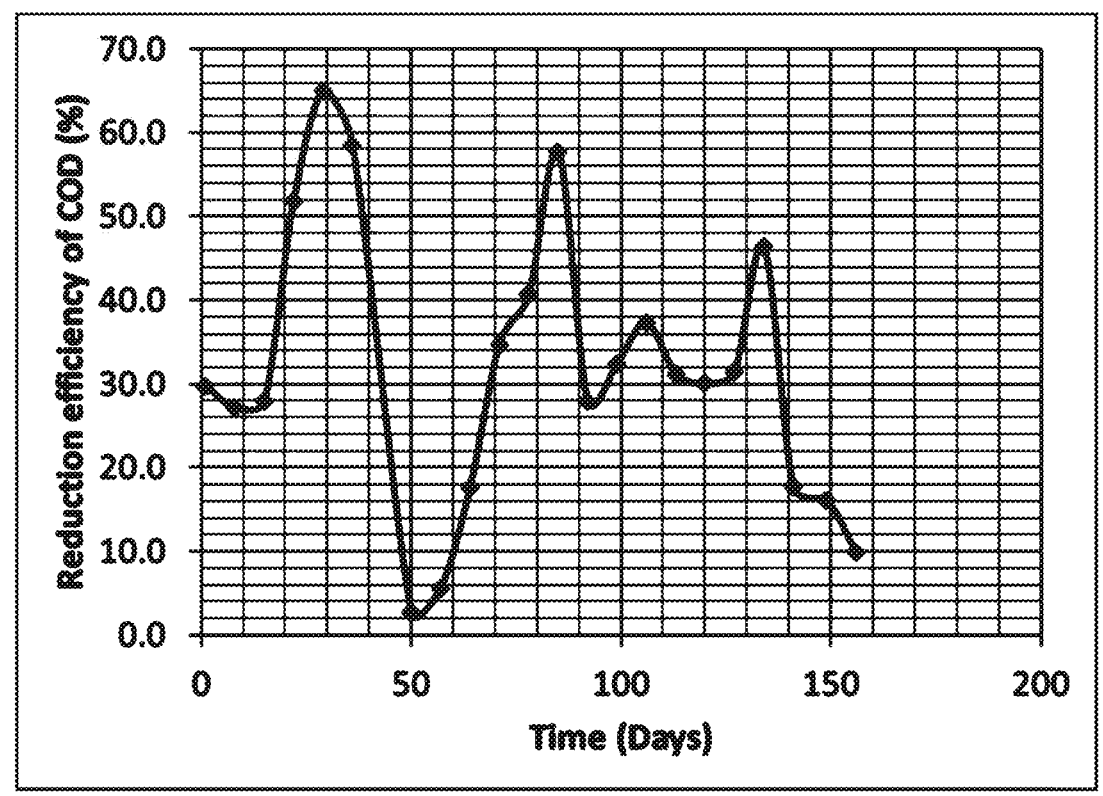

FIG. 56 illustrates one aspect in which the process can be controlled to periodically maximize desired products. For example, the peaks in FIG. 56, e.g., at 30 days, 85 days, and 133 days are times when the fermentate can produce the highest amount of biogas, and the biogas could be collected during these peak times. Conversely, the valleys, e.g., 50 days, indicate that the fermentate is high in carbon content, and the concentrated sludge could be collected during these times to use as a carbon source. The valley at 150 days correlates with a sludge that has been sufficiently digested (average volatile solids reduction between 40-60%) but at the same time enriched in carbon and nutrients, and the concentrated sludge could be withdrawn and processed for use as fertilizer at this stage.

Figure 57:
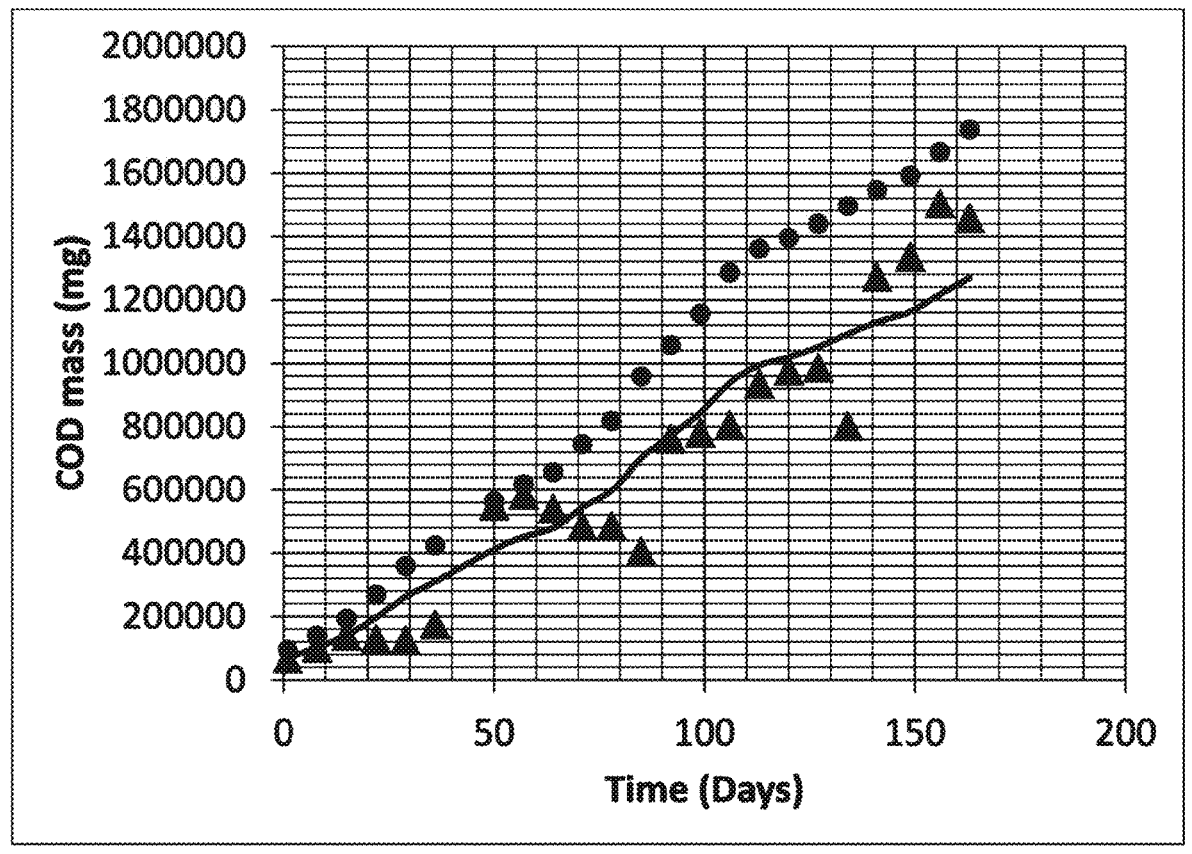

FIG. 57 graphically shows an integral chemical oxygen demand (COD) mass balance. The dots show the cumulative net COD mass entered in the treatment system (experimentally quantified). The triangles show the net COD mass accumulated in the treatment system (experimentally quantified). The line shows the model-predicted net COD mass accumulated in the treatment system assuming a degradation efficiency of 40%.

Microbiology Ecology Measurements

Figure 58A:
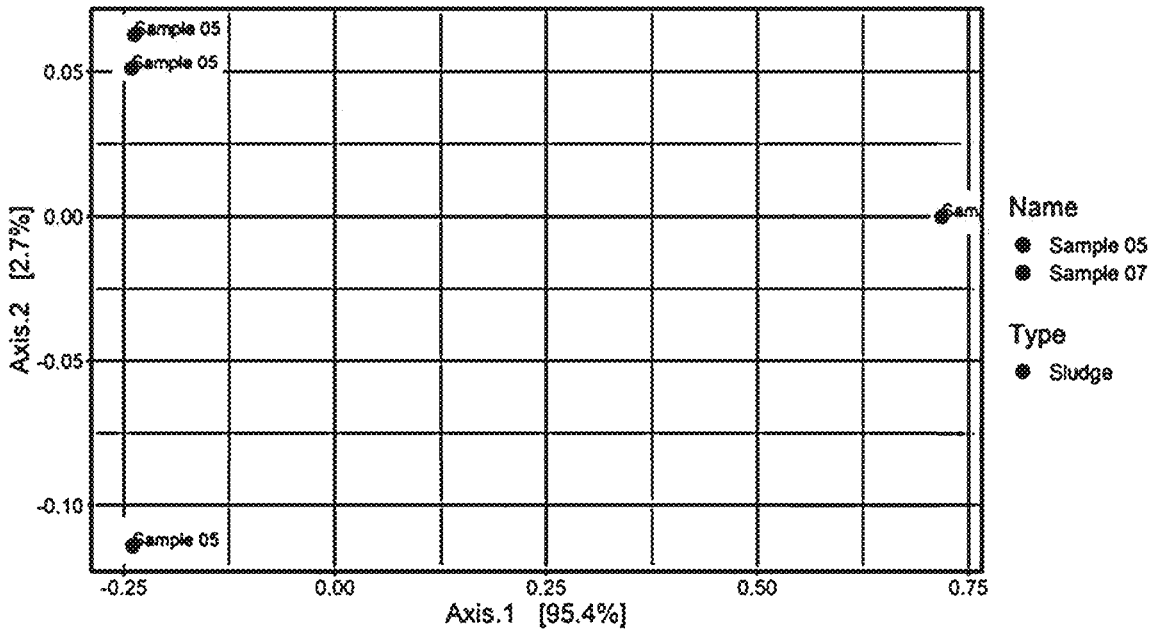
FIGS. 58A and 58B are graphs showing a Principal Component Analysis (PCoA) for two different types of sludges.
Figure 58B:
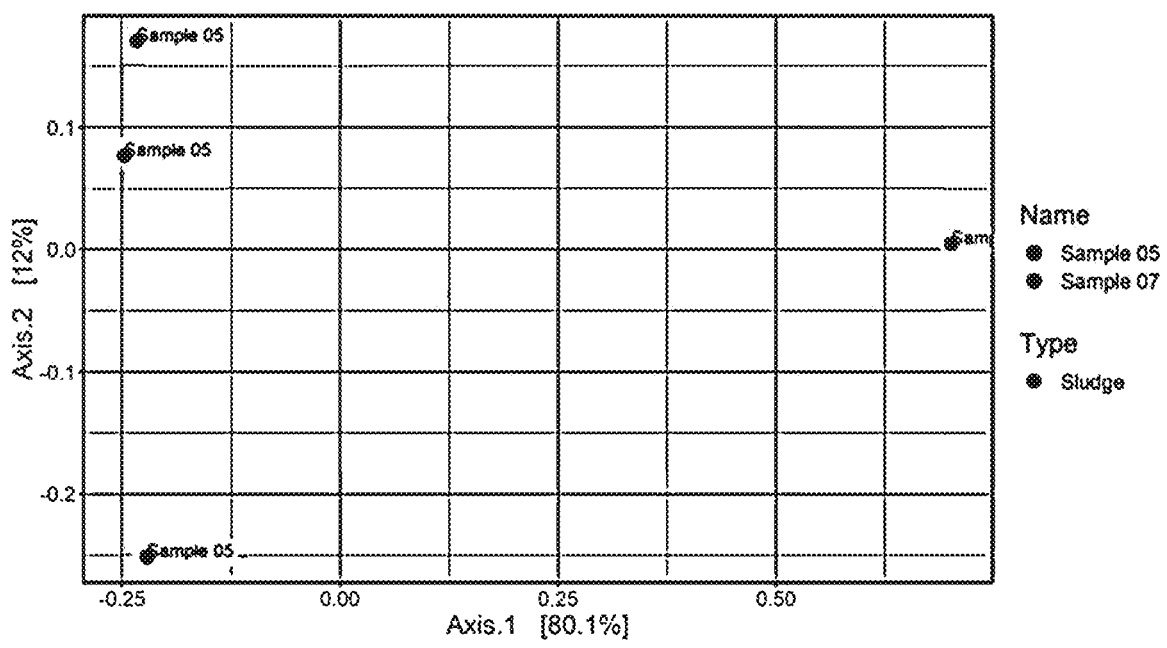

In order to confirm whether the vacuum-based bioprocesses described herein would lead to a unique performance also from a biochemical perspective, 3 samples from the above experiment at day 51 were analyzed (labeled as Sample #5) for microbial ecology analysis, and compared them with a sample collected from a conventional anaerobic digestion system that doesn't use vacuum-based bioprocesses (labeled as Sample #7). As clearly confirmed by principal component analysis (PCoA) shown in FIGS. 58A-58B, which illustrate the beta-diversity for Prokaryotes and Eukaryotes, the three samples #5 are vastly different from sample #7, which confirms the fact that the vacuum-based bioprocesses operate with a drastically different microbial ecology than conventional technologies.

Sludge pH Experiments

As indicated above, it was unexpectedly observed that vacuum treatment of sludge caused the sludge to have a higher pH than expected. Applicant conducted a series of experiments to confirm this observation, and to validate the advantages of sludge treatment at elevated pH.

Four different types of sludges including primary sludge (PS), thickened activated sludge (TWAS), mixed sludge (50/50 PS+TWAS) and digested sludge (DS) were used in the experiments to determine the increase of pH caused by vacuum, the saving in chemicals to achieve higher than natural pH compared to the case of no pre-treatment by vacuum, and the extent of ammonia removed from sludge and captured in the condensate.

To quantify the chemical demand required to increase the pH to the desired alkaline target, a 4M NaOH solution was used to spike 100 ml of sludge, and the volumetric amount of chemical required for each of the targeted pH was recorded.

The experiment proceeded as follows: (1) the vacuum system was started and the chilling fluid (tap water) was connected to the heat exchanger; (2) 5 L of sludge was loaded into the vacuum system; (3) The vacuum pump was turned on; (4) the heat source power was set at 500 W; (5) then the heat source and vacuum pump were turned off. Under those conditions, the system equilibrated at a temperature of 45-49° C. and a vacuum pressure of 95-120 mbar. After 4 hours of operation, a 1.2 L of condensate was produced and collected in the condensate bottle. After this treatment, pH, solid concentration (total and volatile) and ammonia were measured.

Table 11 summarizes the change in pH observed in the four sludge types, and the pH of the condensate produced by vacuum treatment.

TABLE 11

|  | pH results | | | |
|---|---|---|---|---|
|  | Primary Sludge | TWAS | Mixed Sludge (50:50) | Digestate |
| Before Vacuum | 6.52 | 7.71 | 7.37 | 7.33 |
| After Vacuum | 6.16 | 8.81 | 8 | 9.46 |
| Condensate | 8.34 | 10.38 | 9.64 | 10.13 |

Due to the fact that the biggest impact on pH is in the digested sludge, it is believed that the increase in pH is likely caused due to carbon dioxide (and other acidic gases) stripping, simultaneous with enhanced ammonia removal, which is confirmed by the ammonia concentration measurements carried out in the condensate. This is also confirmed by the ammonia mass balances (obtained by multiplying the measured ammonia concentration times the volume) reported in Table 12.

TABLE 12

|  | Ammonia (as N) mass balance | | | |
|---|---|---|---|---|
|  | Primary Sludge | TWAS | Mixed Sludge (50:50) | Digestate |
| Before Vacuum (mg) | 660 | 3920 | 2160 | 2360 |
| After Vacuum (mg) | 699.2 | 2568.8 | 1672.0 | 790.4 |
| Condensate (mg) | 24.0 | 1704.0 | 782.4 | 1910.4 |
| % ammonia removed | 4% | 43% | 36% | 81% |

The volatile solids (VS) and total solids (TS) content was measured on the untreated and vacuum-treated sludge to determine the extent of thickening associated with the sludge treatment and closing the water mass balance with the condensate. Table 13 summarizes the experimental data for these sludge characteristics.

TABLE 13

|  |  | Total and volatile solids concentration before and after vacuum treatment | | | |
|---|---|---|---|---|---|
|  |  | Primary Sludge | TWAS | Mixed Sludge (50:50) | Digestate |
| Before Vacuum | TS (%) | 2.2 | 5.1 | 3.5 | 2.7 |
|  | VS (%) | 1.8 | 3.6 | 2.5 | 1.5 |
| After Vacuum | TS (%) | 2.6 | 6.6 | 4.6 | 3.5 |
|  | VS (%) | 2.2 | 4.7 | 3.3 | 2.0 |

For the different sludge types indicated in table 13 and the different pre-treatment conditions—untreated (before vacuum) and treated (after vacuum)—incremental aliquots of a 4M NaOH solution were added to achieve a targeted pH (from 8 to 13). Results of these experiments are summarized in Table 14 in terms of normalized NaOH dose per gram of TS.

TABLE 14

| Normalized dosage of NaOH (grams NaOH/grams TS) | | | | |
|---|---|---|---|---|
| pH | PS | TWAS | MIX | Digestate |
| 9 | 0.18 | 0.10 | 0.11 |  |
| 10 | 0.30 | 0.39 | 0.28 | 0.23 |
| 11 | 0.48 | 0.87 | 0.56 | 0.45 |
| 12 | 0.67 | 1.25 | 0.84 | 0.63 |
| 13 | 1.21 | 1.64 | 1.19 | 0.81 |

Figure 59:
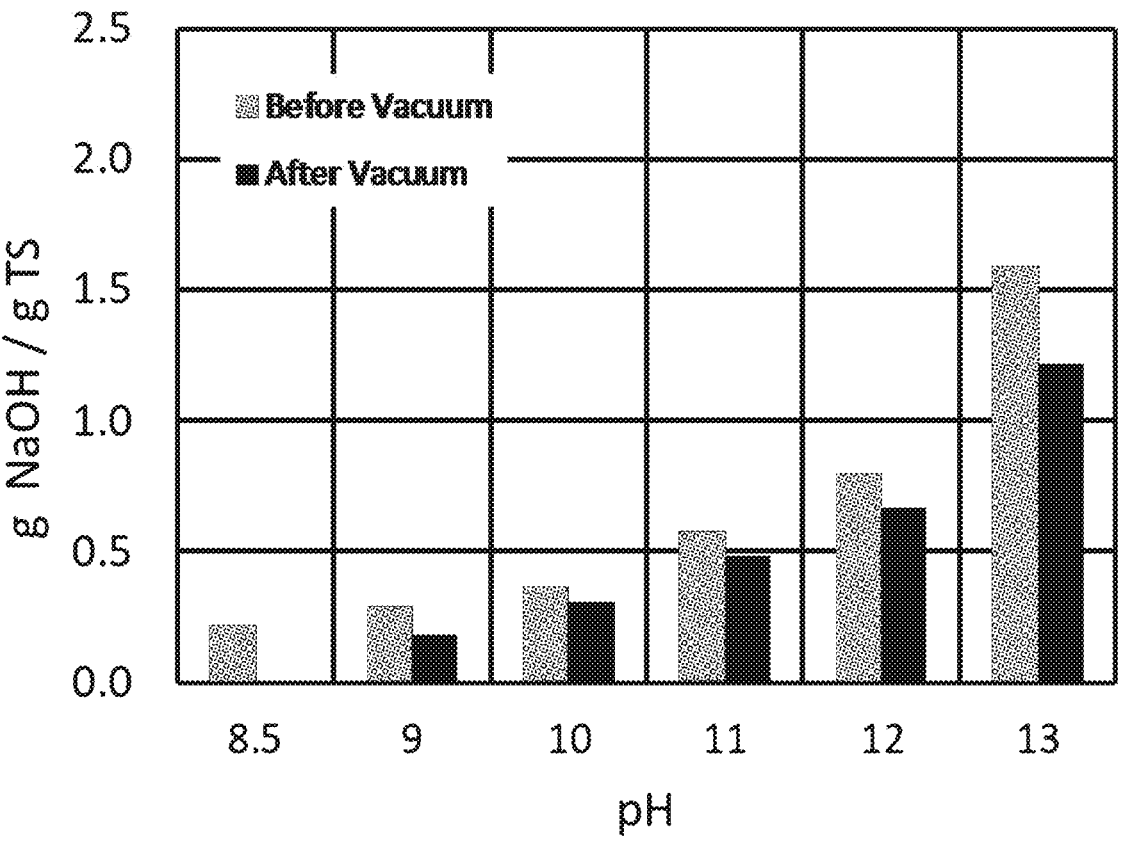
FIGS. 59 and 60 are graphs showing an amount of pH modifier needed to achieve target pHs in a primary sludge.
Figure 60:
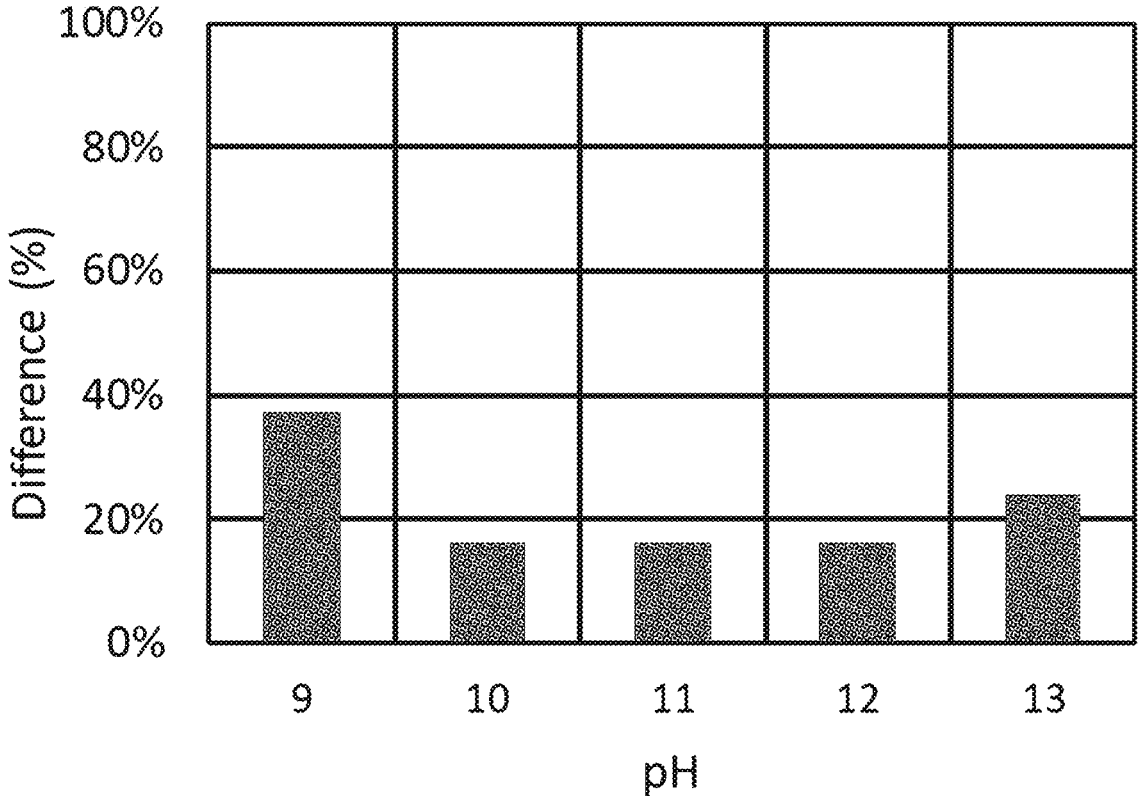
Figure 61:
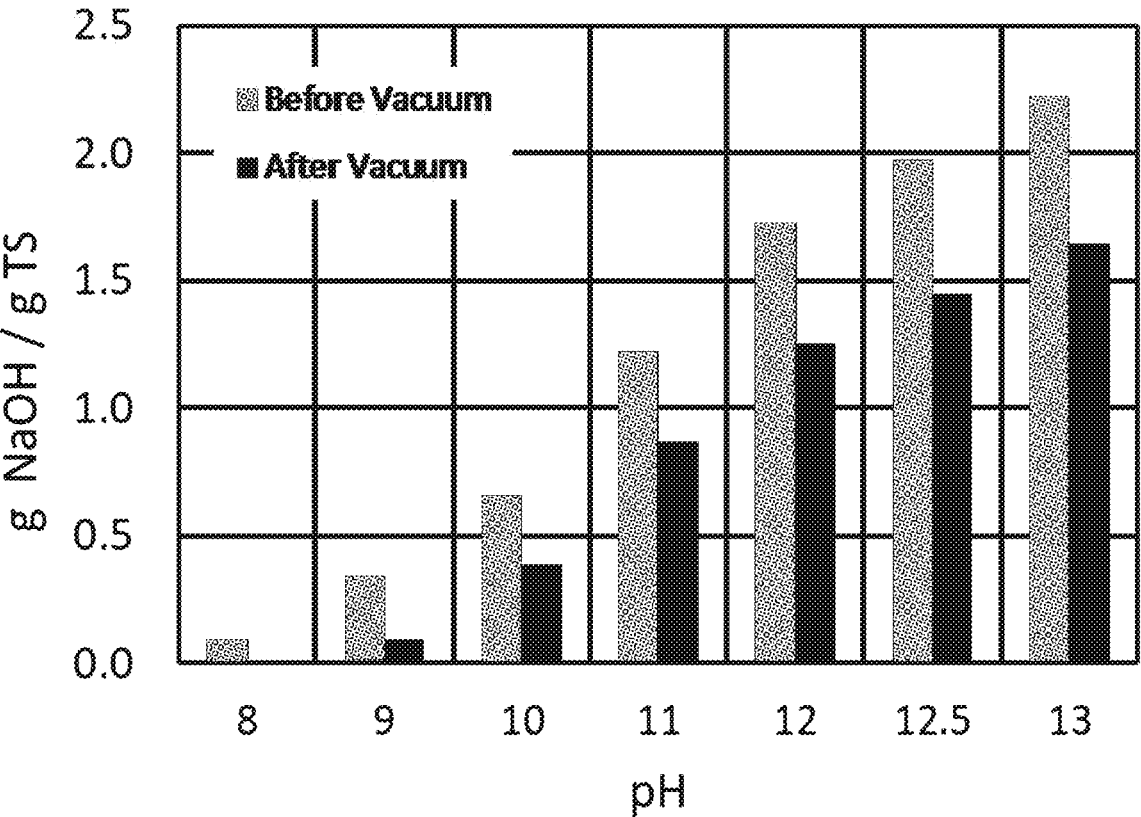
FIGS. 61 and 62 are graphs showing an amount of pH modifier needed to achieve target pHs in a thickened activated sludge.
Figure 62:
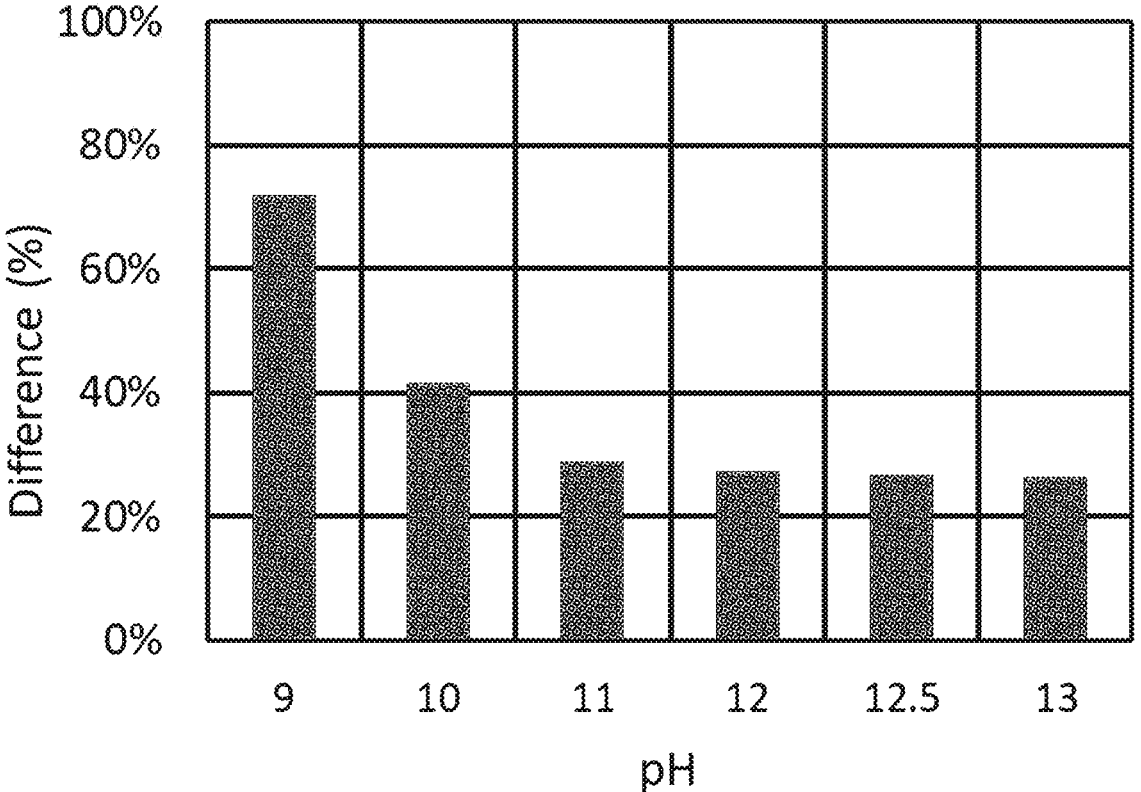
Figure 63:
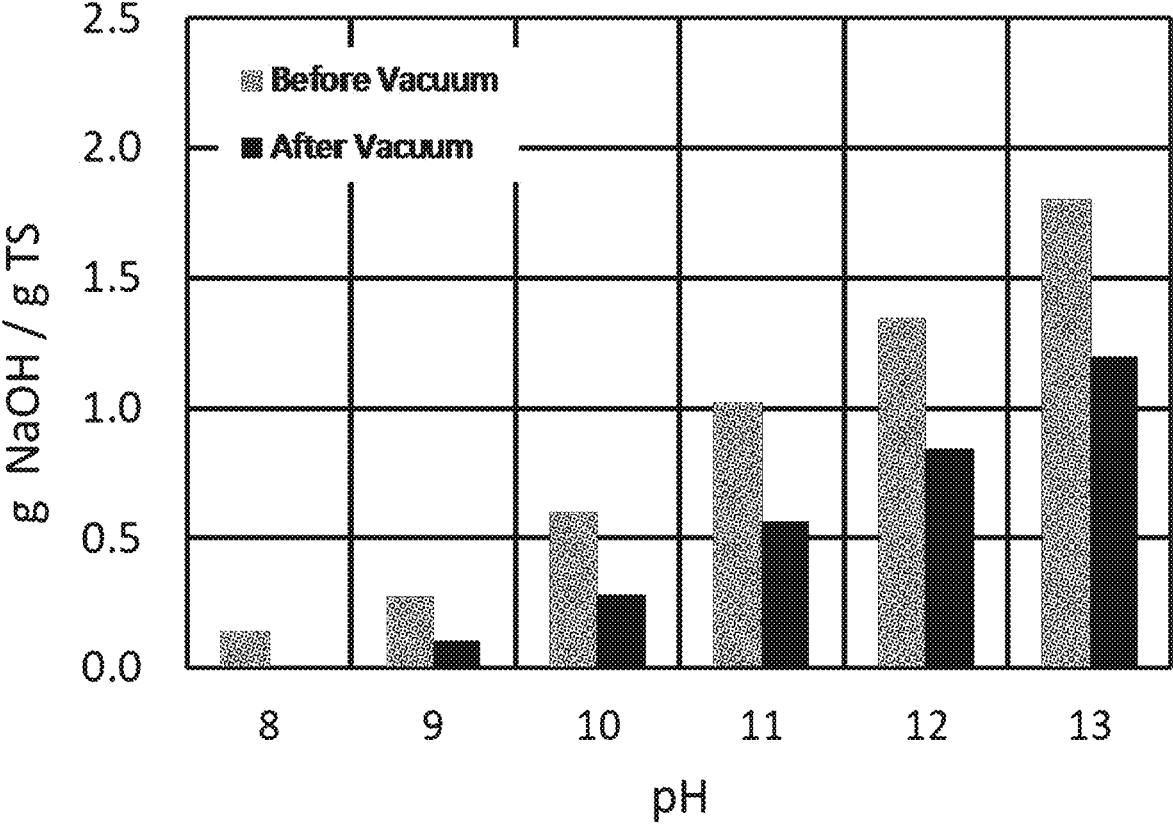
FIGS. 63 and 64 are graphs showing an amount of pH modifier needed to achieve target pHs in a mixed sludge.
Figure 64:
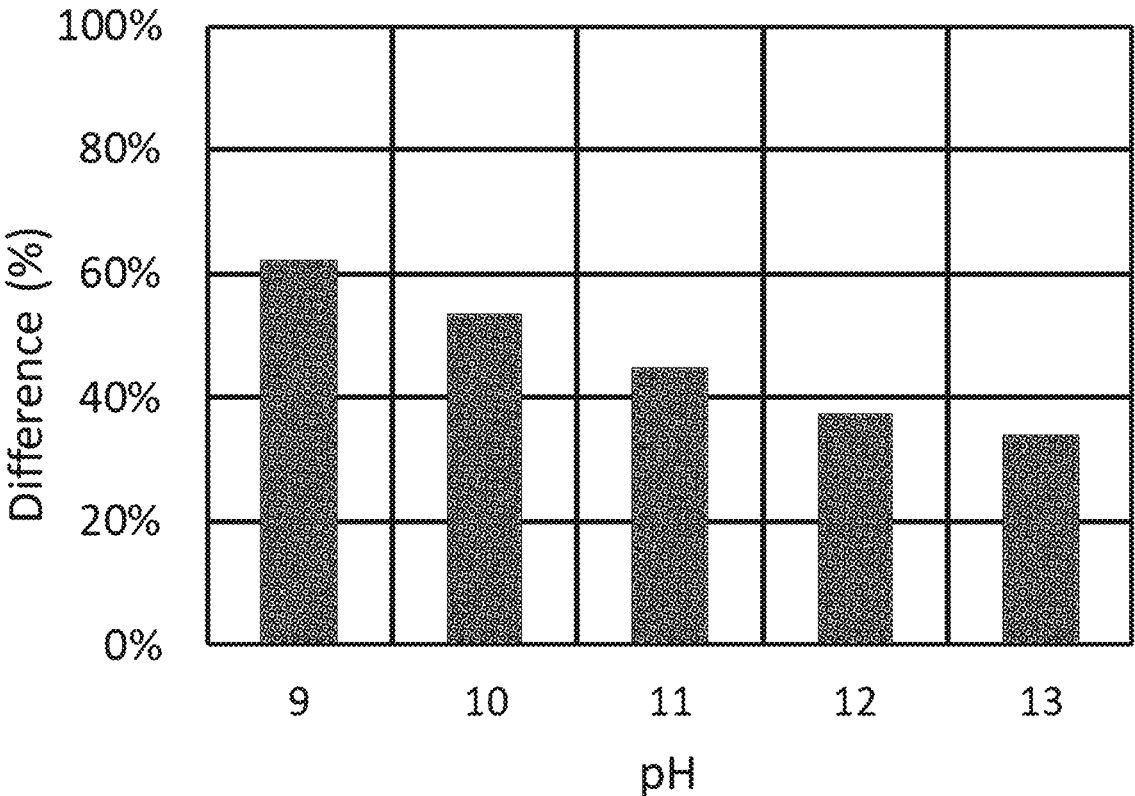
Figure 65:
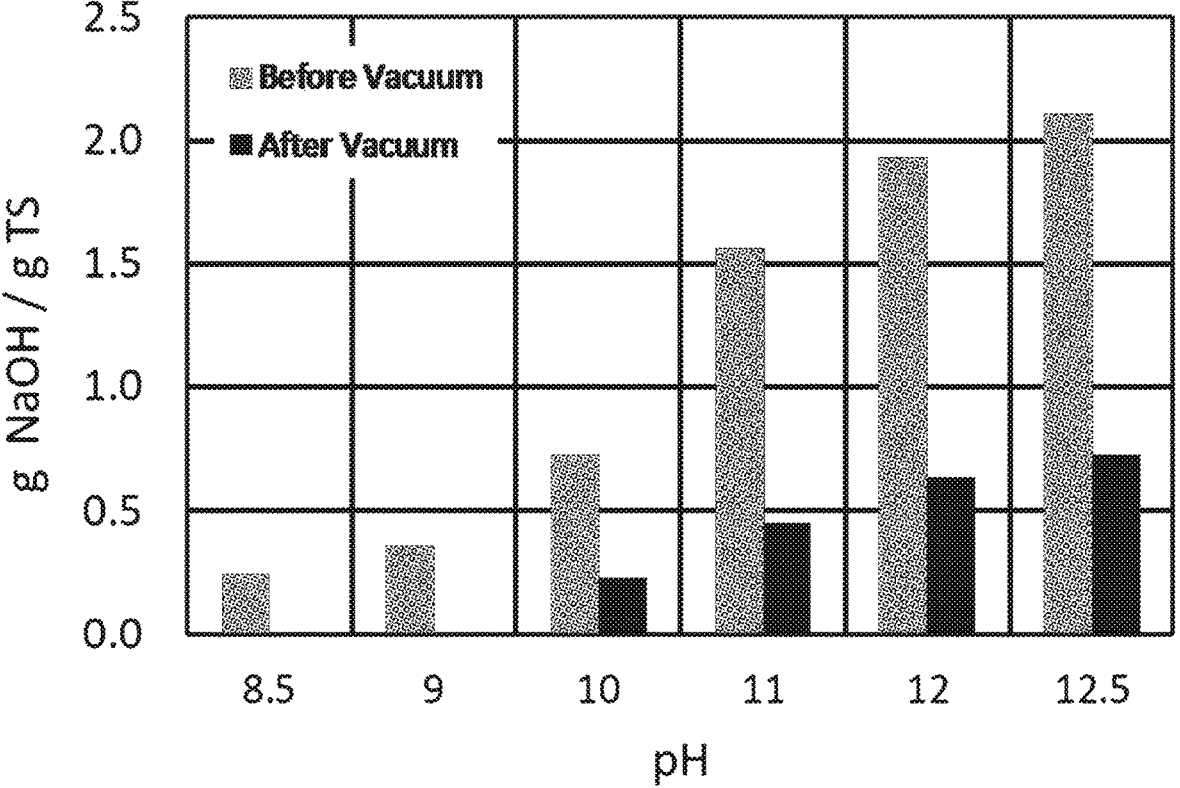
FIGS. 65 and 66 are graphs showing an amount of pH modifier needed to achieve target pHs in a digested sludge.
Figure 66:
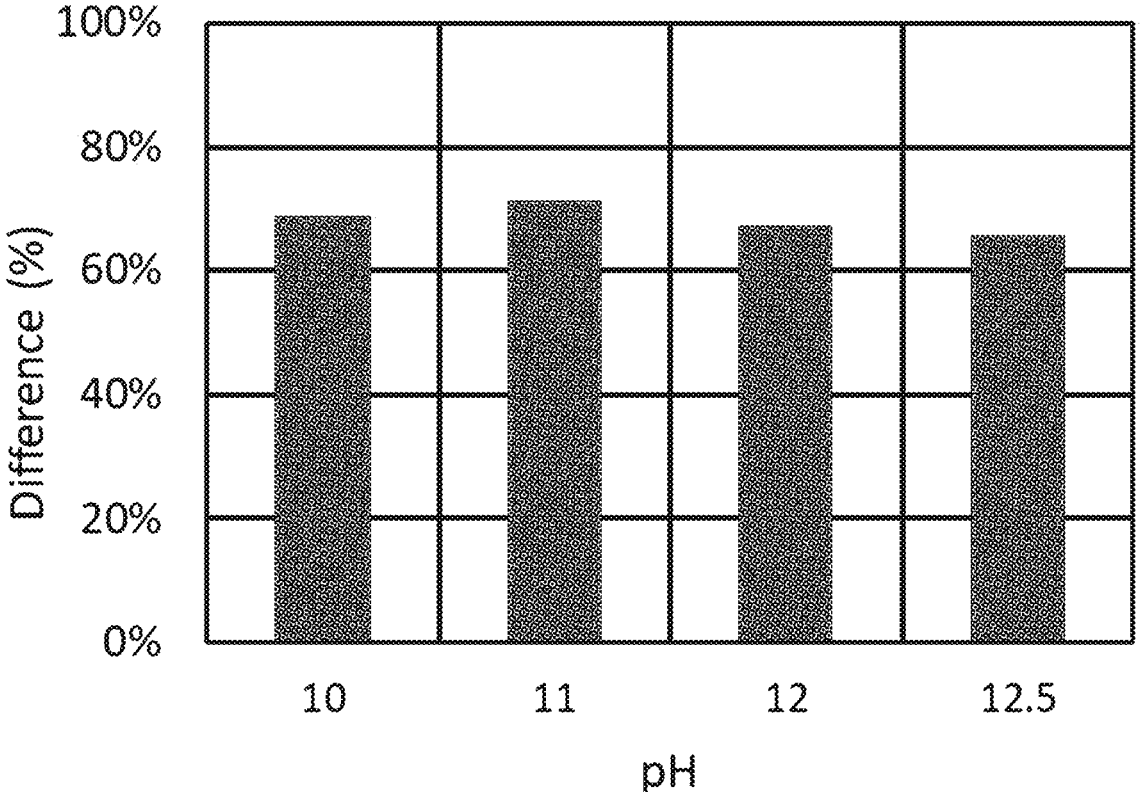

FIGS. 59-66 illustrate the amount of NaOH (as grams of NaOH per gram of TS) needed for the case of no vacuum treatment (noted in the legend as "before vacuum") and the amount required by the same sludge after vacuum treatment (noted in the legend as "after vacuum". FIG. 59 shows the amount of NaOH added to the PS to achieve the target pH. FIG. 60 shows the saving in pH adjusting agent (NaOH in this case) when dosing vacuum-treated PS. FIG. 61 shows the amount of NaOH added to the TWAS to achieve the target pH. FIG. 62 shows the saving in pH adjusting agent when dosing vacuum-treated TWAS. FIG. 63 shows the amount of NaOH added to the mixed sludge to achieve the target pH. FIG. 64 shows the saving in pH adjusting agent when dosing vacuum-treated mixed sludge. FIG. 65 shows the amount of NaOH added to the DS to achieve the target pH. FIG. 66 shows the saving in pH adjusting agent when dosing vacuum-treated DS.

These results support the following conclusions: the use of vacuum was able to considerably raise the pH of the various sludge matrices tested (except primary sludge where the pH did not change); the rise in pH observed for thickened waste activated sludge (TWAS), mixed primary and thickened activated sludges (PS:TWAS=1:1), and digested sludge (DS) corresponded to a substantial saving in NaOH dosing required to achieve an alkaline pH>8. A synergistic effect induced by the vacuum-induced pH increase was also observed, consisting of the simultaneous enhancement of ammonia from the sludge.

The combined effect of pH increase by vacuum, reduced chemical demand of NaOH to further raise the pH to even more alkaline target, and the removal of ammonia provides the following additional benefits: the amount of chemicals required to raise the pH of a sludge to a desired target is reduced; fermentation of the sludge can be enhanced by promoting alkaline conditions while removing and purifying nitrogen species from the sludge including ammonia, recovering the nitrogen species in the condensate, and inducing struvite (K-NH3-PO4) precipitation as a result of increase in pH and the establishment of alkaline (>pH 8) conditions especially in the digestate.

Scale-Up

Figure 67:
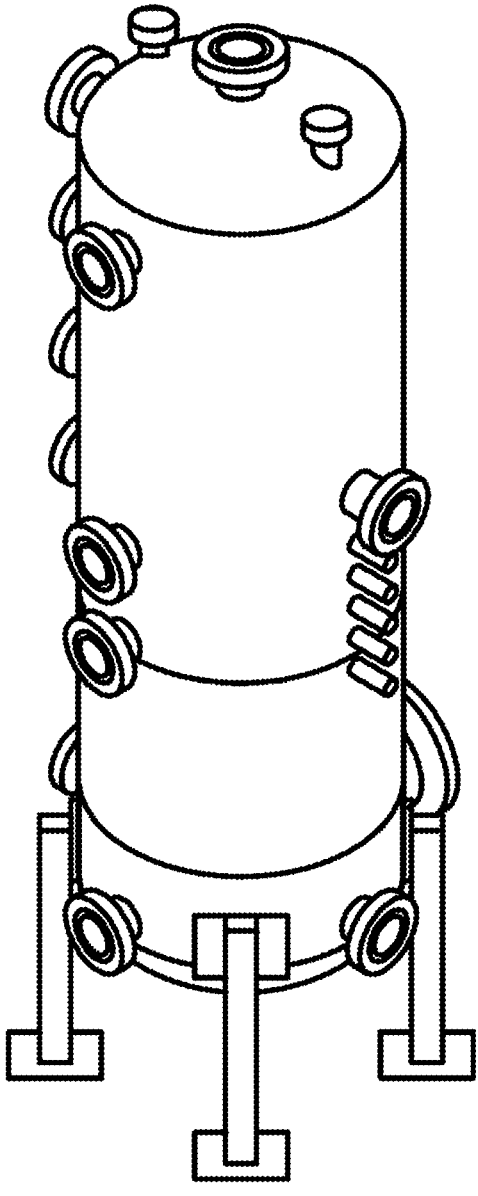
FIG. 67 is a perspective view showing a design reactor of a pilot scale fermenter assisted by vacuum evaporation.
Figure 68:
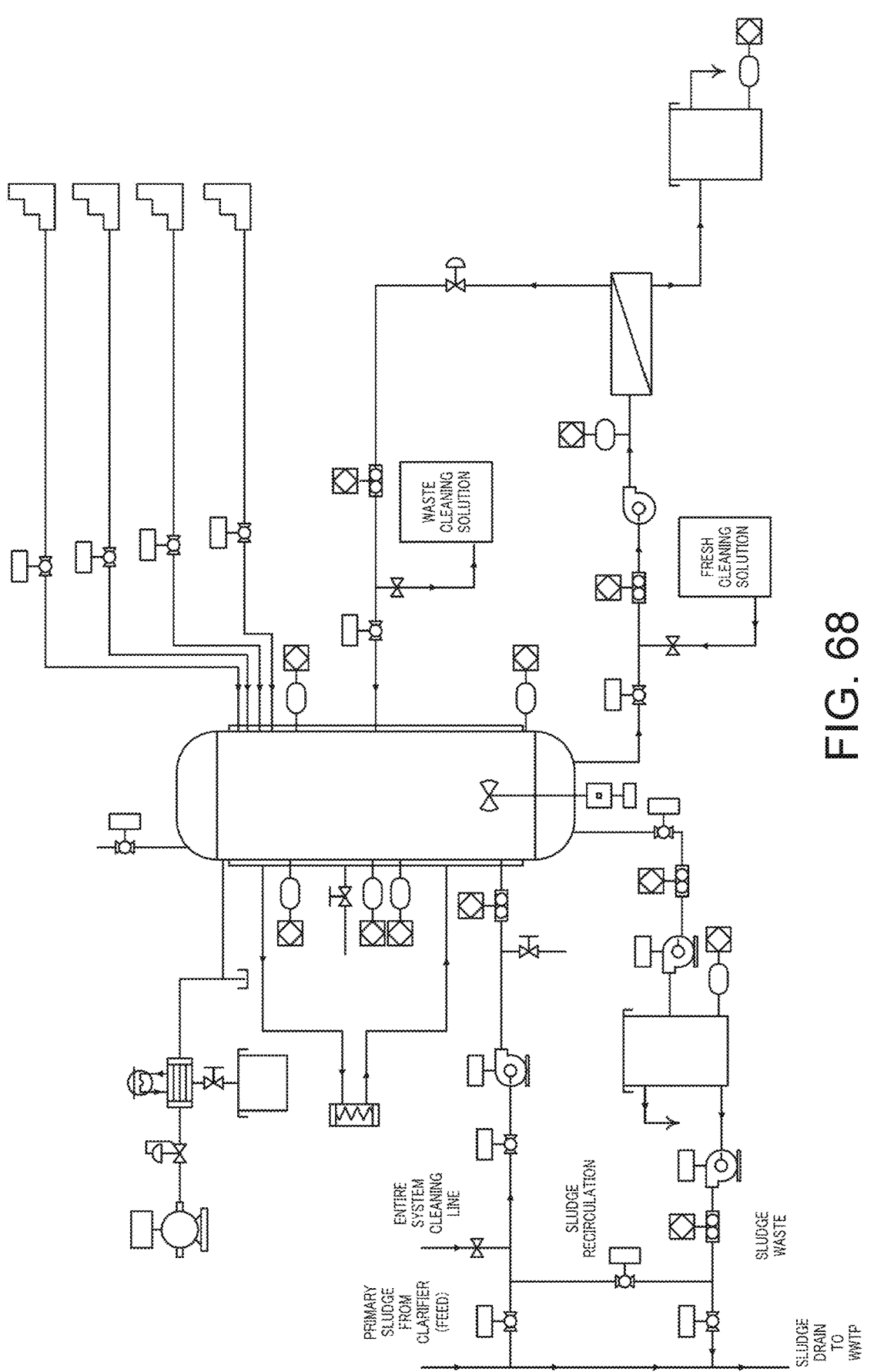
FIG. 68 is a schematic diagram showing a pilot scale fermenter assisted by vacuum evaporation.
Figure 69:
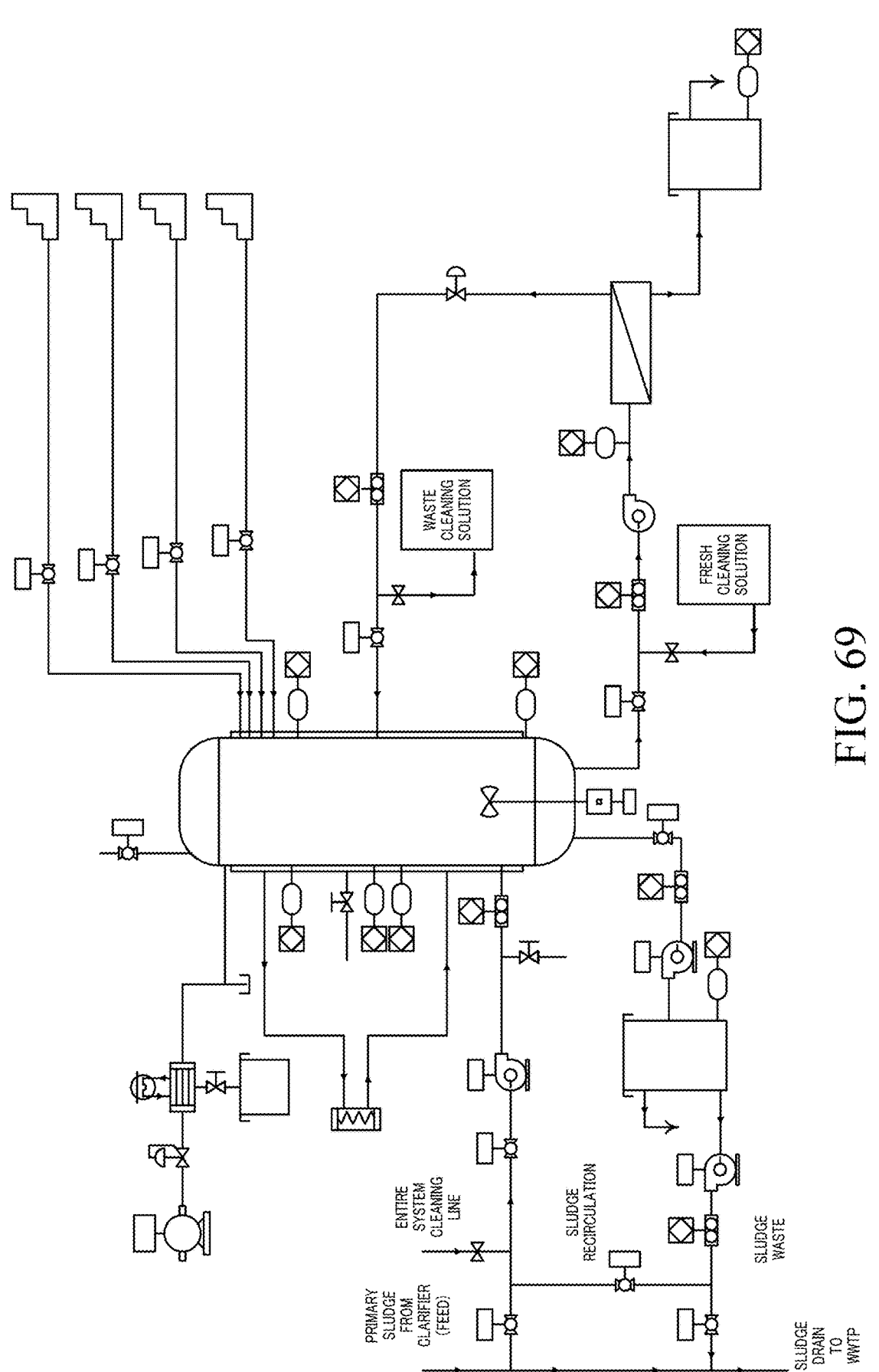
FIG. 69 is a schematic diagram showing a pilot scale fermenter assisted by vacuum evaporation.

It is expected that the above-described experimental tests would be able to scale up to commercial or municipal capacities, and a there are plans for operating similar experiments in a 300 L treatment chamber that can be operated in an automated mode with a programmable logic controller. The design of this reactor and system is shown in FIGS. 67-68. The system is equipped with additional intensification agents such as a membrane system (intended to separate the particulate component of the contaminated mixture by the soluble one, in order to further retain the slowly biodegradable and non-biodegradable fractions, with particle size bigger than the membrane cut-off size, in the treatment chamber) as well as four chemical dosing stations where ad-hoc chemicals such as oxidants, acids/base, enzymes, catalysts, etc. are dosed, either sequentially (in time or in space) or simultaneously, in the treatment chamber to accelerate reaction rates. To summarize, the pilot system represents a scaled-up version of the current invention and can rely on at least four intensification agents: pressure (vacuum), heat (temperature), chemistry (liquid or solid reagents), and mechanical particle separation (membrane).

It will be apparent to those skilled in the art that variations of the methods and systems described herein are possible and are intended to be encompassed within the scope of the present invention.

What is claimed is:

1. A method for treating a fluid that includes a particulate fraction and a soluble fraction, the method comprising:
feeding the fluid to a fermenter;
fermenting solids in the particulate fraction of the fluid with microbes in the fermenter;
subjecting at least a portion of the fluid to a vacuum pressure; and
evaporating off at least a portion of the soluble fraction of the fluid to provide a thickened fluid,
wherein a residence time of the particulate fraction of the fluid is controlled to be in a range of from 0.5 to 5 days.

2. The method according to claim 1, wherein the portion of the fluid is subjected to the vacuum pressure in the fermenter.

3. The method according to claim 1, wherein the portion of the fluid is fed to a separate vacuum chamber and the portion of the fluid is subjected to the vacuum pressure in the separate vacuum chamber so that the thickened fluid is present in the vacuum chamber.

4. The method according to claim 3, further comprising recirculating at least some of the thickened fluid to the fermenter so that the recirculated thickened fluid is further fermented.

5. The method according to claim 4, wherein 100% of the thickened fluid that is removed from the separate vacuum chamber is recirculated to the fermenter.

6. The method according to claim 3, wherein the fluid is treated at pressures greater than the vacuum pressure for a longer duration than periods at which the fluid is subjected to the vacuum pressure.

7. The method according to claim 1, wherein the fluid that is fed to the fermenter is a sludge having a pH that is in a range of from 2.39 to 6.68.

8. The method according to claim 1, wherein the fluid that is fed to the fermenter is a sludge having a conductivity that is in a range of from 1.52 mS/cm to 2.50 mS/cm.

9. The method according to claim 1, wherein the fluid that is fed to the fermenter is a sludge having a total chemical oxygen demand that is in a range of from 22,550 mg/L to 51,750 mg/L.

10. The method according to claim 1, wherein the fluid that is fed to the fermenter is a sludge having a soluble chemical oxygen demand that is in a range of from 660 mg/L to 3420 mg/L.

11. The method according to claim 1, wherein the fluid that is fed to the fermenter is a sludge having volatile fatty acids in an amount of from 296.9 mg/L to 1691.7 mg/L.

12. The method according to claim 1, wherein the fluid that is fed to the fermenter is a sludge having total phosphorous in an amount of from 12.4 mg/L to 138.3 mg/L.

13. The method according to claim 1, wherein the fluid that is fed to the fermenter is a sludge having ammonium in an amount of from 25 mg/L to 93.6 mg/L.

14. The method according to claim 1, wherein the fluid that is fed to the fermenter is a sludge having a total solids that is in a range of from 2.2% to 3.5%.

15. The method according to claim 1, wherein the fluid that is fed to the fermenter is a sludge having a total volatile solids that is in a range of from 1.4% to 2.6%.

16. The method according to claim 1, wherein (i) the fluid that is fed to the fermenter is a sludge, and (ii) the method further comprises condensing the portion of the soluble fraction that is evaporated off to provide a condensate.

17. The method according to claim 16, wherein the condensate has a pH that is in a range of from 3.68 to 9.26.

18. The method according to claim 16, wherein the condensate has a conductivity that is in a range of from 0.09 mS/cm to 0.58 mS/cm.

19. The method according to claim 16, wherein the condensate has a total chemical oxygen demand that is in a range of from 160 mg/L to 2025 mg/L.

20. The method according to claim 16, wherein the condensate has a soluble chemical oxygen demand that is in a range of from 123 mg/L to 2,190 mg/L.

21. The method according to claim 16, wherein the condensate has volatile fatty acids in an amount of from 24.8 mg/L to 671.5 mg/L.

22. The method according to claim 16, wherein the condensate has total phosphorous in an amount of from 3.6 mg/L to 70.3 mg/L.

23. The method according to claim 16, wherein the condensate has ammonium in an amount of from 5.4 mg/L to 87.5 mg/L.

24. The method according to claim 16, wherein the condensate has total suspended solids in an amount of from 0.4 mg/L to 18.8 mg/L.

25. The method according to claim 16, further comprising, during the condensing step, recovering heat from the portion of the soluble fraction that is evaporated off, and preheating the fluid with the recovered heat before the fluid is fed to the fermenter.

26. The method according to claim 1, wherein the fluid that is fed to the fermenter is a sludge, and wherein the thickened fluid has a pH in a range of from 5.7 to 6.7.

27. The method according to claim 1, wherein the fluid that is fed to the fermenter is a sludge, and wherein the thickened fluid has a conductivity that is in a range of from 1.7 mS/cm to 21.0 mS/cm.

28. The method according to claim 1, wherein the fluid that is fed to the fermenter is a sludge, and wherein the thickened fluid has a total chemical oxygen demand in a range of from 22466.7 mg/L to 501147.1 mg/L.

29. The method according to claim 1, wherein the fluid that is fed to the fermenter is a sludge, and wherein the thickened fluid has a soluble chemical oxygen demand that is in a range of from 3430.0 mg/L to 59837.4 mg/L.

30. The method according to claim 1, wherein the fluid that is fed to the fermenter is a sludge, and wherein the thickened fluid has volatile fatty acids in an amount of from 368.4 mg/L to 14,701.8 mg/L.

31. The method according to claim 1, wherein the fluid that is fed to the fermenter is a sludge, and wherein the thickened fluid has volatile fatty acids in an amount of from 100 mg/L to 50,000 mg/L.

32. The method according to claim 1, wherein the fluid that is fed to the fermenter is a sludge, and wherein the thickened fluid has total phosphorous in an amount of from 303.6 mg/L to 1142.0 mg/L.

33. The method according to claim 1, wherein the fluid that is fed to the fermenter is a sludge, and wherein the thickened fluid has ammonium in an amount of from 110.8 mg/L to 2165.9 mg/L.

34. The method according to claim 1, wherein the fluid that is fed to the fermenter is a sludge, and wherein the thickened fluid has a total solids that is in a range of from 3.0% to 28.9%.

35. The method according to claim 1, wherein the fluid that is fed to the fermenter is a sludge, and wherein the thickened fluid has a total volatile solids that is in a range of from 1.0% to 19.5%.

36. The method according to claim 1, wherein the fluid that is fed to the fermenter is a sludge, and wherein the residence time of the particulate fraction of the sludge is controlled so that biosolids in the sludge are stabilized to Class A biosolids.

37. The method according to claim 1, wherein the fluid that is fed to the fermenter includes biosolids that are selected from the group consisting of wastewater treatment biosolids, biosolids from an organic fraction of municipal solid wastes, food waste biosolids, organic industrial waste biosolids, agricultural waste biosolids, and combinations thereof.

38. The method according to claim 1, further comprising controlling the vacuum pressure so that production of volatile fatty acids increases.

39. The method according to claim 1, further comprising controlling a pH of the fluid in the fermenter so that production of volatile fatty acids increases.

40. The method according to claim 1, wherein a concentration of volatile fatty acids in the thickened fluid is in a range of from 1,000 mg/L to 50,000 mg/L.

41. The method according to claim 1, wherein a concentration of volatile fatty acids in the thickened fluid is in a range of from 2,500 mg/L to 15,000 mg/L.

42. The method according to claim 1, further comprising adjusting a parameter of the fluid so that a concentration of volatile fatty acids in the portion of the soluble fraction that is evaporated off increases.

43. The method according to claim 42, further comprising condensing the evaporated portion to produce a condensate that is relatively rich in the volatile fatty acids, and recycling the condensate as a carbon source.

44. The method according to claim 1, wherein the residence time of the particulate fraction of the fluid is controlled to be at least 25% greater than a residence time of the soluble fraction of the fluid.

* * * * *